US012646113B2

(12) United States Patent
Bai et al.

(10) Patent No.: US 12,646,113 B2
(45) Date of Patent: Jun. 2, 2026

(54) METHOD AND SYSTEM FOR TRADING ASSETS AND THEIR CARBON FOOTPRINT STATUS

(71) Applicant: MVGX Tech Pte. Ltd., Singapore (SG)

(72) Inventors: Bo Bai, Beijing (CN); Kuan Huang, Shanghai (CN)

(73) Assignee: MVGX Tech Pte. Ltd., Singapore (SG)

( * ) Notice: Subject to any disclaimer, the term of this patent is extended or adjusted under 35 U.S.C. 154(b) by 132 days.

(21) Appl. No.: 18/287,780

(22) PCT Filed: Jul. 15, 2021

(86) PCT No.: PCT/SG2021/050417
§ 371 (c)(1),
(2) Date: Oct. 20, 2023

(87) PCT Pub. No.: WO2022/225446
PCT Pub. Date: Oct. 27, 2022

(65) Prior Publication Data
US 2024/0193684 A1      Jun. 13, 2024

(30) Foreign Application Priority Data

Apr. 22, 2021      (CN) .......................... 202110438834.0

(51) Int. Cl.
*G06Q 40/04*          (2012.01)
*G06Q 20/38*          (2012.01)
(Continued)

(52) U.S. Cl.
CPC ....... *G06Q 40/04* (2013.01); *G06Q 20/38215* (2013.01); *G06Q 30/018* (2013.01);
(Continued)

(58) Field of Classification Search
USPC .......................................................... 705/37
See application file for complete search history.

(56) References Cited

U.S. PATENT DOCUMENTS

2011/0208621 A1* 8/2011 Feierstein et al. .............. 705/30
2019/0005507 A1    1/2019 Rodoni et al.
(Continued)

FOREIGN PATENT DOCUMENTS

CN          109636390 A          4/2019
CN          112256662 A          1/2021
(Continued)

OTHER PUBLICATIONS

Colleran, Hunter, Carbon Trading on a Blockchain, Aug. 16, 2018, ASU Blockchain Research, pp. 1-8. (Year: 2018).*
(Continued)

*Primary Examiner* — Bennett M Sigmond
*Assistant Examiner* — George N. Proios
(74) *Attorney, Agent, or Firm* — The Webb Law Firm

(57)          ABSTRACT

The present application relates to systems and methods for trading assets taking into account carbon footprint of assets. The system is configured to allow a party to obtain carbon emission certificates and carbon emission redemption certificates from an offsetting activity in a country, and uses these to create a non fungible digital twin representing the offsetting activity which includes a time series of emission reduction smart contracts on a blockchain which are used to generate carbon neutrality tokens based on the amount of carbon emission reductions which can then be traded in any country. Similarly an asset holder can create a Non-Fungible Digital Twin (NFDT) representing the offsetting activity which includes a time series of asset smart contracts on a blockchain which capture the carbon footprint of the asset over time. A trading exchange is configured to allow listing of assets and trading of carbon neutrality tokens, and includes a ledger to track the carbon neutrality status of listing entities and investor portfolios.

25 Claims, 18 Drawing Sheets

(51) Int. Cl.
    *G06Q 30/018*      (2023.01)
    *H04L 9/32*       (2006.01)

(52) U.S. Cl.
    CPC ......... G06Q 40/049 (2025.08); H04L 9/3239
           (2013.01); *G06Q 40/055* (2025.08)

(56)         References Cited

U.S. PATENT DOCUMENTS

| | | | | |
|---|---|---|---|---|
| 2019/0005578 | A1* | 1/2019 | Gagne | G06Q 40/04 |
| 2019/0057396 | A1* | 2/2019 | Cui et al. | G06Q 30/018 |
| 2020/0005284 | A1* | 1/2020 | Vijayan | G06Q 20/3678 |
| 2020/0027096 | A1* | 1/2020 | Cooner | G06Q 30/018 |
| 2020/0148072 | A1* | 5/2020 | Ashley et al. | B60L 53/665 |
| 2020/0186332 | A1* | 6/2020 | Moeller | H04L 9/08 |
| 2021/0117981 | A1* | 4/2021 | Tian et al. | G06Q 30/018 |
| 2022/0358547 | A1* | 11/2022 | Blaikie, III et al. | G06Q 30/0269 |
| 2023/0139137 | A1* | 5/2023 | Slack | G06Q 40/04 |
| 2023/0260030 | A1* | 8/2023 | Corpuz et al. | G06Q 40/04 |

FOREIGN PATENT DOCUMENTS

| | | |
|---|---|---|
| JP | 202151585 A | 4/2021 |
| KR | 102202420 B1 | 1/2021 |
| KR | 1020210073185 A | 6/2021 |
| WO | 2019137408 A | 7/2019 |
| WO | 2020003202 A1 | 1/2020 |

OTHER PUBLICATIONS

Breetz et al., "The political logics of clean energy transitions", Business and Politics, 2018, pp. 492-522, vol. 20:4.

Chevallier et al., "Options introduction and volatility in the EU ETS", Resource and Energy Economics, 2011, pp. 855-880, vol. 33.

Colleran, "Carbon Trading on a Blockchain", Arizona State University, Aug. 2018. [retrieved at https://blockchain.asu.edu/carbon-trading-on-a-blockchain/].

"Emissions Gap Report 2020", UNEP, 2020, 128 pages.

Entriken et al., "ERC-721: Non-fungible Token Standard", Ethereum Improvement Proposals, Jan. 2018, 12 pages. [retrieved at https://eips.ethereum.org/EIPS/eip-721].

"ERC721", OpenZeppelin, Jan. 2021, 4 pages. [retrieved at https://web.archive.org/web/20210116023406/https://docs.openzeppelin.com/contracts/3.x/erc721].

"ERC-721 Non-Fungible Token Standard", Ethereum, Mar. 2021, 7 pages. [retrieved at https://web.archive.org/web/20210319183906/https://ethereum.org/en/developers/docs/standards/tokens/erc-721/].

Fowlie et al., "Market-Based Emissions Regulation and Industry Dynamics", Journal of Political Economy, 2016, pp. 249-302, vol. 124:1.

Ivanova et al., "Quantifying the potential for climate change mitigation of consumption options", Environ. Res. Lett., 2020, 20 pages, vol. 15.

Li et al., "Industrial path analysis for CO2 transfers induced by final consumption: A comparison of the United States and China", Journal of Cleaner Production, 2020, pp. 1-8, vol. 251.

Marcu et al., "Carbon Leakage: Options for the EU", CEPS, Mar. 2014, 70 pages.

Vogelsteller et al., "ERC-20: Token Standard", Ethereum Improvement Proposals, Sep. 2015, 4 pages. [retrieved at https://eips.ethereum.org/EIPS/eip-20].

"Welcome to Ethereum", Ethereum, Feb. 2021, 14 pages. [retrieved at https://web.archive.org/web/20210202071941/https://ethereum.org/en/].

Zhang et al., "Analysis on CO2 Emissions Transferred from Developed Economies to China through Trade", China & World Economy, 2016, pp. 68-89, vol. 24:2.

\* cited by examiner

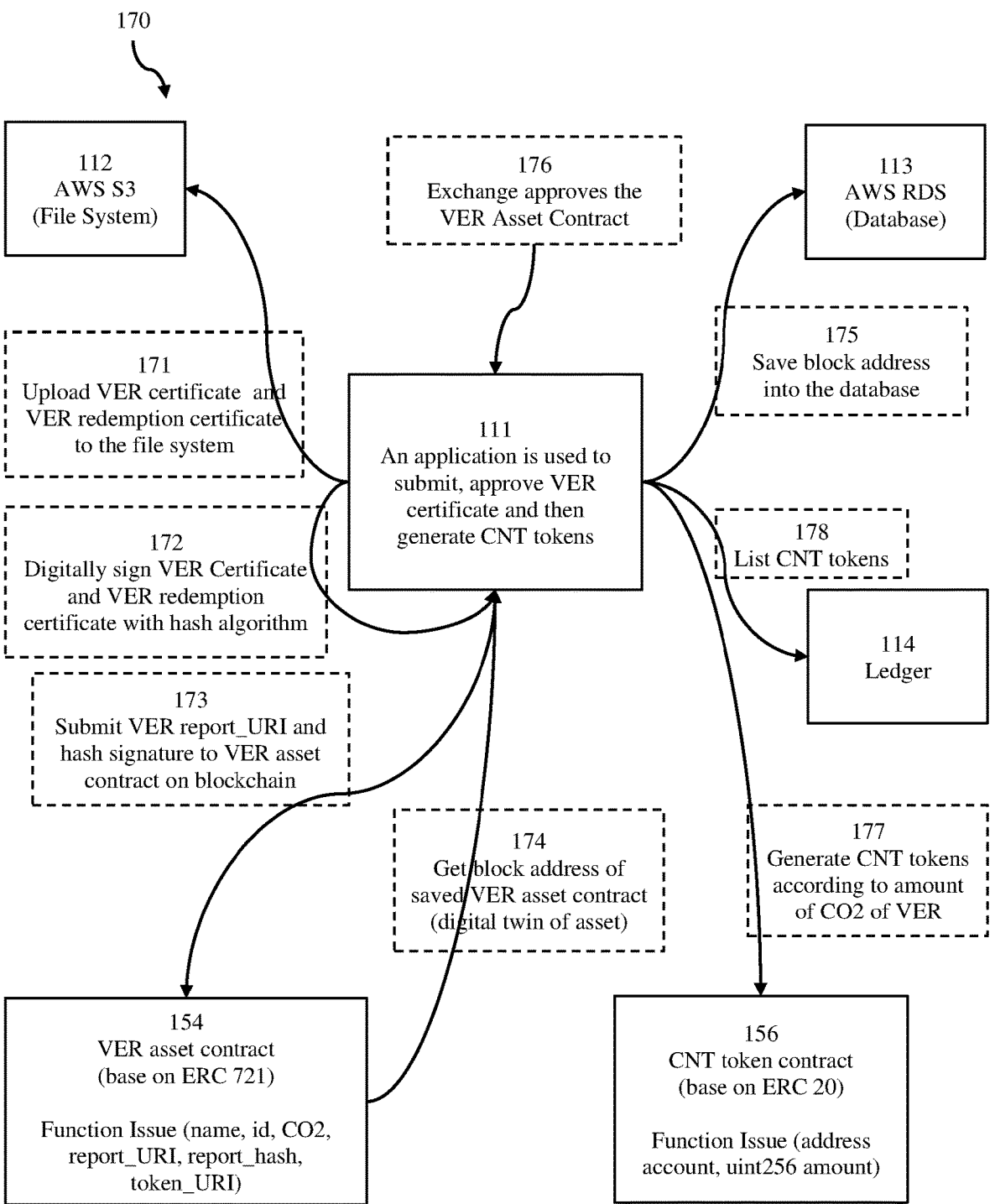

170

112
AWS S3
(File System)

176
Exchange approves the
VER Asset Contract

113
AWS RDS
(Database)

171
Upload VER certificate and
VER redemption certificate
to the file system

175
Save block address
into the database

111
An application is used to
submit, approve VER
certificate and then
generate CNT tokens 172
Digitally sign VER Certificate
and VER redemption
certificate with hash algorithm 178
List CNT tokens 114
Ledger 173
Submit VER report_URI and
hash signature to VER asset
contract on blockchain 174
Get block address of
saved VER asset contract
(digital twin of asset)

177
Generate CNT tokens
according to amount
of $CO_2$ of VER

154
VER asset contract
(base on ERC 721)

Function Issue (name, id, CO2,
report_URI, report_hash,
token_URI)

156
CNT token contract
(base on ERC 20)

Function Issue (address
account, uint256 amount)

FIG. 1D

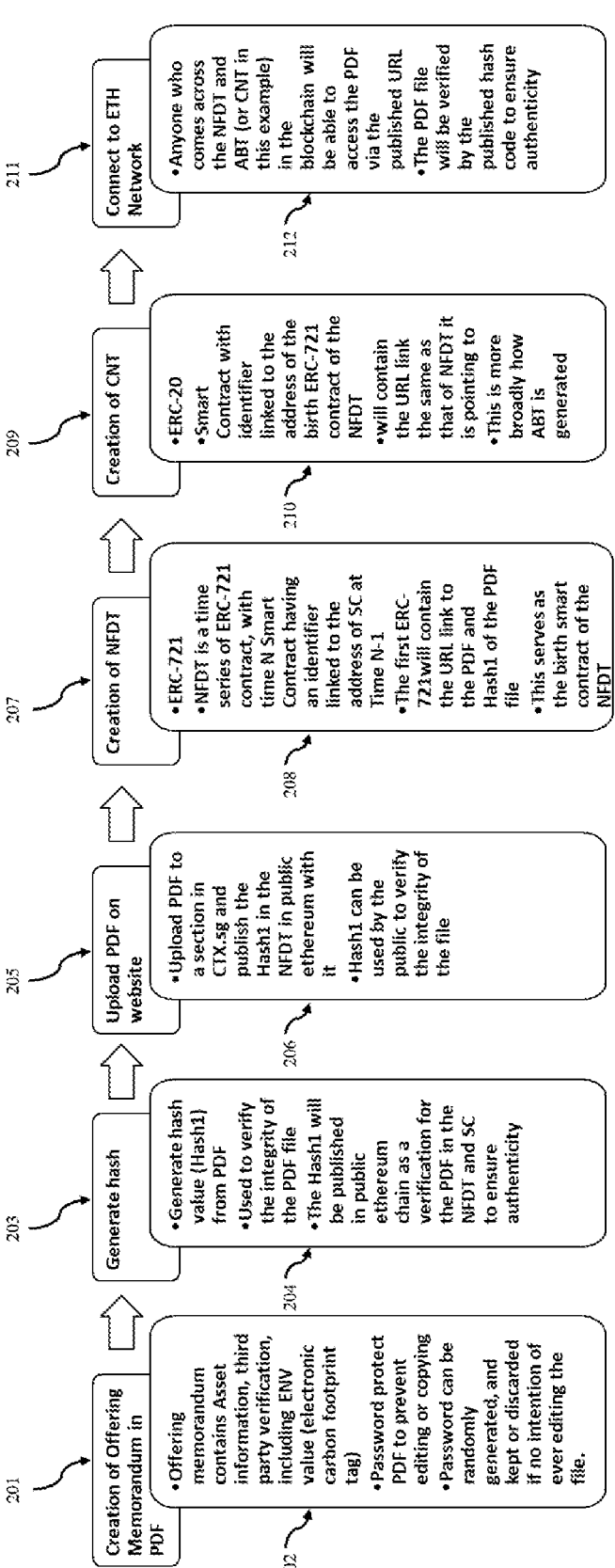

FIG. 2A

201 — Creation of Offering Memorandum in PDF

202
- Offering memorandum contains Asset information, third party verification, including ENV value (electronic carbon footprint tag)
- Password protect PDF to prevent editing or copying
- Password can be randomly generated, and kept or discarded if no intention of ever editing the file.

203 — Generate hash

204
- Generate hash value (Hash1) from PDF
- Used to verify the integrity of the PDF file
- The Hash1 will be published in public ethereum chain as a verification for the PDF in the NFDT and SC to ensure authenticity

205 — Upload PDF on website

206
- Upload PDF to a section in CTX.sg and publish the Hash1 in the NFDT in public ethereum with it
- Hash1 can be used by the public to verify the integrity of the file

207 — Creation of NFDT

208
- ERC-721
- NFDT is a time series of ERC-721 contract, with time N Smart Contract having an identifier linked to the address of SC at Time N-1
- The first ERC-721 will contain the URL link to the PDF and Hash1 of the PDF file
- This serves as the birth smart contract of the NFDT

209 — Creation of CNT

210
- ERC-20
- Smart Contract with identifier linked to the address of the birth ERC-721 contract of the NFDT
- will contain the URL link the same as that of NFDT it is pointing to
- This is more broadly how ABT is generated

211 — Connect to ETH Network

212
- Anyone who comes across the NFDT and ABT (or CNT in this example) in the blockchain will be able to access the PDF via the published URL
- The PDF file will be verified by the published hash code to ensure authenticity

300

310

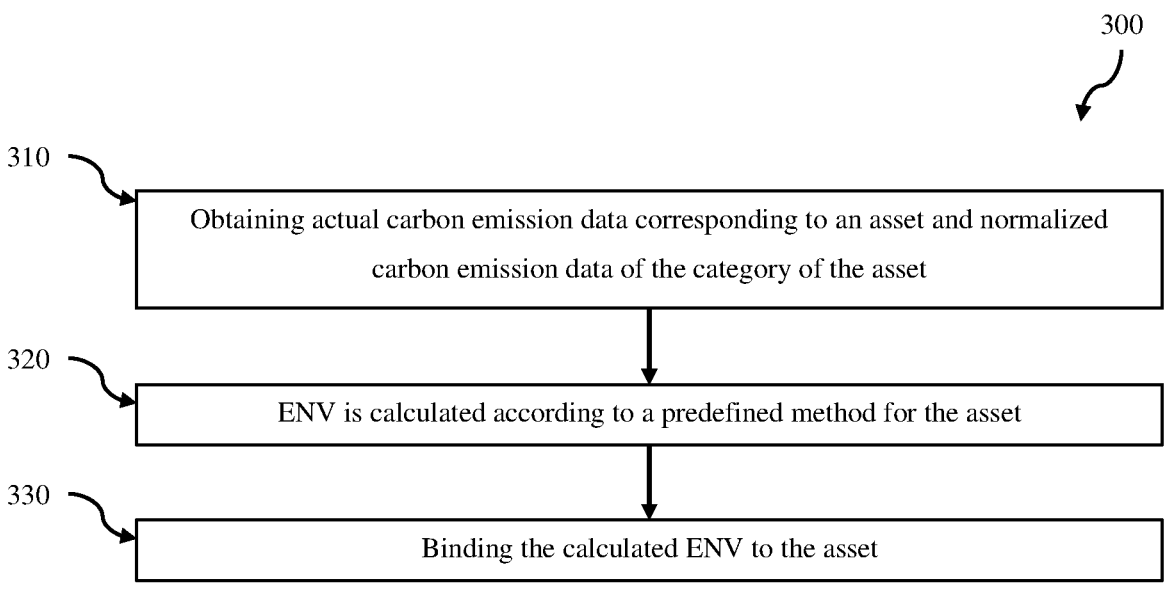

Obtaining actual carbon emission data corresponding to an asset and normalized carbon emission data of the category of the asset

320

ENV is calculated according to a predefined method for the asset

330

Binding the calculated ENV to the asset

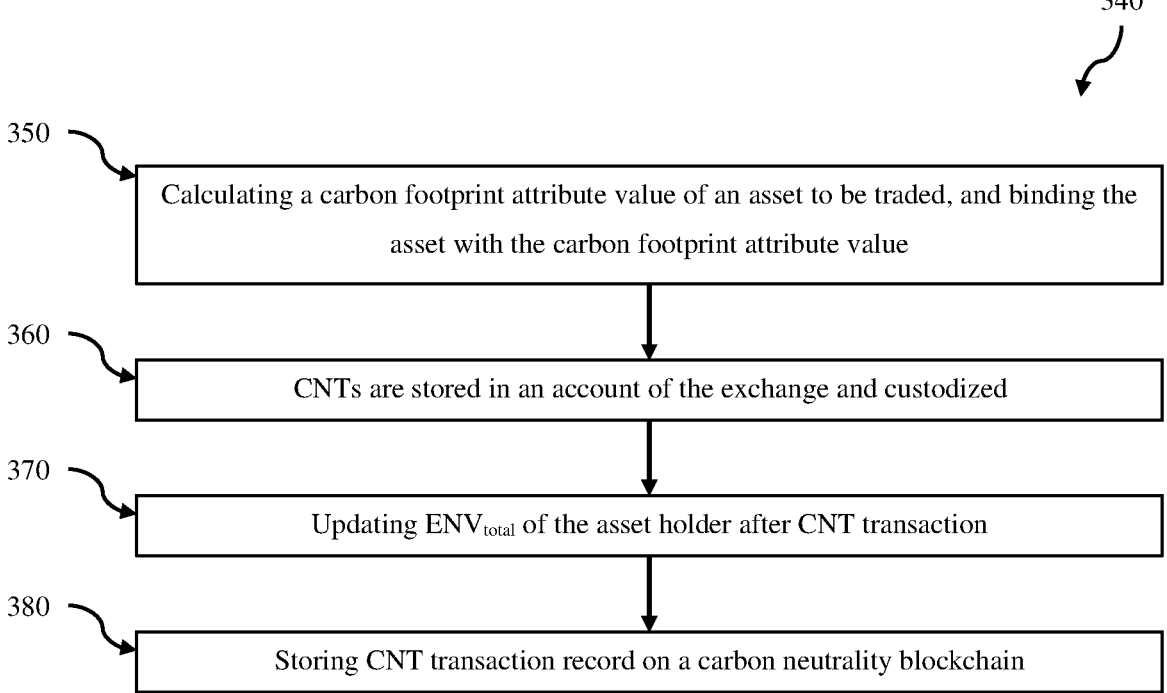

Calculating a carbon footprint attribute value of an asset to be traded, and binding the asset with the carbon footprint attribute value

360

CNTs are stored in an account of the exchange and custodized

370

Updating $ENV_{total}$ of the asset holder after CNT transaction

380

Storing CNT transaction record on a carbon neutrality blockchain

FIG. 3B

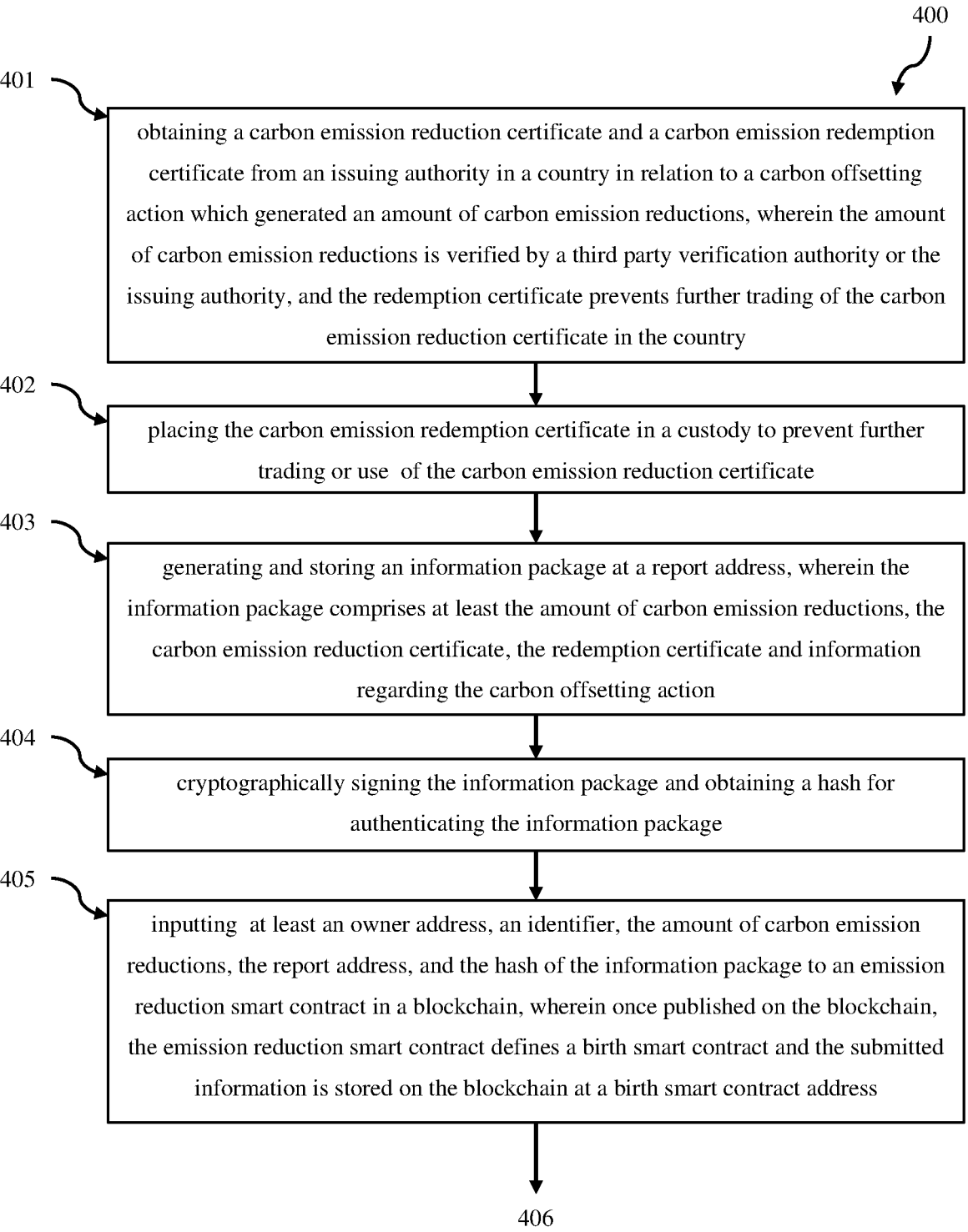

400

401
obtaining a carbon emission reduction certificate and a carbon emission redemption certificate from an issuing authority in a country in relation to a carbon offsetting action which generated an amount of carbon emission reductions, wherein the amount of carbon emission reductions is verified by a third party verification authority or the issuing authority, and the redemption certificate prevents further trading of the carbon emission reduction certificate in the country 402
placing the carbon emission redemption certificate in a custody to prevent further trading or use of the carbon emission reduction certificate 403
generating and storing an information package at a report address, wherein the information package comprises at least the amount of carbon emission reductions, the carbon emission reduction certificate, the redemption certificate and information regarding the carbon offsetting action 404
cryptographically signing the information package and obtaining a hash for authenticating the information package 405
inputting at least an owner address, an identifier, the amount of carbon emission reductions, the report address, and the hash of the information package to an emission reduction smart contract in a blockchain, wherein once published on the blockchain, the emission reduction smart contract defines a birth smart contract and the submitted information is stored on the blockchain at a birth smart contract address

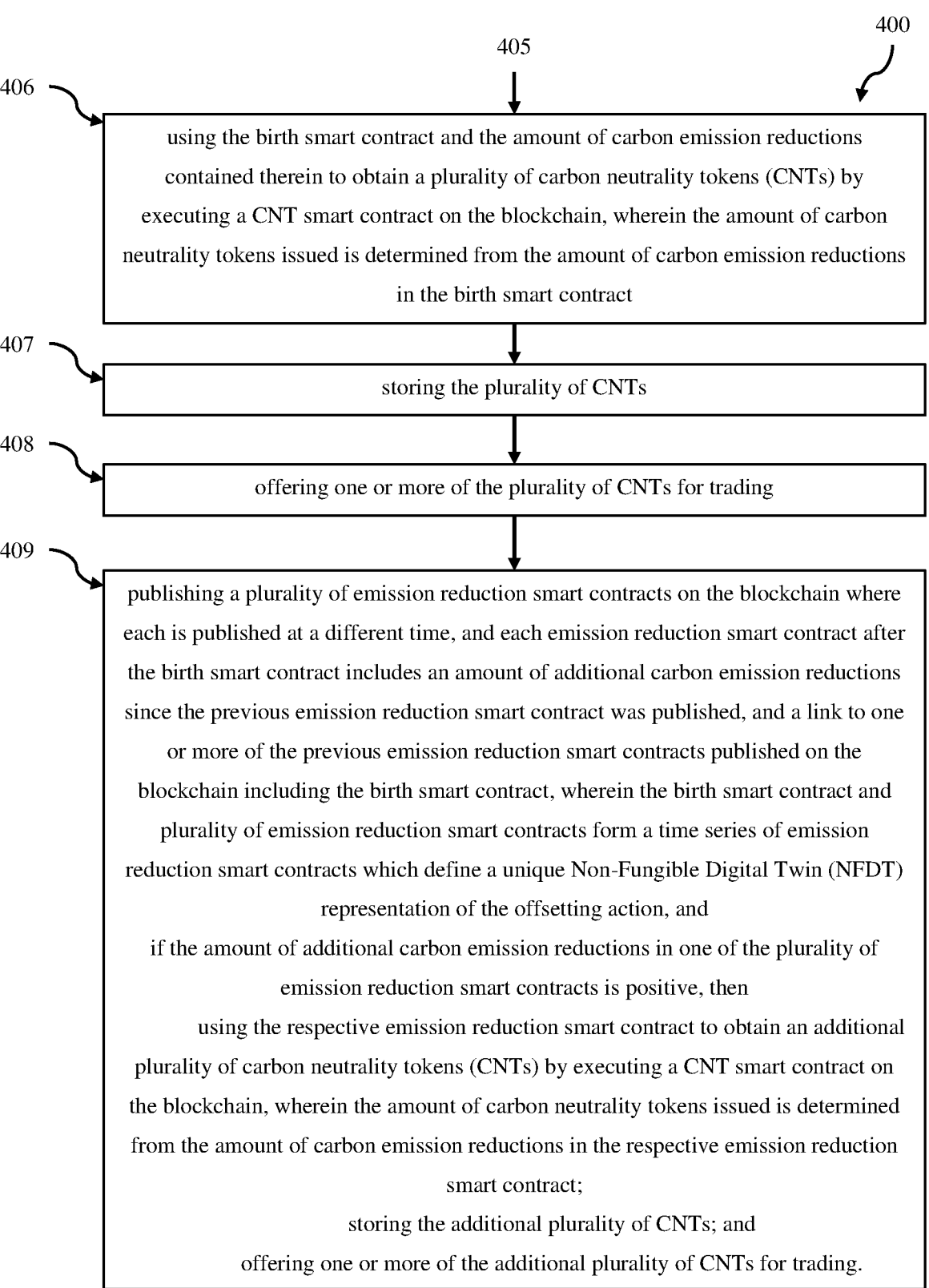

using the birth smart contract and the amount of carbon emission reductions contained therein to obtain a plurality of carbon neutrality tokens (CNTs) by executing a CNT smart contract on the blockchain, wherein the amount of carbon neutrality tokens issued is determined from the amount of carbon emission reductions in the birth smart contract

407 storing the plurality of CNTs

408 offering one or more of the plurality of CNTs for trading

409 publishing a plurality of emission reduction smart contracts on the blockchain where each is published at a different time, and each emission reduction smart contract after the birth smart contract includes an amount of additional carbon emission reductions since the previous emission reduction smart contract was published, and a link to one or more of the previous emission reduction smart contracts published on the blockchain including the birth smart contract, wherein the birth smart contract and plurality of emission reduction smart contracts form a time series of emission reduction smart contracts which define a unique Non-Fungible Digital Twin (NFDT) representation of the offsetting action, and if the amount of additional carbon emission reductions in one of the plurality of emission reduction smart contracts is positive, then using the respective emission reduction smart contract to obtain an additional plurality of carbon neutrality tokens (CNTs) by executing a CNT smart contract on the blockchain, wherein the amount of carbon neutrality tokens issued is determined from the amount of carbon emission reductions in the respective emission reduction smart contract;

storing the additional plurality of CNTs; and offering one or more of the additional plurality of CNTs for trading.

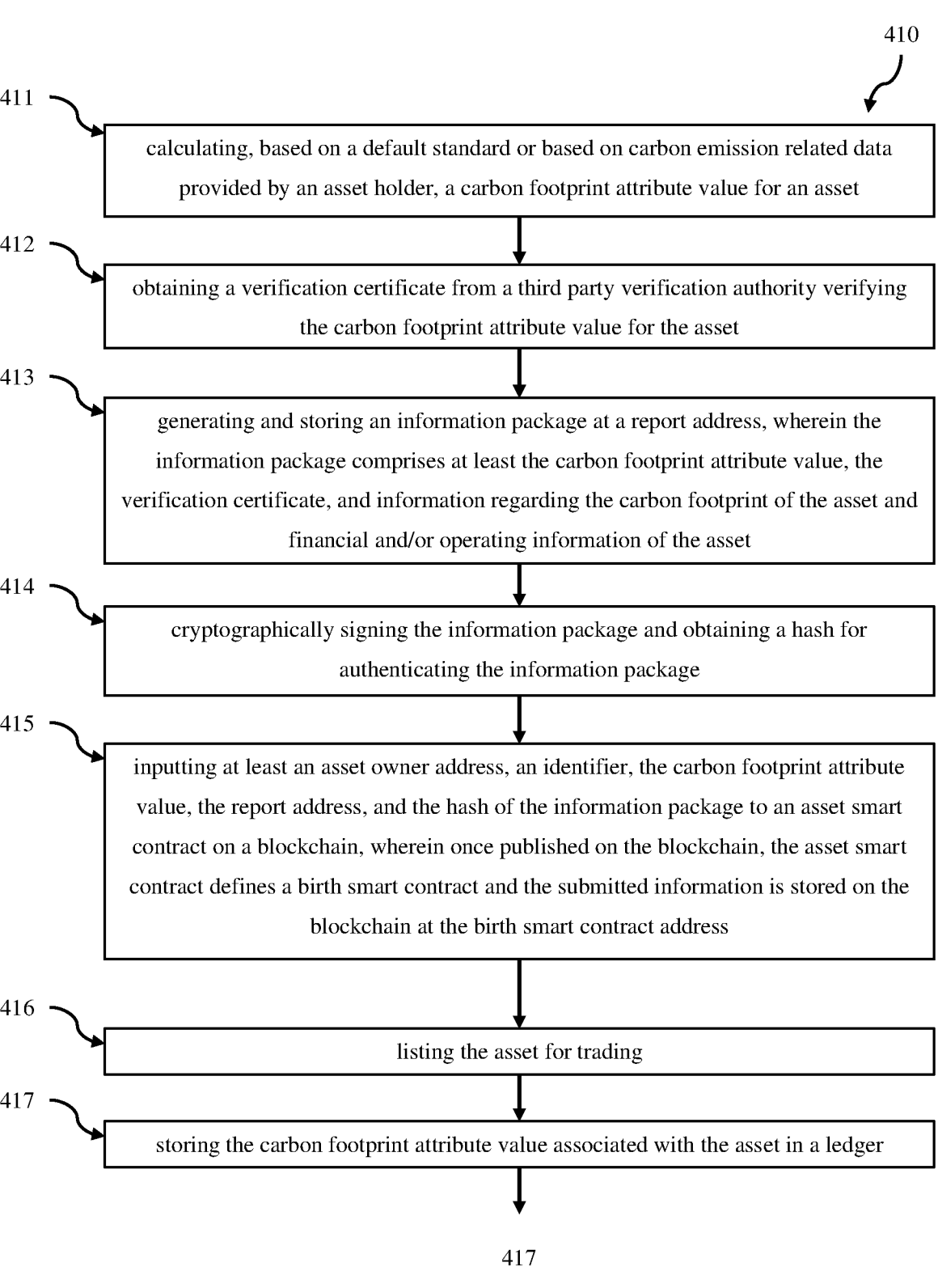

411 calculating, based on a default standard or based on carbon emission related data provided by an asset holder, a carbon footprint attribute value for an asset

412 obtaining a verification certificate from a third party verification authority verifying the carbon footprint attribute value for the asset

413 generating and storing an information package at a report address, wherein the information package comprises at least the carbon footprint attribute value, the verification certificate, and information regarding the carbon footprint of the asset and financial and/or operating information of the asset

414 cryptographically signing the information package and obtaining a hash for authenticating the information package

415 inputting at least an asset owner address, an identifier, the carbon footprint attribute value, the report address, and the hash of the information package to an asset smart contract on a blockchain, wherein once published on the blockchain, the asset smart contract defines a birth smart contract and the submitted information is stored on the blockchain at the birth smart contract address

416 listing the asset for trading

417 storing the carbon footprint attribute value associated with the asset in a ledger

417

418 publishing a plurality of asset smart contracts on the blockchain where each is published at a different time, and each asset smart contract after the birth smart contract includes an amount of additional carbon emissions since the previous asset smart contract was published, and a link to one or more of the previous asset smart contracts published on the blockchain including the birth smart contract, wherein the birth smart contract and plurality of asset smart contracts form a time series of emission reduction smart contracts which define a unique Non-Fungible Digital Twin (NFDT) representation of the asset, and after additional asset smart contract is published the carbon footprint attribute value associated with the asset in the ledger is updated based on the amount of additional carbon emissions

FIG. 4D

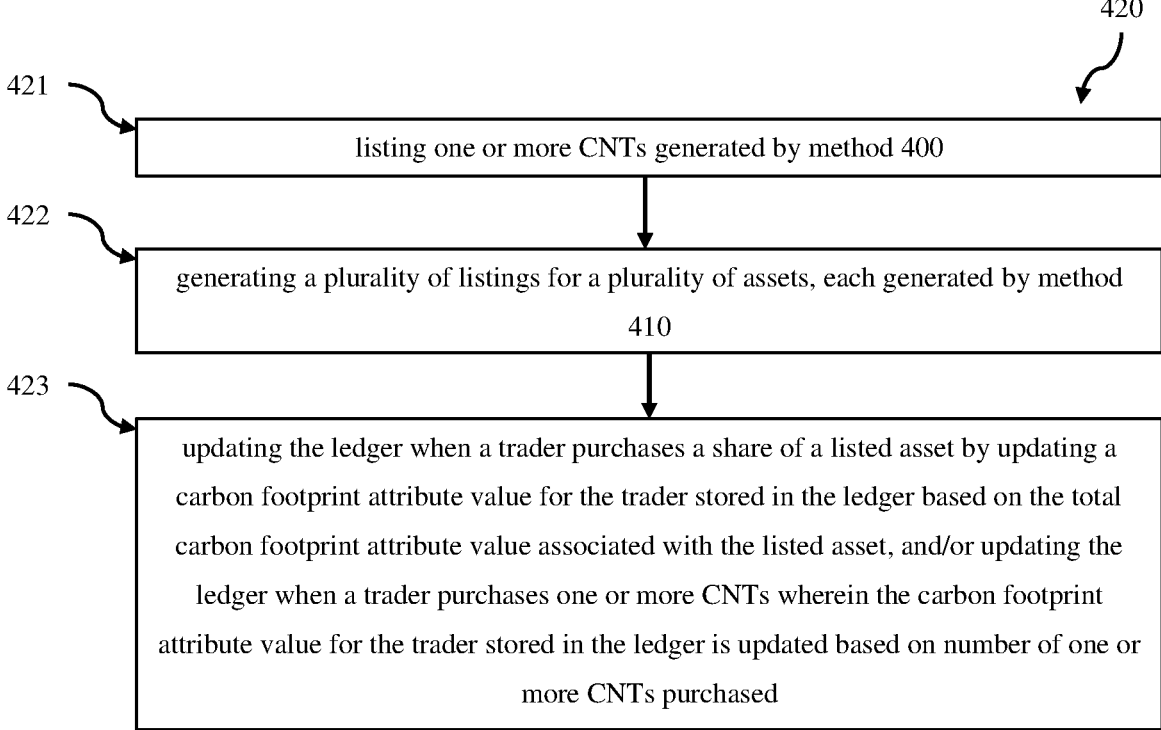

420

421 listing one or more CNTs generated by method 400

422 generating a plurality of listings for a plurality of assets, each generated by method 410

423 updating the ledger when a trader purchases a share of a listed asset by updating a carbon footprint attribute value for the trader stored in the ledger based on the total carbon footprint attribute value associated with the listed asset, and/or updating the ledger when a trader purchases one or more CNTs wherein the carbon footprint attribute value for the trader stored in the ledger is updated based on number of one or more CNTs purchased

METHOD AND SYSTEM FOR TRADING ASSETS AND THEIR CARBON FOOTPRINT STATUS

CROSS-REFERENCE TO RELATED APPLICATIONS

This application is the United States national phase of International Patent Application No. PCT/SG2021/050417 filed Jul. 15, 2021, and claims priority to Chinese Patent Application No. 202110438834.0 filed Apr. 22, 2021, the disclosures of which are hereby incorporated by reference in their entireties.

BACKGROUND OF THE INVENTION

Field of the Invention

The present application relates to asset trading, and in particular to systems and methods for global trading of carbon emission reduction credits and assets taking into account their carbon footprint.

Description of Related Art

Carbon taxing and carbon trading constitute the main mechanism for global carbon pricing and emission reduction at present; however, there remains a huge gap from the goals of efficient inter-country and inter-organizational carbon transfer, carbon emission reduction and carbon pricing proposed in the Paris Agreement.

The current carbon trading market has a number of issues, for instance, lack of information transparency: companies unwilling to disclose information on carbon emissions, total amount of carbon allowances, carbon credit schemes and trading data, information asymmetry between trading entities, and lack of information transparency in the carbon trading market, etc.; fragmentation of participation: there is no mature linkage mechanism between the variety of countries and regions around the world, and various actors involved in carbon emission, carbon absorption and carbon offsetting such as governments, manufacturing companies, environmental organizations, individual consumers and non-profit environmental organizations are divided and disconnected from each other, without a unified platform and mechanism for interaction; low level of marketization: the current carbon emission reduction policies and carbon emission trading mechanisms of the governments around the world are based on the agreements reached under the Kyoto Protocol, which are more of an administrative action, with insufficient marketization, inability to organize effective participation of consumer-level individuals and inability to achieve interconnection and linkage between individuals of the society; lack of individual awareness of participation and mechanism of participation: consumption is an important source of carbon emissions, but most individual consumers are not sufficiently aware of individual responsibilities for carbon emission reduction and do not have a feasible mechanism of participation.

Specifically, in the existing carbon trading system, the governments' carbon policy, especially on carbon allowance issuance, is the foundation stone of the carbon market and carbon pricing. However, the pre-establishment of a total amount of carbon allowances forms a conditioned supply-and-demand relationship that is difficult to adapt to changes in demand due to economic fluctuations (Chevallier, Pen, & Sevi, 2011, Option introduction and volatility in the EU ETS. Resource and Energy Economics, 33(4), 855-880) and can even be strongly leaning toward carbon emitting entities (Breetz, Mildenberger & Stokes, 2018, The Political Logics of Clean Energy Transitions. Business and Politics, 20(4), 492-522). The over-reliance on policies causes inflexibility in timing and backward adjustment mechanism, and seriously affects effective, market-based carbon pricing.

One of the most significant challenges facing the current global carbon trading markets is that they are highly fragmented and lack of an effective cross-border trading mechanism to form a global carbon trading system. Theoretically, carbon emission is a global issue faced by all parties on earth and hence a global trading system, on either carbon allowance or carbon voluntary emission reduction, should be formed and well governed to resolve this issue. However, the Nationally Determined Contribution ("NDC") specifies the contribution of carbon emission reduction by each country, and hence unfortunately created a "sovereign ownership" issue of any carbon emission reduction efforts (including voluntary emission reductions) as the each specific country tries to meet its own NDC target. This makes the free transfer of carbon emission reduction credit across border impractical, which is ironic given carbon should be a global matter and dealt with on a global basis. Article 6 of Paris Agreement is designed to address this issue, to create a cross-border and global trading system for carbon emission reduction credits. However, to this date, Article 6 of Paris Agreement remains under negotiations among world power and hence various stakeholders globally are in holding patterns waiting for further negotiations and hopefully, eventual sanction of Article 6 of Paris agreement. This thus creates issues associated with separation of participants, and the lack of a firmly established linkage mechanism across countries and global regions. As outlined above, carbon allowances are issued on a national or regional basis, and their allocation and compliance are based on the carbon emissions produced by emission control companies, with no consideration of carbon emissions that are transferred outside the borders through products or services (transferred carbon emissions). For example, some studies have shown that 15-23% of China's carbon emissions is generated by production in order to satisfy the products and services requirements from developed economies, and China's carbon responsibility based on its domestic consumption is much lower than that based on its production (Li, Xu, Wang, Zhang, & Yu, 2020, Industrial path analysis for CO2 transfers induced by final consumption: A comparison of the United States and China. Journal of Cleaner Production, 251, doi.org/10.1016/j.jclepro.2019.119604; Zhang & Peng, 2016, Analysis on CO2 Emissions Transferred from Developed Economies to China through Trade. China & World Economy, 24(2), 68-69). Although the international carbon credit mechanism allows for international trading of emission rights, it does not effectively track and price all transferred carbon emissions, being not counted or double-counted often occurs. At the same time, high emitting companies shift their productivity to countries and regions with more moderate allowances and carbon tax policies, creating a "carbon leakage" problem (CEPS, 2014, Carbon Leakage: Options for the EU). Monitoring the pathways and scale of regional and international carbon emission transfers and incorporating them into policies related to carbon trading and carbon pricing would be a basis for more effective carbon pricing.

Since high-emitting industries and companies (e.g., thermal power, cement, steel) are the main actors in carbon emission allowance allocation and compliance regulation, the costs of proactive emission reduction are first borne by these entities and then passed on to downstream industries and end consumers. On one hand, depending on the competitive market position of the energy or products provided by the emission control companies, passing on carbon emission reduction costs through higher product prices may cause the companies to lose market share in competition with international rivals with lower carbon intensity or more moderate carbon emission reduction policies (Aldy & Pizer, 2015; Fowlie, Regaunt, & Ryan, Market-Based Emissions Regulation and Industry Dynamics. Journal of Political Economy, 124(1), 249-302). On the other hand, when emission allowances are issued in excess, the companies may profit from the zero cost of allowances, and this part of carbon cost cannot be passed on to the downstream.

There is also a disconnection between carbon emission reduction of the consumer sector and the carbon market. Consumption is an important source of carbon emissions. UNEP estimates that consumption-related carbon emissions, including emissions associated with the use of products and services by households, account for 65-72% of global carbon emissions (UNEP, 2020, Emissions Gap Report 2020). To meet the climate targets set out in the Paris Agreement, carbon emissions from the consumer sector need to be reduced from the current level of over 3 tCO2e per capita to 0.7 tCO2e per capita in 2050 (UNEP, 2020). In the consumer (or consumption) sector, the change in consumption behavior through an "Avoid-Shift-Improve" (ASI) approach will potentially generate a huge volume of emission reduction. It is expected to generate 3 tCO2e per capita emission reduction through improvements in transportation, food and residential energy use. In developed countries where consumption habits have a high carbon footprint, this reduction potential is as high as 15 tCO2e per capita (Ivanova, and others, 2020, Quantifying the potential for climate change mitigation of consumption options. 15(9), doi. org/10.1088/1748-9326/ab8589). However the existing carbon trading market is mainly focused on emission control in high-emitting industrial sectors and carbon credit trading for medium and large emission reduction projects, while in the consumer consumption sector, which is tiny per capita but huge in total carbon neutrality, there is a lack of an efficient and decentralized mechanism that can enable participation in carbon trading and form a rapid response and reward ASI consumption habits.

It is also difficult for investors to assess the carbon status of companies they wish to invest in (for example to invest in companies contributing to emission reductions or which offset their emissions). At present, mainstream exchanges, including London Stock Exchange, New York Stock Exchange, Nasdaq and Hong Kong Exchanges and Clearing Limited, require listed companies to follow international standards such as Carbon Disclosure Project (CDP), Climate Disclosure Standards Board (CDSB), GRI, SASB and TCFD for mandatory disclosure or semi-mandatory disclosure of environment, social and governance (ESG) and other non-financial indicators. The disclosure of the environment component is usually required, according to GRI or similar standards, to include direct and indirect $CO_2$ emissions or $CO_2$ equivalents from other greenhouse gas emissions from the company's production activities and energy consumption. Companies are also encouraged to disclose their carbon offsetting results in direct $CO_2$ or $CO_2$ equivalent from other greenhouse gas emissions from their carbon offsetting actions during the reporting period.

Corporate carbon emissions and carbon offsetting are disclosed in the trading market usually in the form of a social responsibility report or ESG report for a specific reporting period (generally every year); however, investors have to construct their ESG investment strategies and asset portfolios by correlating ESG indices and financial returns of assets on a more macro scale, and cannot grasp the ESG attributes and economic value of the assets they trade and hold in real time and quantitatively. Thus at present it is very difficult for investors to use this information or grasp the economic value of assets they trade and hold in real-time.

In conclusion, the current carbon trading market has high barriers to entry, and is difficult for investors to assess the carbon status of investments and for consumers to participate in, and there are many restrictions. Notably there is a lack of information transparency with current ESG reporting requirements and many companies are unwilling to disclose all relevant information regarding carbon emissions, emission allowance, quota plans and trading data. The participants are separated and there is no firmly established linkage mechanism across countries and global regions (i.e. there is not an effective cross-border trading mechanism). There is a low degree of marketization with carbon reduction policies and carbon emission trading mechanisms being driven by Governments and do not encourage consumer participation. For the majority of consumers, there is insufficient awareness of how to contribute to carbon emission reductions and no feasible mechanism for participation. Additionally it is difficult for investors to identify the carbon status of companies and thus encourage investment in carbon neutral companies. Based on the current rules and status quo of the carbon trading market, it is difficult to quickly achieve the internationally set global carbon emission reduction targets.

There is thus a need to provide improved systems and methods for effective global trading of carbon emission reduction credits and assets taking into account their carbon footprint, or at least provide a useful alternative to existing markets and systems.

SUMMARY

According to a first aspect of the present application there is provided a method for generating a plurality of carbon neutrality tokens representing carbon offsetting action for trading, comprising:

obtaining a carbon emission reduction certificate and a carbon emission redemption certificate from an issuing authority in a country in relation to a carbon offsetting action which generated an amount of carbon emission reductions, wherein the amount of carbon emission reductions is verified by a third party verification authority or the issuing authority, and the redemption certificate prevents further trading of the carbon emission reduction certificate in the country;

placing the carbon emission redemption certificate in a custody to prevent further trading or use of the carbon emission reduction certificate;

generating and storing an information package at a report address, wherein the information package comprises at least the amount of carbon emission reductions, the carbon emission reduction certificate, the redemption certificate and information regarding the carbon offsetting action;

cryptographically signing the information package and obtaining a hash for authenticating the information package;

inputting at least an owner address, an identifier, the amount of carbon emission reductions, the report address, and the hash of the information package to an emission reduction smart contract in a blockchain, wherein once published on the blockchain, the emission reduction smart contract defines a birth smart contract and the submitted information is stored on the blockchain at a birth smart contract address;

using the birth smart contract and the amount of carbon emission reductions contained therein to obtain a plurality of carbon neutrality tokens (CNTs) by executing a CNT smart contract on the blockchain, wherein the amount of carbon neutrality tokens issued is determined from the amount of carbon emission reductions in the birth smart contract;

storing the plurality of CNTs;

offering one or more of the plurality of CNTs for trading;

publishing a plurality of emission reduction smart contracts on the blockchain where each is published at a different time, and each emission reduction smart contract after the birth smart contract includes an amount of additional carbon emission reductions since the previous emission reduction smart contract was published, and a link to one or more of the previous emission reduction smart contracts published on the blockchain including the birth smart contract, wherein the birth smart contract and plurality of emission reduction smart contracts form a time series of emission reduction smart contracts which define a unique Non-Fungible Digital Twin (NFDT) representation of the offsetting action, and if the amount of additional carbon emission reductions in one of the plurality of emission reduction smart contracts is positive, then using the respective emission reduction smart contract to obtain an additional plurality of carbon neutrality tokens (CNTs) by executing a CNT smart contract on the blockchain, wherein the amount of carbon neutrality tokens issued is determined from the amount of carbon emission reductions in the respective emission reduction smart contract;

storing the additional plurality of CNTs; and offering one or more of the additional plurality of CNTs for trading.

In one form for each emission reduction smart contract in the plurality of emission reduction smart contracts, the method further comprises:

obtaining a subsequent carbon emission reduction certificate and a subsequent carbon emission redemption certificate from the issuing authority in the country in relation to the carbon offsetting action which generated the additional amount of carbon emission reductions, wherein the additional amount of carbon emission reductions is verified by a third party verification authority or the issuing authority, and the subsequent redemption certificate prevents further trading of the carbon emission reduction certificate in the country;

placing the subsequent carbon emission redemption certificate in the custody to prevent further trading or use of the subsequent carbon emission reduction certificate;

generating and storing an subsequent information package at a subsequent report address, wherein the subsequent information package comprises at least the amount of additional carbon emission reductions, the subsequent carbon emission reduction certificate, and the subsequent redemption certificate;

cryptographically signing the subsequent information package and obtaining a subsequent hash for authenticating the subsequent information package; and inputting at least the owner address, the identifier, the additional amount of carbon emission reductions, the subsequent report address, and subsequent the hash of the subsequent information package to the emission reduction smart contract in the blockchain, wherein once published on the blockchain the emission reduction smart contract forms a subsequent emission reduction smart contract of the NFDT and the submitted information is stored on the blockchain at a subsequent smart contract address.

In one form, the one or more of the plurality of CNTs are offered for trading outside of the country which issued the carbon emission reduction certificate.

In one form, the CNTs are offered for trading on a digital asset trading exchange which maintains a ledger of CNTs for trading on the digital asset trading exchange, and the plurality of CNTs are stored in a cold wallet associated with digital asset trading exchange.

In a further form, the digital asset trading exchange comprises a plurality of listings where each listing is a digital representation of an asset that is available for trading on the digital asset trading exchange by an issuing entity, and the ledger stores a carbon footprint attribute value of each listed asset.

In a further form, an issuing entity of an asset with a carbon offsetting action creates an NFDT on the digital asset trading exchange to represent the asset associated with a carbon offsetting action and lists a plurality of asset-backed tokens each with a zero carbon footprint attribute value representing a financial and/or operational aspect of the asset and a plurality of CNTs generated due to the carbon offsetting action;

an issuing entity of an asset that generates carbon emissions creates an NFDT on the digital asset trading exchange to represent the asset that generates the carbon emissions and lists a plurality of asset-backed tokens each with a negative carbon footprint attribute value due to carbon emissions associated with the asset, wherein the carbon footprint attribute value is updated on the ledger as additional carbon emissions data is obtained over time, wherein the carbon footprint attribute value for each listing traded on the digital asset trading exchange is tracked through the ledger of the digital asset trading exchange, and the digital asset trading exchange is configured to provide an investor on the digital asset trading exchange holding a portfolio of investments on the exchange with a portfolio value of the portfolio and a carbon footprint attribute value of the portfolio obtained by summing the carbon footprint attribute value of each investment in the portfolio of investments.

In a further form, each listing further comprises one or more Environmental Social and Governance (ESG) metrics, and the ledger tracks each of one or more ESG metrics of each listing, and the digital asset trading exchange is configured to provide an investor on the digital asset trading exchange with a summary of each of the one or more ESG metrics obtaining by summing each of the one or more ESG metrics of each investment in the portfolio of investments.

In a further form, the CNTs are offered for trading on the digital asset trading exchange as part of a bundle with one or more of the plurality of listings to offset the carbon footprint attribute value of the respective one or more assets associated with the one or more listings.

In one form, the method further comprises permanently freezing one or more CNTs of the plurality of CNTs to achieve carbon neutrality of an neutralization asset comprising:

purchasing, by a first entity, a neutralization amount of CNTs on the exchange;

submitting, by the first entity, a neutralization information package to the digital asset trading exchange comprising at least information on the neutralization asset to be neutralized, a certification of a carbon footprint of the neutralization asset obtained from a third party verification authority, and the purchased neutralization amount of CNTs to be used to offset the carbon footprint;

removing the purchased CNTs from trading on the digital trading exchange and removing from the ledger entry of the first entity;

cryptographically signing the neutralization information package by the digital asset trading exchange and obtaining a neutralization hash for authenticating the neutralization information package;

creating a node on a public carbon neutrality blockchain comprising an address of the neutralization information package, the neutralization hash, and a record indicating that the purchased CNTs are permanently frozen; and issuing, by the digital asset trading exchange, a neutralisation certificate linked to the node.

In one form, the method further comprises collecting carbon offsetting data from the carbon offsetting action and submitting the carbon emission data to the third party verification authority to obtain the verified amount of carbon emission reductions.

In a further form, the carbon offsetting data is obtained using a secure data acquisition system comprising a plurality of hardware and software components which are configured to securely collect and store the carbon offsetting data.

In one form, the blockchain is an Ethereum blockchain, and the emission reduction smart contract is based on the ERC721 standard and the CNT smart contract is based on the ERC20 standard.

In one form, the report address is a Uniform Resource Identifier (URI) address or a Uniform Resource Locator (URL) address.

In one form, the plurality of CNTs are stored in a cold wallet for closed-end custody or on a public blockchain.

According to a second aspect of the present application there is provided a method for generating a digital representation of an asset for trading, comprising:

calculating, based on a default standard or based on carbon emission related data provided by an asset holder, a carbon footprint attribute value for an asset;

obtaining a verification certificate from a third party verification authority verifying the carbon footprint attribute value for the asset, generating and storing an information package at a report address, wherein the information package comprises at least the carbon footprint attribute value, the verification certificate, and information regarding the carbon footprint of the asset and financial and/or operating information of the asset;

cryptographically signing the information package and obtaining a hash for authenticating the information package;

inputting at least an asset owner address, an identifier, the carbon footprint attribute value, the report address, and the hash of the information package to an asset smart contract on a blockchain, wherein once published on the blockchain, the asset smart contract defines a birth smart contract and the submitted information is stored on the blockchain at the birth smart contract address;

listing the asset for trading;

storing the carbon footprint attribute value associated with the asset in a ledger; and publishing a plurality of asset smart contracts on the blockchain where each is published at a different time, and each asset smart contract after the birth smart contract includes an amount of additional carbon emissions since the previous asset smart contract was published, and a link to one or more of the previous asset smart contracts published on the blockchain including the birth smart contract, wherein the birth smart contract and plurality of asset smart contracts form a time series of asset smart contracts which define a unique Non-Fungible Digital Twin (NFDT) representation of the asset, and after additional asset smart contract is published the carbon footprint attribute value associated with the asset in the ledger is updated based on the amount of additional carbon emissions.

In one form, the asset is listed for trading on a digital asset trading exchange, wherein the digital asset trading exchange comprises the ledger.

In one form, if the carbon footprint attribute value is positive, using the asset smart contract to obtain a plurality of carbon neutrality tokens (CNTs) by executing a CNT smart contract on the blockchain and issuing the plurality of CNTs to an issuer and recording on the ledger, wherein the amount of carbon neutrality tokens issued is determined from the carbon footprint attribute value, and the plurality of CNTs are offered for trading, and if the carbon footprint attribute value is negative, using the asset smart contract to obtain a plurality of asset backed tokens by executing an asset backed token smart contract on the blockchain and issuing the ABTs to an issuer and recording on the ledger, wherein the amount of asset backed tokens issued is determined from the financial and/or operating information of the asset.

In one form, the method further comprises collecting carbon emissions data from the asset and submitting the carbon emission data to the third party verification authority to obtain the verified amount of carbon emission reductions.

In a further form, the carbon emissions data is obtained using a secure data acquisition system comprising a plurality of hardware and software components which are configured to securely collect and store the carbon emissions data.

In one form, the blockchain is an Ethereum blockchain, and the asset smart contract is based on the ERC721 standard and the asset backed tokens smart contract is based on the ERC20 standard.

In one form, the report address is a Uniform Resource Identifier (URI) address or a Uniform Resource Locator (URL) address.

According to a third aspect of the present application there is provided a method for trading on a digital asset trading exchange comprising a ledger, the method comprising: listing one or more CNTs generated by the method the first aspect; generating a plurality of listings for a plurality of assets, each generated by the method of the second aspect; updating the ledger when a trader purchases a share of a listed asset by updating a carbon footprint attribute value for the trader stored in the ledger based on the total carbon footprint attribute value associated with the listed asset, and/or updating the ledger when a trader purchases one or more CNTs wherein the carbon footprint attribute value for the trader stored in the ledger is updated based on number of one or more CNTs purchased.

In one form, the trader may purchase a bundle, wherein the bundle comprises a share of a listed asset, and an amount of CNTs to offset the carbon emissions associated with the share of the listed asset.

According to a fourth aspect of the present application there is provided an asset trading system, comprising:

a plurality of computing apparatus comprising one or more processors, one or more memories, one or more storage devices, and one or more interfaces wherein the one or more interfaces are configured to receive and store one or more information packages in the one or more storage devices, and the plurality of computing apparatus are configured to perform the method of any one of the first, second or third aspects.

In one form, the plurality of computing apparatus are configured to implement a blockchain.

In one form, the plurality of computing apparatus are further configured to implement a digital trading exchange, and the one or more storage devices configured to implement a ledger and a cold wallet.

In one form, the system further comprises a secure data acquisition system comprising a plurality of hardware and software components which are configured to securely collect and store carbon offsetting data and carbon emission data generated by one or more assets.

According to a fourth aspect of the present application there is provided a computer readable storage medium having a computer program stored thereon, the computer program implementing the method of any one of the first, second or third aspects when executed by a processor.

According to a fifth aspect of the present application there is provided a method for generating a Non-Fungible Digital Twin (NFDT) of an asset comprising:

generating and storing an information package at a report address, wherein the information package comprises information regarding an asset including at least one attribute value;

cryptographically signing the information package and obtaining a hash for authenticating the information package;

inputting at least an owner address, an identifier, the at least one attribute value, the report address, and the hash of the information package to an asset smart contract in a blockchain, wherein once published on the blockchain, the smart contract defines a birth smart contract and the submitted information is stored on the blockchain at a birth smart contract address;

using the birth smart contract to obtain a plurality of Asset Backed Tokens (ABTs) by executing a ABT smart contract on the blockchain, wherein the amount of asset backed tokens issued is determined from the at least one attribute value in the birth smart contract; storing the plurality of ABTs;

offering one or more of the plurality of ABTs for trading; and publishing a plurality of asset smart contracts on the blockchain where each is published at a different time, wherein the value of the at least one attribute value in each asset smart contract after the birth smart contract is the change in the value since the previous asset smart contract was published, and a link to one or more of the previous asset smart contracts published on the blockchain including the birth smart contract, and each smart contract is used to issue, store and offer a plurality of ABTs based on the value in the respective smart contract, wherein the birth smart contract and plurality of smart asset contracts form a time series of asset smart contracts which define a unique Non-Fungible Digital Twin (NFDT) representation of the asset.

BRIEF DESCRIPTION OF THE DRAWINGS

Preferred embodiments of the present application will be described in further detail in conjunction with the accompanying drawings, specifically.

FIG. 1D is a schematic diagram of a method for generating emission reduction smart contracts and carbon neutrality tokens (CNTs) in respect of an offsetting action to create a Non-Fungible Digital Twin (NFDT) representation of the offsetting action according to an embodiment;

FIG. 2A is a flowchart of a method for creating an NFDT and CNTs on a digital trading exchange according to an embodiment;

FIG. 3A is a flow chart of a method for calculating a carbon footprint attribute ENV according to an embodiment of the present application;

FIG. 3B is a flowchart of a method for trading carbon neutrality tokens CNT according to an embodiment of the present application;

FIG. 4A is a flowchart of a first part of a method for generating a plurality of carbon neutrality tokens representing carbon offsetting action for trading according to an embodiment of the present application;

FIG. 4B is a flowchart of a second part of a method for generating a plurality of carbon neutrality tokens representing carbon offsetting action for trading according to an embodiment of the present application;

FIG. 4C is a flowchart of a first part of a method for generating a digital representation of an asset for trading according to an embodiment of the present application;

FIG. 4D is a flowchart of a second part of a method for generating a digital representation of an asset for trading according to an embodiment of the present application;

FIG. 4E is a flowchart of a method for trading on a digital asset trading exchange according to an embodiment of the present application;

DESCRIPTION OF THE INVENTION

Figure 1A:
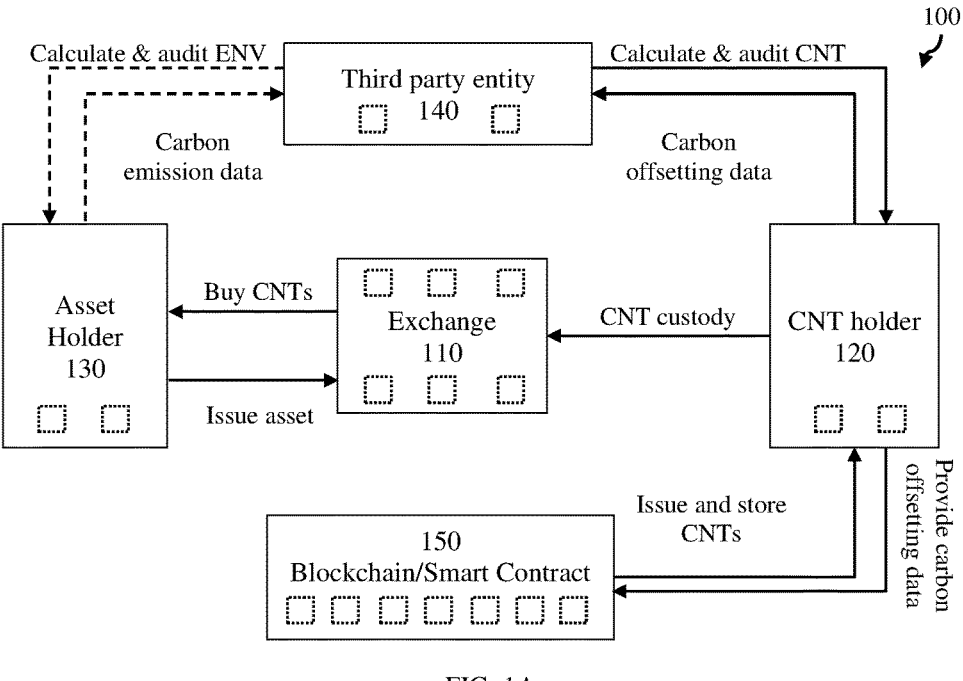
FIG. 1A is an architectural diagram of an asset trading system according to an embodiment of the present application.

For a better understanding of the objects, technical solutions and advantages of the embodiments of the present application, the technical solutions of the embodiments will be described clearly and fully with reference to the accompanying drawings of the embodiments. As a matter of course, the embodiments described herein are merely some examples of the present application; any other embodiment obtained by those skilled in the art based on the embodiments herein without inventive effort shall fall within the scope of protection of the present application.

In the detailed description below, references are made to the accompanying drawings, which are part of the application for illustrating particular embodiments of the application. In the accompanying drawings, similar symbols may denote substantially similar components in different drawings. The particular embodiments of the present application are described in sufficient detail below to enable those skilled in the art to implement the technical solutions of the present application. It is understood that other embodiments, or structural, logical or electrical changes to the embodiments of the present application, may also be used.

ESG disclosure has become mandatory in an increasing number of exchanges, and corporate carbon emissions and carbon offsetting are disclosed in the trading market usually in the form of a social responsibility report or ESG report for a specific reporting period (generally every year); however, investors have to construct their ESG investment strategies and asset portfolios by correlating ESG indices and financial returns of assets on a more macro scale, and cannot grasp the ESG attributes and economic value of the assets they trade and hold in real time and quantitatively.

To address the above problems, the present application provides methods for generating Non-Fungible Digital Twin (NFDT) representations of assets or carbon offsetting actions or projects which represent a time series of smart contracts on a blockchain (for example based on the Ethereum ERC-721 standard), that capture carbon offsetting actions and carbon emissions over time. Carbon offsetting actions can be used to generate Carbon Neutrality Tokens (CNTs; for example based on Ethereum ERC-20 standard). A digital asset trading system may be implemented which allows listing of assets and listing of the CNTs. A ledger is also used to store a carbon footprint attribute value (ENV) of each listed asset. Each asset smart contract includes the carbon footprint (e.g. tonnes of $CO_2$ equivalent or simply tCO2e) generated since the last asset smart contract and is thus the carbon footprint (ENV) is bound to the digital asset. The carbon footprint attribute value (ENV) for each listing traded on the digital asset trading exchange is tracked through the ledger, and the digital asset trading exchange is configured to provide an investor holding a portfolio of investments on the exchange with a portfolio value of the portfolio and a carbon footprint attribute value of the portfolio obtained by summing the carbon footprint attribute value of each investment in the portfolio of investments. Similarly the total carbon footprint attribute value (ENV) of an asset holder can be obtained by summing the carbon footprint attribute value of each listing, and any offsetting CNTs held to provide a mechanism to easily and clearly meet Environmental Social and Governance (ESG) reporting requirements. In particular, the methods described herein (and in particular the process of creating NFDT for an offsetting asset or project) provides methods for creating cross-border carbon credit trading mechanism without triggering NDC constraints and without dependence on Article 6 of Paris agreement. In particular they allow the country in which emission reductions are occurring to record the reductions in their registries and to contribute to their NDC, and to freeze this reduction whilst allowing a digital representation of the asset or project to be created which can be freely traded across borders (whether by the original owner/offset or another party). Emission reductions may also be permanently frozen and used to neutralize the carbon footprint of real world assets.

To address the above problems, the present application provides an asset trading platform or exchange on which the assets to be traded are tagged (bound) with their carbon footprint attribute value (ENV). The carbon footprint attribute (ENV) is an indicator of the carbon emission attached to an asset, and quantifies the carbon emission or carbon offset of the asset, from the date of the asset's existence, relative to its industry-standard baseline emission; that is, an asset's negative/positive contribution to carbon neutrality. This is represented as a numerical value (ENV) and bound to the asset as an intrinsic attribute. We use the shorthand ENV to represent the carbon footprint attribute value and note it could be equivalently considered a carbon neutrality attribute value as together with CNTs it can be used to assess the carbon neutrality status of an asset "ENV".

When an asset is traded, the carbon footprint attribute (ENV) attached to the asset flows with it, and the purchaser is credited with the carbon footprint attribute (ENV) attached to the asset. The asset here can be a traditional asset such as a building or a share of a factory, a cryptocurrency such as BTC or ETH, or an alternative real asset such as artwork, jewellery, etc.

In recent years, environmental issues and climate change have gradually become important issues of concern to society. In this context, impact investment is being recognized by the market at an accelerated pace, which will promote more investors to strengthen their awareness of carbon neutrality and have a stronger willingness to buy assets with a positive (or zero) carbon footprint (ENV) while assets with a negative carbon footprint (ENV) may not be traded at a proper trading price and volume on the trading platform because of the existence of this negative value.

The inventors of the present application have additionally created the concept of Carbon Neutrality Token (CNT), as a means to undertake carbon offsetting and Carbon Capture, Storage and Utilization (CCSU) activities. As outlined above an NFDT which is a time series of linked emission reduction smart contracts in relation to an asset or carbon offsetting action (or project) each of which capture the emission reductions since the previous contract. After each emission reduction smart contract is published, an equivalent amount of CNTs are issued to reflect the amount of emission reductions included in the emission reduction smart contract. As outlines above these are tradeable across borders without triggering NDC constraints and without dependence on Article 6 of Paris agreement. Possible ways to obtain CNTs include: companies with positive carbon offsets or captures (e.g., photovoltaics, wind energy, forest projects), companies owning products or assets that have carbon emissions below a recognized industry benchmark, companies or scenarios that aggregate the green contributions of consumers/individuals in society (e.g., companies of shared mobility, distributed renewable energy and low and/ or negative carbon consumer products manufacture).

According to an embodiment, the correspondence between CNT and negative ENV may be 1:1; alternatively, some other correspondence may be used as desired. For example, the value of a CNT can be defined as follows:

1 CNT=carbon emissions of 1 ton of CO2 equivalent at carbon neutrality (when net emission is zero).

According to an embodiment, CNTs can be custodized by a trading platform; and a trader or an asset holder having a negative ENV can buy CNTs to increase its total ENV value (which is tracked in the ledger). In other words, the total ENV value of traders portfolio or an asset holder is equal to the sum of carbon footprint attribute values of all assets of the trader or asset holder, and a positive carbon footprint attribute value corresponding to the CNTs that the trader or asset holder holds.

According to an embodiment, the carbon footprint attribute value ENV and carbon neutrality tokens CNTs can be calculated or audited by a professional third party entity to avoid data falsification.

According to an embodiment, the NFDTs, smart contract, ENV and/or carbon neutrality tokens (CNTs) may be recorded using blockchain and/or smart contract technology. As would be known by the person of skill in the art, a blockchain is a digitized distributed ledger operating on typically distributed computing apparatus using a peer to peer network, in which entries/transactions are secured by cryptographic signatures, such that the historical record of transactions cannot be tampered with and leaves a verifiable audit trail. Many different blockchain technologies exist such as Bitcoin and Ethereum. In some embodiments, generation and issuance can be done, for example, through the Ethereum public blockchain. Ethereum is an efficient distributed virtual machine that allows end users to construct smart contracts for transactions. The smart contracts are stateful applications or software code stored on the Ethereum public blockchain. These contracts are secured with encryption algorithms, for verifying or enforcing the contracts. When a smart contract is deployed on a virtual machine and the trigger condition is satisfied, the smart contract will be automatically executed and published on the blockchain, providing a reliable and trusted mechanism for NFDT representations of assets and CNT issuance. Meanwhile, smart contracts running on the Ethereum public blockchain have features such as traceability, tamper-proof and decentralized, and have the important characteristic of being permanently recorded on the blockchain. Other blockchains and private blockchains may be used.

According to an embodiment, the trading platform is not involved in pricing the CNTs; instead, CNTs are freely traded between asset holders and carbon neutrality token holders in the exchange. As a matter of course, the trading platform can provide a reference on the price of CNTs, and can also recommend possible CNT trading options such as bundles of assets and CNTs to traders, asset holders or CNT holders.

Various embodiments will now be discussed in more detail with reference to the figures to further illustrate the various methods and systems. FIG. 1A is a structural diagram of an asset trading system according to an embodiment of the present application.

As shown in the figure, an asset trading system 100 includes: an exchange 110, a CNT holder 120, an asset holder 130, and a third party entity 140. The asset holders and CNT holders may be the owners of the assets that generate emissions or emission reductions, or they may be a person who purchasers the emissions or emission reduction certificates in the country where the emission or emission reduction activity occurred. Traders (or investors) may use the asset trading system to make trades to purchase listings and/or CNT to build a portfolio. The asset holder 130 lists assets and the carbon footprint attribute (ENV) of each asset is determined and verified by the third party entity, and the carbon footprint attribute (ENV) is bound to the digital representation of the asset on the exchange. This captures the carbon footprint (e.g. carbon emissions) in creating the physical asset, or which is created by the physical asset over time (e.g. a power station). Investors or the asset holder may buy CNTs of the CNT holder 120 through the exchange 110, to increase its total carbon footprint attribute (ENV) value, for example to achieve carbon neutrality for the asset. Computing apparatus for implementing functionality of the various components of the system 100 (e.g. blockchain, calculation) are represented by dashed rectangles.

The exchange 110 could be a distributed system on public and private blockchains or other computing apparatus (e.g. distributed servers) or it may be formal registered asset trading exchange which is regulated and performs additional trading, listing and verification services. The exchange 110 may be a trade matchmaking system and trade monitoring system serving a variety of compliant exchanges in various countries and regions worldwide. It ensures powerful and efficient trade matching to handle the requirements, and also provides real-time monitoring for violation transactions to effectively protect the legitimate rights and interests of investors.

In some embodiments, assets that are traded in the exchange 110 may include, for example, various digital tokens based on physical assets, such as stocks; digital currencies (e.g., BTC/ETH); or alternative real assets (e.g., artwork, diamonds), as well as assets such as non-renewable power plants, vehicles, or equipment or which generate carbon emissions during use or over time (whether directly, or indirectly such as through consumption of power).

According to an embodiment, from the perspective of energy conservation and emission reduction, the CNT holder 120 may be a green company, such as a new energy technology research and development and provision company (photovoltaic, wind energy or hydroelectric company), or a afforestation company, which can obtain double benefits in both financial rewards on its own products and CNT in return. According to other embodiments, the CNT holder 120 can also be an ordinary company, due to its energy conservation and emission reduction action, either for production or for living (green office, green transportation, etc.), can be rewarded with CNTs according to CNT rules, so long as an authoritative third party proves that its actual carbon emissions from the production or living processes are lower than a benchmark, so that emission reduction actions can be financially rewarded.

According to another embodiment, from the perspective of industrial nature, the CNT holder 120 may be an information technology company, such as a platform for digital payment, bicycle sharing, car sharing, distributed renewable energy management, etc., which itself has the ability to organize and aggregate the green consumptions of consumers and provide key information to quantify the carbon offsetting contribution of these actions in the form of big data; once verified by a third party, can also be rewarded with CNTs accordingly.

Furthermore, the CNT holder 120 may also be an ordinary consumer, or an environmental protector. Through corporate organizations, ordinary consumers and environmental protectors can participate in the CNT system as well. Through their green consumption actions, ordinary consumers and environmental protectors not only contribute to the carbon neutrality ecological cause, but also receive CNTs while receiving corresponding rewards and returns by trading CNTs in the exchange.

A CNT holder 120 may also be an investor or entity who purchases the CNT from the above parties (or intermediate parties). Thus a CNT holder may be an entity that performs a carbon offsetting action or may be an entity who obtains emission reduction certificates from a previous owner (and ultimately the original entity that performed the carbon offsetting action).

The exchange 110 allows an asset holder to list assets on the exchange. However, to facilitate disclosure of the carbon neutrality status of an asset holder, the exchange 110 requires that the asset holder 130 provide the verified carbon footprint attribute (ENV) of an asset to be included in the listing documentation on the exchange 110. In one embodiment this includes creating a NFDT which is a digital representation of the asset on exchange through the use of a time series of linked smart contract. Each smart contract includes an amount of carbon emissions (or a carbon footprint) generated since the previous smart contract (or in the case of the birth contract, the emissions in creating the asset) and thus the carbon footprint attribute (ENV) is bound to the representation of the asset. The carbon footprint attribute (ENV) is stored in a ledger of the exchange. This digital (NFDT) representation will mirror ENV realism of the asset by tracking changes in the ENV value, such as generation of additional carbon emissions over time, or the purchase or sale of CNTs, all of which will alter the carbon footprint attribute (ENV) of the asset.

Figure 1B:
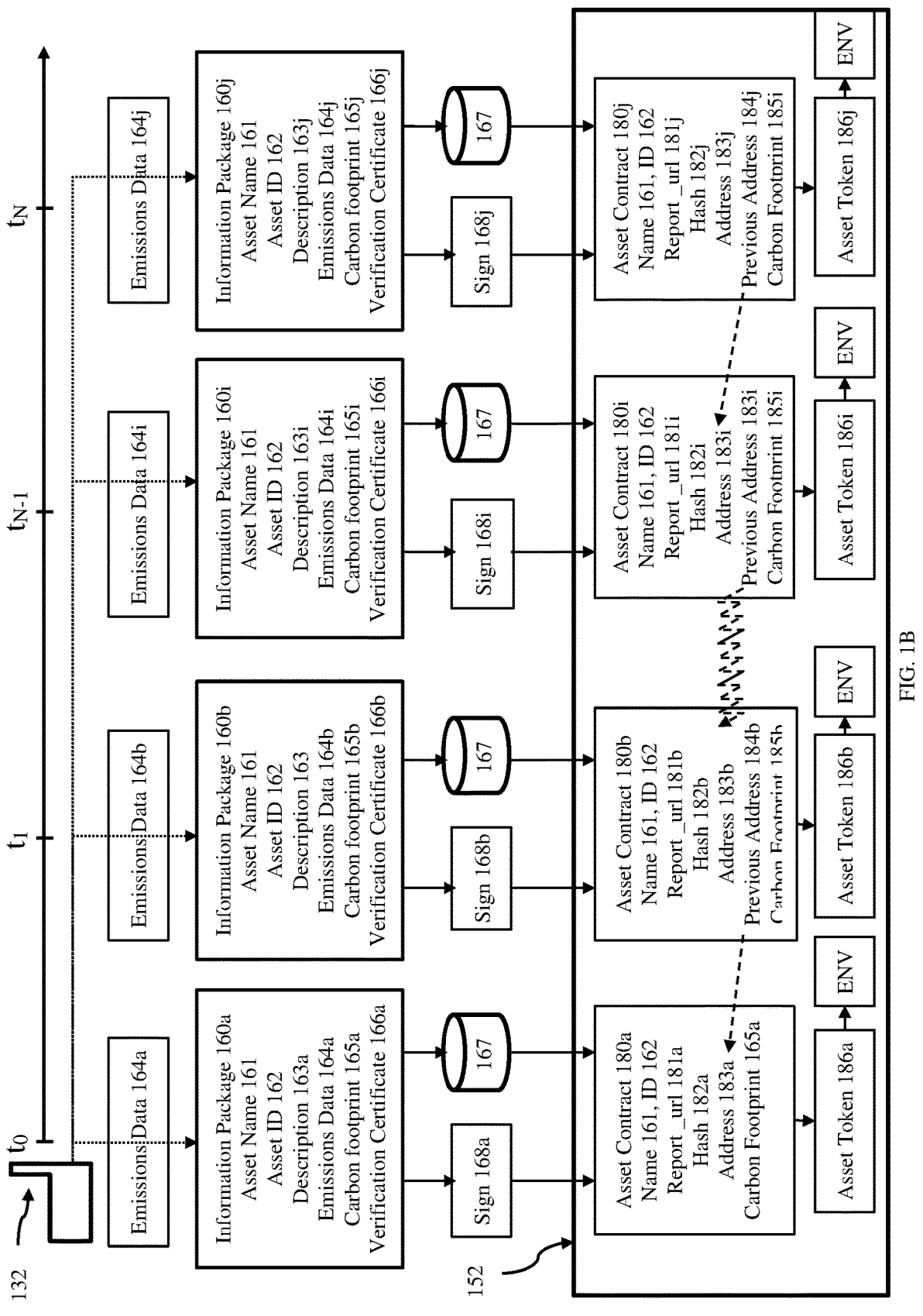
FIG. 1B is a schematic diagram representing a linked chain of smart contracts used to digitally represent the time evolution, including potential change in carbon footprint, of an asset over time according to an embodiment.

This is further illustrated in FIG. 1B which is a schematic diagram representing a linked chain of smart contracts used to digitally represent the change in carbon footprint attribute (ENV) of an asset over time according to an embodiment. At time to, the asset is listed on the exchange 110. This requires obtaining carbon emissions data 164a to determine the carbon footprint of the asset. This may be the sum of all carbon emissions measured in tonnes of CO2 equivalent (tCO2e) involved in the manufacture or production of the asset. An information package 160a is generated which in one embodiments comprises an asset name 161, and asset ID 162, a description 163a, the emissions data 164a, the carbon footprint 165a which is estimated from the emissions data 164a, and a verification certificate 166a generated by the third party entity 140 who performed the calculation of the carbon footprint 165a, or verified the calculation was performed correctly. The description may comprise a description of the asset and how it was manufactured, and any other relevant data such as how the calculation of the carbon footprint 165a was performed. The carbon footprint 165a may be provided as a value in units of tonnes of CO2 equivalent (tCO2e). The information package 160a may then be stored as a PDF report, or similar electronic container file in a database 167 with an associated report address which is a unique access location such as a Uniform Resource Identifier address or Uniform Resource Locator address. In this embodiment the address is a URL (report URL 181a) but it will be understood that this may be a URI address. This storage address may be on a storage device (e.g. in a webserver) of the digital trading exchange 110 and may be accessed by an associated webserver of the digital trading exchange or other digital interface provided by computing apparatus of the digital trading exchange 110. However it could also be on a storage device on another server, or in a cloud storage device. The information package is submitted to the exchange which checks and then cryptographically signs the information package to generate a unique hash 182a for the information package, and which can be used to verify the authenticity of the information package at the access location (report_URL 181a). Thus when the report_URL (or URI) is accessed the hash may also be provided, and the document is only served if the hash authenticates the information package (and thus verifies it has not been modified). A warning may be issued if the authentication fails which may indicate that the report may have been altered. The asset name 161, asset ID 162, description 163a, report_URL 181a, hash 182a, an and the carbon footprint 165a are provided as input to a smart Asset Contract 180a which is executed on a blockchain which generates an asset token 186a which can be used to represent the asset. The address 183b represents a storage address (e.g. block on the blockchain) where the Asset Contract 180a is stored. The token 186a acts as a birth certificate for the asset and the address 183b then indicates the location where the birth certificate is stored on the blockchain (and may thus be viewed). The token 186a may then be stored in a database by exchange 110 and used to access the published smart contract or information contained in the published smart contract. The initial carbon footprint attribute (ENV) value is the carbon footprint 165a and this ENV value is stored in the ledger (and thus the initial ENV value will be the initial carbon footprint 165a.

Rather than being a single record or snapshot, the digital representation (NFDT) of the asset is a live (or continuous) representation of the asset over time and thus is designed to capture changes in the carbon footprint attribute (ENV) value over time. For example, in this embodiment the physical asset continuously generates carbon emissions which are reported at regular intervals such as every quarter. Thus, at time $t_1$, additional emissions data 164b of the asset 132 over the time period $(t_1-t_0)$ are collected and stored. A second information package 160b is prepared. This information package 160b is generated comprising an asset name 161, and asset ID 162, a description 163b, the emissions data 164b, the carbon footprint 165b which is estimated from the emissions data 164b, and a verification certificate 166b generated by the third party entity 140 who performed the calculation of the carbon footprint 165b, or verified the calculation was performed correctly. The description may comprise a description of the asset, the timer period or time stamp $t_1$ and any other relevant data such as how the calculation of the carbon footprint 165b was performed. The information package 160b may then be stored as a PDF report, or similar electronic container file in the database 167 with an associated unique access location (report URL 181*b*), and then submitted to the exchange for checking, who then digitally sign 168*b* to generate a hash 182*b*. The asset name 161, asset ID 162, description 163*b*, report_URL 181*b*, hash 182*b*, an address 183*b* and the carbon footprint 165*b* are provided as inputs to a smart Asset Contract 180*a*, along with the address of the previous Asset Contract which in this case is the birth address (that is previous address 184*b*=birth address 183*a*). This address could be provided as token 186*a*. This generates another asset token 186*b* which may be stored by the exchange 110. The carbon footprint attribute (ENV) value of the asset (ENV) is then updated on the ledger to include the additional emissions (e.g. ENV=carbon footprint 165*a*+carbon footprint 165*b*).

This creation and submission of information packages 160 to execute additional Asset contracts 180 for the asset is repeated over time, where each subsequent Asset Contract is linked, and the carbon footprint attribute (ENV) value associated is updated after each contract (based on the carbon footprint 165 in the asset contract). FIG. 1B showing information packages 160*i* and 160*j* at times $t_{N-1}$ and $t_N$ respectively along with asset contracts 180*i* and 180*j*. As noted previously asset contract 180*j* at time $t_N$ includes a reference to the address of the previous asset contract 180*j* generated at time $t_{N-1}$. In this way a linked list of Asset Contracts is generated for an asset, all of which are (immutably) stored on the blockchain 152.

Figure 1C:
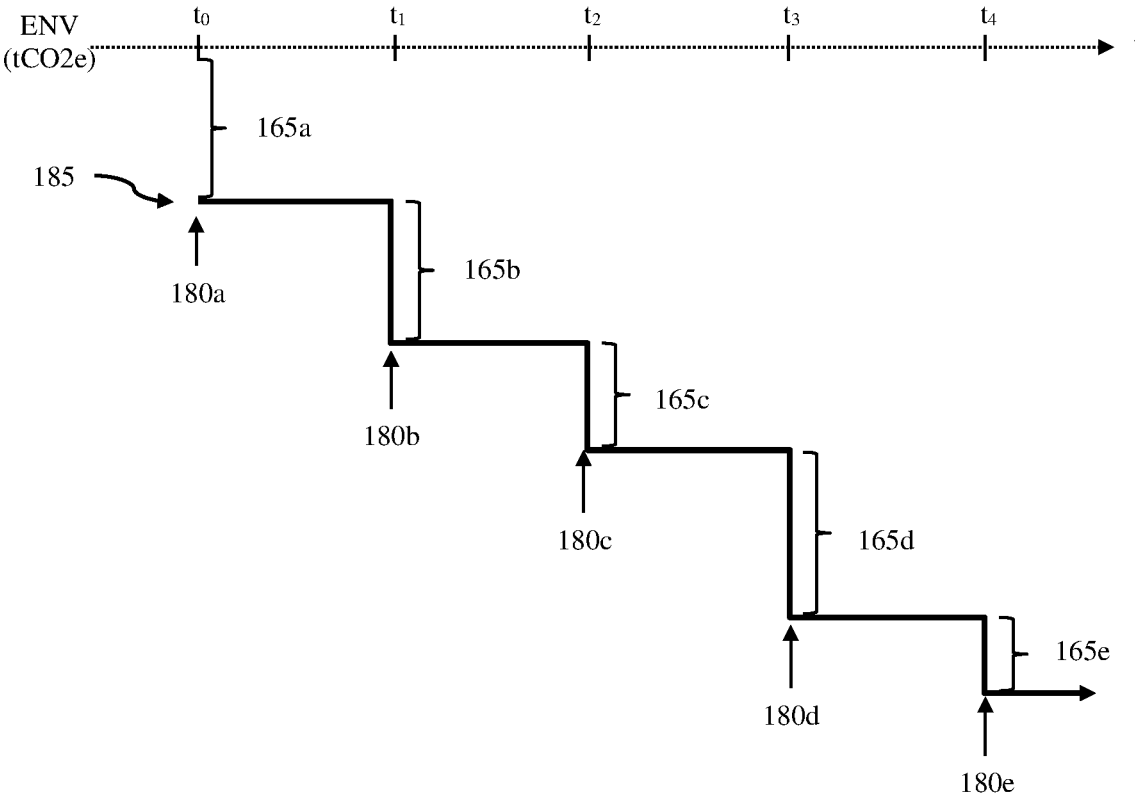
FIG. 1C is a plot of the carbon footprint attribute value (ENV, in units of tCO2e) over time which is bound or associated with a Non-Fungible Digital Twin (NFDT) representation of the asset in FIG. 1B.

FIG. 1C which is a plot of the carbon footprint attribute value (ENV, in units of tCO2e) over time (curve 185) of the asset in FIG. 1B, which is maintained in a ledger of the exchange. At time to, the carbon footprint attribute (ENV) value of an asset is the carbon footprint value 165*a* as included in Asset Contract 180*a*. Then at time $t_1$, Asset Contract 180*b* is executed listing additional emissions 165*b* leading to a decrease in the carbon footprint attribute (ENV) value of the asset (by amount carbon footprint value 165*b*). Then at time $t_2$, Asset Contract 180*c* is executed listing additional emissions 165*c* leading to a further decrease in the carbon footprint attribute (ENV) value of the asset (by amount carbon footprint value 165*c*). As further illustrated in FIG. 1C, at additional time points $t_3$ and $t_4$, additional emissions are reported and ENV progressively decreases by further amounts carbon footprint value 165*d* and carbon footprint value 165*e*. Thus, FIGS. 1A, 1B, and 1C illustrate a trading exchange configured to record the carbon footprint attribute (ENV) value of an asset according to an embodiment. This facilitates reporting of ESG by an asset holder.

According to an embodiment, the asset holder 130 may wish to trade its assets in the exchange. In order for its assets to be better priced for trading, or because of its institutional carbon neutrality goals and commitments, or according to the requirements of the exchange, or for other reasons, the asset holder may want its total carbon footprint attribute (ENV) value to be no less than 0. According to an embodiment, the asset holder 130 may buy CNTs to balance out the negative impact of a negative ENV attached to its assets on the total carbon footprint attribute value $ENV_{total}$, and bundle these CNTs with trading of its asset. As a matter of course, the asset holder 130 may already hold CNTs, but its CNTs are not enough to bring its $ENV_{total}$ to a level greater than or equal to 0; therefore, the asset holder 130 may still need to buy CNTs. Alternatively an asset holder may work a CNT holder or the exchange to offer bundled trades, in which a trade of an asset includes a purchase of CNTs from a CNT holder to offset a negative ENV of the asset offered for trade. Alternatively a trader may separately purchase CNTs to offset a negative ENV of a purchased asset to minimise the carbon footprint of their portfolio (or to make it carbon neutral or carbon positive). As will be explained below, the creation of CNTs is similar to the process illustrated in FIGS. 1B and 1*s* illustrated in FIG. 1D. However rather than using emissions data to calculate emissions, emission reduction data is used to calculate an emission reduction value which is verified. A smart contract (based on ERC 721) is executed to generate a non-fungible digital twin (token) of the emission reduction from which an amount of CNTs is generated using a smart contract (based on ERC 20). As outlined below, the smart contract requires that emission reductions be recorded and redeemed (retired or frozen) from a national carbon accounting register, and that the exchange or other trusted party takes custody of the redemption certificate to prevent trading of the carbon emission reduction certificate and to prevent the redemption certificate from being used for the carbon neutrality offsetting. Thus, FIGS. 1A, 1B, and 1C illustrate a trading exchange configured to record the carbon footprint attribute (ENV) value of an asset according to an embodiment. This facilitates reporting of ESG by an asset holder.

FIG. 1D is a schematic diagram of a method for generating emission reduction smart contracts and carbon neutrality tokens (CNTs) in respect of an offsetting action to create a Non-Fungible Digital Twin (NFDT) representation of the offsetting action according to an embodiment. Each smart contract in the time series of smart contracts forming the NFDT is uniquely identified by the contract address (on the blockchain) and tokenID (a uint256) which provides a mapping to the address. The NFDT comprises a birth asset contract which captures all details of the asset and its carbon footprint (ENV), and a time series of subsequent asset contract each of which stores subsequent emission data or change to the carbon footprint attribute value (ENV) due such as due to emission reduction activities or purchase of CNTs at the present time (t). That is, after the birth contract, each subsequent asset contract stores the new carbon footprint information at the present time (t) and along with the address of the previous smart contract (t–1). FIG. 1D illustrates the process for generating a birth contract and CNTs resulting from an emission offsetting action. A modified process may be used to generate the subsequent emission reduction smart contracts and CNTs associated with additional emission reduction activity at a later time.

This is further illustrated in FIG. 1D which is a schematic diagram of a method for generation of smart contracts and CNTs according to an embodiment. The owner 120 of a real world project such as wind, solar or energy emission projects (or assets) prepares an information package containing carbon offsetting action related data of the project. The carbon emission related data comprises relevant documents (e.g. description of project, time frame) and/or data as captured by the data acquisition system and devices as described above system, and/or by sensors (including IoT sensors) and software. The information package may be submitted to an authoritative third party verification and certification firm 140 to calculate, or verify a calculation, of the emission reduction in appropriate units (e.g. ton of $CO_2$ emissions). The information package is submitted to the national carbon registry of the country (or region) where the real world project is located, or to where it can be attributed to (for example if the project was not conducted on land within the country such as in the ocean). After review and approval by the national carbon registry, the owner of the real world project is issued a voluntary emission reduction (VER) certificate which can be traded. For example, in China, this is called China Certified Emission Reduction (CCER).

As explained above, in some embodiments the generation of a CNT is conditional on the redemption (or retirement) of the underlying VER. Thus, in this embodiment the owners of the VER go through the retirement process of the VER to prevent it from being further traded. After being verified by the national registry, the CNT issuer shall receive a certificate of VER retirement from the national registry. In China, this is called "Certificate of Redemption of Certified Emission Reduction". This ensures the National Determined Contribution (NDC) will not be affected as the VER will not leave the country. In another embodiment the owner of the VER may sell or transfer the VER to another party through a national carbon exchange, regional carbon exchange or bi-lateral transaction, until the VER is purchased by the CNT issuer's subsidiary or related parties in the country. Then the CNT issuer's subsidiary or related party in the country shall go through the retirement process of the VER so that the VER shall never be able to be traded anywhere. Again, this ensures the NDC will not be affected as the VER will not leave the country.

An application 111 executing on the exchange system hardware is used to submit, approve the VER certificate (and information package) and then generate the appropriate amount of CNT tokens. The application interface enables the owner to upload an information (or data) package such as a PDF report (or similar file) which meets the exchange listing rule requirements 811 which is then stored on a file system 112 such as a cloud-based AWS s3 file system. In one embodiment this information package (PDF report) includes the offering memorandum, the carbon offsetting action related data submitted to the national carbon registry (including any information captured by the data acquisition system and devices described above), the VER certificate (e.g. the CCER in China) and the VER redemption/redemption certificate (for example, it is known in China as the Certificate of Redemption of Certified Emission Reduction). The information package may be a single document or a collection of documents and may be provided in a container or similar file or data structure.

The exchange reviews the submitted information package (PDF report) and if the package meets the listing criteria, then it will approve the listing and digitally sign at least the VER certificate and VER redemption certificate, and preferably digitally sign the entire information package with a Hash algorithm or hash function (e.g. a 256 bit hash). This hash function may be stored on the blockchain (for example within the smart contract) to act as proof the exchange has approved the information package, and allow verification that the information package has not been altered. In one embodiment when the information package is accessed, the hash is provided and used to authenticate that the information package has not been altered (and the information package may only be served if the authentication is passed).

The application 111 submits (e.g. by a service call) the information package address (VER report URI, however this could also be a URL) along with the digital signature (hash) to a VER smart contract 154. In this embodiment the blockchain is an Ethereum blockchain and the VER smart contract 154 is based upon (or inherited from) an ERC721 smart contract. The time sequence of VER smart contracts 154 create a NFDT of a real world asset/activity (i.e. the carbon offsetting activity). The smart contract saves the information of the asset into the blockchain to provide a non-tampering certificate. In this embodiment the information of the asset includes name, ID, CO2 reduction amount (e.g. in units of tCO2e), the download address (e.g. URI or URL) of the information package (e.g. PDF report), the signature of the information package (hash of the PDF report), and a URI of a JSON metadata file (as per the ERC 721 standard; token_URI). Similar to the real world, an NFDT is the digital birth certificate. Thus, the signed listing documentation including the information package (and VER certificate and VER redemption certificate) forms the birth document package for the NFDT.

Every NFDT is identified by a unique uint256 ID inside the ERC-721 smart contract. This identifying number is fixed and thus cannot be changed for the life of the contract. The pair (contract address, uint256 tokenId) will then be a globally unique and fully-qualified identifier for a specific asset on an Ethereum chain. The choice of uint256 allows a wide variety of applications because UUIDs and SHA3 hashes are directly convertible to uint256. After a NFDT is generated the record will persist on the blockchain (and not disappear). ERC-721 standardizes a safe transfer function safeTransferFrom (overloaded with and without a bytes parameter) and an unsafe function transferFrom. Transfers may be initiated by the owner of an NFDT, the approved address of an NFDT or an authorized operator of the current owner of an NFDT. Additionally, an authorized operator may set the approved address for an NFDT. This provides a powerful set of tools for wallet, broker and auction applications to quickly use a large number of NFDTs.

Table 4 below illustrates a smart contract for issuing a CCER Asset Contract based on ERC-721 according to an embodiment. This could be modified for other voluntary emission reduction (VER) based assets. This asset contract can be used for recording the carbon emissions (e.g. the carbon footprint of an asset) or emissions reductions.

TABLE 4

| Smart Contract Code for CCER Asset Contract based on ERC-721 (CCERAsset.sol) |
| --- |

```
// contracts/CCERAsset.sol
pragma solidity ^0.8.0;
import "@openzeppelin/contracts/token/ERC721/ERC721.sol";
import "@openzeppelin/contracts/token/ERC721/extensions/ERC721URIStorage.sol";
import "@openzeppelin/contracts/utils/Counters.sol";
import "@openzeppelin/contracts/access/AccessControl.sol";
import "./ICNTToken.sol";
import "./ICarbonFootprint.sol";
contract CCERAsset is ERC721URIStorage, AccessControl {
    // Create a new role identifier for the minter role
    bytes32 public constant ISSUER_ROLE = keccak256("ISSUER_ROLE");
    struct EmissionData {
        uint256 co2; // stores the amount of CO2 emissions/reductions
    }
```

TABLE 4-continued

Smart Contract Code for CCER Asset Contract based on ERC-721 (CCERAsset.sol)

```
struct Certificate {
    string websiteUrl; // each CCER project is published on the official website
    string reportUrl; // URL of where PDF report is stored
    string reportHash; // hash of the PDF report
}
// CCER Report struct is used to descript the CCER key properties
struct CCERItem {
    uint256 id; //unique ID for the contract
    string assetId; //ID assigned by CCER acrredited org to identify CCER project
    string assetName; // The assigned name of the CCER project
    string description; // key points of report in text formart
    string tokenURI; //points to JSON file including metadata of NFT
    EmissionData emissionData; // see above
    Certificate certificate; // see above
}
using Counters for Counters.Counter;
Counters.Counter private _tokenIds;
using Strings for uint256;
mapping(string => uint256) private _hashTokenMapping;
mapping(uint256 => CCERItem) private _ccerReportMapping;
mapping(uint256 => uint256[ ]) private _tokenIdMapping;
mapping(uint256 => uint256[ ]) private _childTokenIds;
address private _carbonFootprintContractAddress;
address private _tokenContractAddress;
constructor(address administrator) ERC721("CCER Asset", "CRA") {
    _setupRole(DEFAULT_ADMIN_ROLE, administrator);
}
function _setHashToken(string memory hash, uint256 tokenId)
    internal
    virtual
{
    _hashTokenMapping[hash] = tokenId;
}
function _setTokenCcer(uint256 tokenId, CCERItem memory ccer)
    internal
    virtual
{
    _ccerReportMapping[tokenId] = ccer;
}
function _existsHash(string memory hash)
    internal
    view
    virtual
    returns (bool)
{
    return _hashTokenMapping[hash] != 0;
}
// create a new token for a ccer asset, save it blockchain and assign it to rec
ipient
function create(
    address recipient,
    string memory ccerName,
    string memory ccerId,
    string memory description,
    uint256 co2,
    string memory websiteURI,
    string memory reportURI,
    string memory reportHash,
    string memory tokenURI
) public onlyRole(ISSUER_ROLE) returns (uint256) {
    // check hash whether has used by the contract, if so throw a exception
    require(!_existsHash(reportHash), "CCERAsset: ccre report already committed
");
    tokenIds.increment( );
    uint256 newItemId = _tokenIds.current( );
    _mint(recipient, newItemId);
    _setTokenURI(newItemId, tokenURI);
    // save hash and token id in mapping
    _setHashToken(reportHash, newItemId);
    // save ccer asset into memory with token id
    EmissionData memory emissionData = EmissionData(co2);
    Certificate memory certificate = Certificate(websiteURI, reportURI, reportH
ash);
    CCERItem memory ccer = CCERItem(
        newItemId,
        ccerId,
        ccerName,
        description,
```

TABLE 4-continued

Smart Contract Code for CCER Asset Contract based on ERC-721 (CCERAsset.sol)

```
            tokenURI,
            emissionData,
            certificate
        );
        _setTokenCcer(newItemId, ccer);
        return newItemId;
    }
    // approve a ccer asset.once the ccer asset is approved, the contract will cal
l another ERC 20 contract (CNT Token contract) to issue the CNT tokens to owner of
the ccer asset.
    function approveCCERAsset(uint256 amount, uint256 tokenId721)
        public
        onlyRole(DEFAULT_ADMIN_ROLE)
    {
        // get the address of owner of the ccer asset token
        address recipient = ERC721.ownerOf(tokenId721);
        // link to CNT token contract and call issue function to issue the CNT toke
n to the owner of the ccer asset token
        ICNTToken cntToken = ICNTToken(_tokenContractAddress);
        cntToken.issue(recipient, amount, tokenId721);
    }
    // create a new carbon footprint token for the ccert asset, the carbon footprin
t
    // is another a ERC 721 contract, and assign the carbon footprint to owner of t
he
    // ccer asset.That is the CCERitem is created first (the birth contract), and
    // then addCarbonfootprint is used for subsequent contracts in the time series
    function addCarbonFootprint(
        string memory reportURI,
        string memory reportHash,
        string memory description,
        string memory tokenURI,
        uint256 tokenId
    ) public returns (uint256) {
        ICarbonFootprint carbonFootprint = ICarbonFootprint(
            _carbonFootprintContractAddress
        );
        // get the address of owner of the ccer asset token
        address recipient = ERC721.ownerOf(tokenId);
        uint256 carbonFootprintTokenId = carbonFootprint.create(
            recipient,
            reportURI,
            reportHash,
            description,
            tokenURI,
            tokenId
        );
        uint256[ ] storage tokenIdList = _childTokenIds[tokenId];
        tokenIdList.push(carbonFootprintTokenId);
        return carbonFootprintTokenId;
    }
    // get all carbon foot print tokens for the token id of ccer asset
    // this allows all contracts in the time series to be obtained/reviewed
    function getCarbonFootprintIdsByParentTokenId(uint256 parentTokenId)
        public
        view
        virtual
        returns (uint256[ ] memory)
    {
        uint256[ ] memory tokenIdList = _childTokenIds[parentTokenId];
        return tokenIdList;
    }
    // grant a user (address) Issuer Role, only allow the administrator role to cal
l the function
    function grantIssuerRole(address account)
        public
        onlyRole(DEFAULT_ADMIN_ROLE)
    {
        grantRole(ISSUER_ROLE, account);
    }
    // set address of carbon footprint contract (ERC 721)
    function setCarbonFootprintContractAddress(address carbonFootprintContractAddre
ss)
        public
        onlyRole(DEFAULT_ADMIN_ROLE)
    {
        _carbonFootprintContractAddress = carbonFootprintContractAddress;
    }
```

TABLE 4-continued

Smart Contract Code for CCER Asset Contract based on ERC-721 (CCERAsset.sol)

```
        // set address of CNT token contract (ERC 20), the CNT token contract is used t
o issue to CNT token to recipient
        function setTokenContractAddress(address tokenContractAddress)
                public
                onlyRole(DEFAULT_ADMIN_ROLE)
        {
                _tokenContractAddress = tokenContractAddress;
        }
        // revoke a user (address) Issuer Role, only allow the administrator role to ca
ll the function
        function revokeIssuerRole(address account)
                public
                onlyRole(DEFAULT_ADMIN_ROLE)
        {
                revokeRole(ISSUER_ROLE, account);
        }
        /**
         * get ccer asset by token id
         */
        function getCcerByTokenId(uint256 tokenId)
                public
                view
                virtual
                returns (CCERItem memory)
        {
                require(_exists(tokenId), "CCERAsset: URI query for nonexistent token");
                CCERItem memory ccer = _ccerReportMapping[tokenId];
                return ccer;
        }
        /**
         * get ccer asset by report hash
         */
        function getCcerByHash(string memory hash)
                public
                view
                virtual
                returns (CCERItem memory)
        {
                require(
                        _existsHash(hash) ,
                        "CCERAsset: ccer report query for nonexistent hash"
                );
                uint256 tokenId = _hashTokenMapping[hash];
                CCERItem memory ccer = _ccerReportMapping[tokenId];
                return ccer;
        }
        /**
         * overrive support interfaces
         */
        function supportsInterface(bytes4 interfaceId)
                public
                view
                virtual
                override(ERC721, AccessControl)
                returns (bool)
        {
                return
                        interfaceId == type(IERC721).interfaceId ||
                        interfaceId == type(IERC721Metadata).interfaceId ||
                        interfaceId == type(IAccessControl).interfaceId ||
                        super.supportsInterface(interfaceId);
        }
}
// contracts/ICarbonFootprint.sol
pragma solidity ^0.8.0;
interface ICarbonFootprint {
        function create(
                address recipient,
                string memory reportURI,
                string memory reportHash,
                string memory description,
                string memory tokenURI,
                uint256 ccerAssertTokenId
        ) external returns (uint256);
}
// contracts/ICNTToken.sol
pragma solidity ^0.8.0;
interface ICNTToken {
```

TABLE 4-continued

Smart Contract Code for CCER Asset Contract based on ERC-721 (CCERAsset.sol)

```
        function issue(address account, uint256 amount, uint256 tokenId721) external;
}
// contracts/CarbonFootprint.sol
pragma solidity ?0.8.0;
import "@openzeppelin/contracts/token/ERC721/ERC721.sol";
import "@openzeppelin/contracts/token/ERC721/extensions/ERC721URIStorage.sol";
import "@openzeppelin/contracts/utils/Counters.sol";
import "@openzeppelin/contracts/access/AccessControl.sol";
import "./ICarbonFootprint.sol";
contract CarbonFootprint is ERC721URIStorage, AccessControl, ICarbonFootprint {
        // Create a new role identifier for the minter role
        bytes32 public constant ISSUER_ROLE = keccak256("ISSUER_ROLE");
        struct FootprintItem { // see struct CCERItem for description of fields
                uint256 ccerAssertTokenId;
                string reportUrl;
                string reportHash;
                string description;
                string tokenURI;
                uint256 tokenId;
        }
        using Counters for Counters.Counter;
        Counters.Counter private _tokenIds;
        using Strings for uint256;
        mapping(string => uint256) private _hashTokenMapping;
        mapping(uint256 => FootprintItem) private _footprintMapping;
        // Child tokenId, Parent tokenId
        // links CCERAsset to the carbonfootprint (e.g.to create the time series)
        mapping(uint256 => uint256) private _tokenIdMapping;
        constructor(address administrator) ERC721("CCER Carbon Footprint", "CCF") {
                _setupRole(DEFAULT_ADMIN_ROLE, administrator);
        }
        function _setHashToken(string memory hash, uint256 tokenId)
                internal
                virtual
        {
                _hashTokenMapping[hash] = tokenId;
        }
        function _setTokenCcer(uint256 tokenId, FootprintItem memory footprintItem)
                internal
                virtual
        {
                _footprintMapping[tokenId] = footprintItem;
        }
        function _existsHash(string memory hash)
                internal
                view
                virtual
                returns (bool)
        {
                return _hashTokenMapping[hash] != 0;
        }
        // create a new token and then assign it to recevier
        // onlyRole(ISSUER_ROLE)
        function create(
                address recipient,
                string memory reportURI,
                string memory description,
                string memory reportHash,
                string memory description,
                string memory tokenURI,
                uint256 ccerAssertTokenId
        ) public override virtual returns (uint256) {
                // check hash whether has used by the contract, if so throw a exception
                require(!_existsHash(reportHash), "CCERAsset: ccre report already committed
");
                _tokenIds.increment( );
                uint256 newItemId = _tokenIds.current( );
                _mint(recipient, newItemId);
                _setTokenURI(newItemId, tokenURI);
                // save hash and token id in mapping
                _setHashToken(reportHash, newItemId);
                // save ccer asset into memory with token id
                FootprintItem memory footprintItem = FootprintItem(
                        ccerAssertTokenId,
                        reportURI,
                        reportHash,
                        description,
                        tokenURI,
```

TABLE 4-continued

Smart Contract Code for CCER Asset Contract based on ERC-721 (CCERAsset.sol)

```
                newItemId
        );
        _setTokenCcer(newItemId, footprintItem);
        _setCcerAssertTokenId(newItemId, ccerAssertTokenId);
        return newItemId;
    }
    // set ccer assert id for the carbon footprint
    function _setCcerAssertTokenId(uint256 tokenId, uint256 ccerAssertTokenId)
        internal
        virtual
    {
        _tokenIdMapping[tokenId] = ccerAssertTokenId;
    }
    // get ccer asset token id of the carbon footprint
    function getCcerAssertTokenIdByTokenId(uint256 tokenId)
        public
        view
        virtual
        returns (uint256)
    {
        uint256 ccerAssertTokenId = _tokenIdMapping[tokenId];
        return ccerAssertTokenId;
    }
    // grant a user (address) Issuer Role, only allow the administrator role to cal
l the function
    function grantIssuerRole(address account)
        public
        onlyRole(DEFAULT_ADMIN_ROLE)
    {
        grantRole(ISSUER_ROLE, account);
    }
    // revoke a user (address) Issuer Role, only allow the administrator role to ca
ll the function
    function revokeIssuerRole(address account)
        public
        onlyRole(DEFAULT_ADMIN_ROLE)
    {
        revokeRole(ISSUER_ROLE, account);
    }
    /**
     * get carbon footprint of a ccer asset by token id
     */
    function getFootprintByTokenId(uint256 tokenId)
        public
        view
        virtual
        returns (FootprintItem memory)
    {
        require(_exists(tokenId), "Carbon Footprint of the CCER: URI query for none
xistent token");
        FootprintItem memory footprintItem = _footprintMapping[tokenId];
        return footprintItem;
    }
    /**
     * get carbon footprint of a ccer asset by report hash
     */
    function getFootprintByHash(string memory hash)
        public
        view
        virtual
        returns (FootprintItem memory)
    {
        require(
            _existsHash(hash),
            "Carbon Footprint of the CCER: Carbon Footprint query for nonexistent h
ash"
        );
        uint256 tokenId = _hashTokenMapping[hash];
        FootprintItem memory footprintItem = _footprintMapping[tokenId];
        return footprintItem;
    }
    /**
     * overrive support interfaces
     */
    function supportsInterface(bytes4 interfaceId)
        public
        view
        virtual
```

TABLE 4-continued

| Smart Contract Code for CCER Asset Contract based on ERC-721 (CCERAsset.sol) |
| --- |

```
                override(ERC721, AccessControl)
                returns (bool)
        {
                return
                        interfaceId == type(IERC721).interfaceId ||
                        interfaceId == type(IERC721Metadata).interfaceId ||
                        interfaceId == type(IAccessControl).interfaceId ||
                        super.supportsInterface( interfaceId);
                }
        }
```

Table 5 below provides code for a Carbon Neutrality Token (CNT) Contract based on ERC-20 for issuing an amount of CNT tokens to an account.

TABLE 5

| Carbon Neutrality Token (CNT) Contract based on ERC-20 (CNTToken.sol). |
| --- |

```
// contracts/CNTToken.sol
pragma solidity ^0.8.0;
import "@openzeppelin/contracts/access/AccessControl.sol";
import "@openzeppelin/contracts/token/ERC20/ERC20.sol";
import "./ICNTToken.sol";
contract CNTToken is ERC20, AccessControl, ICNTToken {
        struct ReportItem {
                uint256 tokenId721;
                address recipient;
                uint256 amount;
        }
        mapping (uint256 => uint256) private _tokenId721s;
        mapping (uint256 => ReportItem) private _reportItems;
        // Create a new role identifier for the minter role
        bytes32 public constant ISSUER_ROLE = keccak256("ISSUER_ROLE");
        constructor(address administrator) ERC20("Carbon Neutrality Token", "CNT") {
                // Grant the contract deployer the default admin role: it will be able
                // to grant and revoke any roles
                _setupRole(DEFAULT_ADMIN_ROLE, administrator);
        }
        // The minimum unit of CNT is 1
        function decimals( ) public view virtual override returns (uint8) {
                return 0;
        }
        // Creates 'amount' tokens and assigns them to 'account'
        // onlyRole(ISSUER_ROLE)
        function issue(address account, uint256 amount, uint256 tokenId721)
                override virtual public
        {
                // Verify that the tokenId has been issued
                //require(_tokenId721s[tokenId721] == tokenId721, "this report has been rel
eased");
                ReportItem memory reportItem = ReportItem (
                        tokenId721,
                        account,
                        amount
                );
                _setReportItem(tokenId721, reportItem);
                //_tokenId721s[tokenId721] = tokenId721;
                _mint(account, amount);
        }
        function _setReportItem (uint256 tokenId721, ReportItem memory reportItem) inte
rnal {
                //
                _reportItems[tokenId721] = reportItem;
        }
        function getReportItem (uint256 tokenId721) public view virtual returns (ReportI
tem memory) {
                ReportItem memory reportItem = _reportItems[tokenId721];
                return reportItem;
        }
        // Grant an account "Issuer role", the role is used to generate a new tokan and
then assign it to a address
        function grantIssuerRole(address account)
                public
                onlyRole(DEFAULT_ADMIN_ROLE)
```

TABLE 5-continued

Carbon Neutrality Token (CNT) Contract based on ERC-20 (CNTToken.sol).

```
        {
            grantRole(ISSUER_ROLE, account);
        }
        // Revoke the "Issuer role" from the account (address)
        function revokeIssuerRole(address account)
            public
            onlyRole(DEFAULT_ADMIN_ROLE)
        {
            revokeRole(ISSUER_ROLE, account);
        }
        // override, only allow the administrator role to call the function
        function transfer(address recipient, uint256 amount)
            public
            virtual
            override
            onlyRole(DEFAULT_ADMIN_ROLE)
            returns (bool)
        {
            return ERC20.transfer(recipient, amount);
        }
        // override, only allow the administrator role to call the function
        function allowance(address owner, address spender)
            public
            view
            virtual
            override
            onlyRole(DEFAULT_ADMIN_ROLE)
            returns (uint256)
        {
            return ERC20.allowance(owner, spender);
        }
        // override, only allow the administrator role to call the function
        function approve(address spender, uint256 amount)
            public
            virtual
            override
            onlyRole(DEFAULT_ADMIN_ROLE)
            returns (bool)
        {
            ERC20.approve(spender, amount);
            return true;
        }
    // override, only allow the administrator role to call the function
    function transferFrom(
            address sender,
            address recipient,
            uint256 amount
        ) public virtual override onlyRole(DEFAULT_ADMIN_ROLE) returns (bool) {
            _transfer(sender, recipient, amount);
            return ERC20.transferFrom(sender, recipient, amount);
        }
        // override, only allow the administrator role to call the function
        function increaseAllowance(address spender, uint256 addedValue)
            public
            virtual
            override
            onlyRole(DEFAULT_ADMIN_ROLE)
            returns (bool)
        {
            return ERC20.increaseAllowance(spender, addedValue);
        }
// override, only allow the administrator role to call the function
function decreaseAllowance(address spender, uint256 subtractedValue)
            public
            virtual
            override
            onlyRole(DEFAULT_ADMIN_ROLE)
            returns (bool)
        {
            return ERC20.decreaseAllowance(spender, subtractedValue);
        }
    }
```

The code shown in Tables 4 and 5 define an CCERAsset Smart Contract and a CNT token contract in relation to a CCER project according to an embodiment. The data structures EmissionData, Certificate, and CCERItem defines the fields (or elements/variables/attributes) stored by a CCER-Asset smart contract. The emissionData struct has a field "co2" which is used to store the amount of CO2 emissions or reductions in units of tCO2e. The certificate structure is used to store information about CCER verification and redemption certificates. Each CCER project is published on an official website, and assigned a unique ID and name. The certificate struct thus includes a field websiteURL to store the URL which can be used to access the website for the CCER project. Similarly the CCERItem struct has two fields called assetID and assetName for storing the assigned ID and name of the CCER project. The certificate struct is also used to store the URL of the report (or information package) that includes the CCER certificate (and redemption certificate) in the reportUrl field along with the hash used to authenticate that the report has not been altered in the reportHash field. The CCERItem data structure also include a description field which includes key points of the report in text format. The field tokenURI points to a JSON file that includes metadata of the NFT (see https://eips.ethereum.org/EIPS/eip-721 for an example).

The function approveCCERAsset is used to call the CNT token contract to issue CNTs to the owner of the asset once the CCERAsset is approved. To create a time series of linked contracts in which the subsequent contracts include additional emissions (or reductions) since the previous contract, the CCERAsset contract includes an addCarbonFootprint function, and Table 4 lists the code for the CarbonFootprint contract. The data structure FootprintItem in the Carbon-Footprint contract has equivalent fields to the CCERItem fields. That is the CCERAsset contract is created first as the birth contract, and then additional CarbonFootprint contracts are added to the blockchain and linked together. The function getCarbonFootprintIdsByParentTokenId gets all the carbon foot print tokens for the token id of the CCER asset and thus allows all of the contracts in the time series to be obtained.

The code shown in Tables 4 and 5 represent code for AssetContract and CNTs for execution and storage on an Ethereum blockchain based on the ERC721 (Non-Fungible Token) and ERC 20 (Fungible Token) Ethereum standards. More details may be found at https://eips.ethereum.org/EIPS/eip-721 and https://eips.ethereum.org/EIPS/eip-20. See also https://ethereum.org/en/, https://ethereum.org/en/developers/docs/standards/tokens/erc-721/, and https://docs.openzepplin.com/contracts/3.x/erc721. Extension code can also be written based on this pseudocode to implement specific interfaces or features such as use of snapshots and error checking as required. Similar code can be written for other blockchains based on the above code and the code could be modified for use with other types of emission reduction certificates (besides a CCER certificate). Similarly some (or all) of fields such as websiteUrl, assetName, assetID and description could be consolidated for example in the report obtained at reportURL and could thus be omitted. The reportUrl and reportHash could be for a single report (or information package) containing all relevant information about the asset. Alternatively the information package could be split into multiple documents, each with a separate reportUrl and hash, such as a verification certificate, a redemption certificate, a project description, and any other associated documents that may be relevant to the project or listing on an exchange. More generally the report address (and in fact all addresses) could be Uniform Resource Identifier (URI) addresses instead of Uniform Resource Locator (URL) addresses. Whilst a URL define the location of a resource, a URIs identify the resource by name at a location (or URL), and thus URLs are a subset of URIs. Report address will be used to define either a URI or URL address.

As illustrated in FIG. 1D, the VER asset contract 154 is published on the blockchain at a block address (VER smart contract address) and acts as a as a digital birth certificate. The VER report (information package) is stored in the description section of the contract. The block information (block address) of the published VER asset contract is received 174 by the application 111 and saved 175 into a database 113 such as an AWS RDS database. The exchange approves the VER report (information package) 176 and this approval 176 triggers execution (or calls) a CNT token contract 156 (generated via a ERC 20 smart contract, as illustrated above in Table 5) to issue (or generate) CNT tokens according to the amount of CO2 emission reductions included in the VER report (information package) to an account. The issued CNT tokens are then listed 178 against the asset (and asset holder) in a ledger 114. In one embodiment the CNTs are stored in a cold wallet of the trading platform for closed-end custody. Alternatively, they may be stored on a public blockchain or in some other storage location. When a document saved in the URL or anywhere is called upon by existing or potential investor of the CNT (or any Asset Backed Token investor), the document is verified through its Hash code for the corresponding ERC721 contract to guarantee its authenticity.

This VER asset contract 154 thus corresponds to the birth information package signed by the trading exchange. Subsequent data generated by the real world asset such as further documentation or captured through the data acquisition system, for example on a daily, monthly, quarterly or annually basis, is submitted to the exchange to form a subsequent (or follow-on) information package with a time stamp (time t). Each time when such a subsequent time stamped information package is submitted to the exchange the application 111 will use the information package to create another VER asset contract that is linked to the previous VER asset contract.

That is any new information submitted to the exchange will be captured by following VER asset contract. As such each following VER asset contract will not only have one description of uint256 ID of the information at this time t, but also has another description linked to the address of the VER asset contract of the previous information submitted to the exchange (i.e. at t−1). This enables the creation of a time sequence of linked emission reduction smart contracts which form the NFDT representing the real world asset with live information flow of carbon neutrality status. The digital representation of the asset is thus a time series (or time ordered chain) of smart contracts.

Thus, the birth information package as signed by exchange, and all following information packages with time stamps, forms a live and sequential real world information flow of the carbon neutrality status for the real world asset. The NFDTs are created in the blockchain to mirror and protect the authenticity of the real world information in the digital world.

Similarly to the listing of a carbon emission reduction activity and generation of CNTs through the submission of an information package as illustrated in FIG. 1D, asset holders may apply to the exchange to list an asset as illustrated in FIG. 1B and Table 4. In this embodiment the asset holder 130 prepares an information package comprising carbon emission related data of the asset, and the data is used to calculate the carbon footprint attribute value of the asset (ENV value). This calculation may be performed by the asset holder 130 and verified by the third party entity 140 or the asset holder may submit the information to the third party entity 140 to perform the calculation. This certification is included in the information package which is uploaded to a file system 112. The trading exchange reviews the submitted information package and if the package meets the listing criteria, then will approve the listing and digitally sign the package. This is submitted to a smart contract such as the VER asset contract 154 or a similar contract to generate an NFDT representing the asset and which stores (and thus binds) the carbon footprint attribute value (ENV value) to the NDFT (digital twin) of the asset at the time of birth. This is then approved and saved into the database 113 and the asset may then be listed on the exchange. If the ENV value of the asset is positive then an appropriate amount (or number) of CNT tokens are issued using the CNT token contract 156. If the ENV value is negative then the asset holder may then purchase CNT tokens from a CNT token holder to achieve a net zero carbon neutrality value as illustrated in FIG. 3. This may be performed using the safeTransferFrom or transferForm interface of the VER asset contract, or by another smart contract, and details of the transaction are stored on the blockchain. Additionally (and as discussed above), in the case of an asset that continuously (or subsequently) produces additional emissions, such as thermal power plan, chemical plants, etc, a further information package may be submitted to the exchange to record the additional emissions at a subsequent time t and the ENV value of the asset is then updated with this transaction recorded on the blockchain. The transaction may be linked to the previous transaction to provide a chain of traceable transactions.

When the VER is redeemed (or retired) in one jurisdiction, the redemption certificate issued by the national registry will be locked into a custody directly controlled by the exchange (or a trusted party). This is to prevent the redemption certificate from being used by the owner for any other purposes. Also, in an application for issuance of CNTs, a third party may be used to verify and certify the authenticity of the redemption certificate.

When investors on the exchange buys CNTs, they can use CNT for two purposes. The first purpose is to keep the CNT alive such as for a trading purpose or its own financial trading account for carbon footprint management purpose. The investor can buy and sell the CNT anytime to make a profit and gain, and the investor's portfolio will reflect the carbon value of all assets.

The second purpose is to permanently freeze the CNT. That is the investor in its real life may have other assets that generate a carbon footprint and they may want to "carbon-neutralize". The investor can thus buy same amount of CNT on the exchange and then make request to exchange that they wish to burn the CNT to neutralize their carbon footprint in real world. Thus in one embodiment this may be implemented using the following method:

1. The investor works with a white listed certification firm to certify the carbon footprint of an asset (e.g. his office tower) that he wants to neutralize.

2. The Certification/Verification Firm (i.e. third party entity) provides a Certificate that this asset has an amount of $CO_2$ at a specific time (e.g. 10 tonnes at 2020).

3. The investor buys the required amount of CNTs on the exchange (e.g. 10 CNTs).

4. The investor then submit a neutralisation information package comprising the carbon neutrality report to the exchange, with an application form, the certificate of his asset footprint, and the CNT purchased on the exchange.

5. After the exchange reviews the documents and deem them in order, the exchange, the Certification Firm, and the Investor digitally sign the whole neutralisation information package and generate one or more hashes used to authenticate the documents and/or the neutralization information package.

6. The exchange will deduct the amount of CNTs (e.g. 10 CNTs) from the investor's ledger and mark these CNTs on the exchange's CNT Block Chain as having been permanently frozen.

7. The exchange will create a block on the exchange's CNT Block Chain which will record the investor's name, the asset to be neutralize, the Certification Firm, the certificate, a hash of the neutralisation information package (used to protect these information) and a hash of a "Carbon Neutrality Certificate" document issued by the exchange.

8. The exchange issues the unique non-fungible carbon neutrality certificate, together with some authoritative agency, to the investor to prove its carbon neutrality efforts. The carbon neutrality efforts by investor for real world assets also represent the deflationary part of the CNT economics, while building green project to generate CNT is the inflationary part of the CNT economics.

FIGS. 2A to 2F further illustrate embodiments.

FIG. 2A is a flowchart of a method for creating an NFDT and CNTs on a digital trading exchange according to an embodiment. An Offering Memorandum is created as a PDF 201. The offering memorandum may contain asset information, third party verification, and the ENV value (electronic carbon footprint tag). The PDF may be password protected to prevent editing or copying. The password can be randomly generated, and kept or discarded if no intention of ever editing the file. A hash is generated 203 (hash1) from the PDF. This is used to verify the integrity of the PDF file. The Hash1 will be published in public Ethereum chain as a verification for the PDF in the NFDT and smart contract to ensure authenticity. The PDF is then uploaded to a website 205. In one embodiment the PDF is uploaded to a section in an exchange (e.g. CTX.sg) and we publish the Hash1 in the NFDT in public Ethereum. Hash1 can be used by the public to verify the integrity of the file. We then create an NFDT 207. This is based on ERC 721 (NFT standard). NFDT is a time series of ERC-721 contract, with time N Smart Contract having an identifier linked to the address of the smart contract at Time N−1. The first ERC-721 will contain the URL link to the PDF and Hash1 of the PDF file. This serves as the birth smart contract of the NFDT. We then create CNTs 209. This is based on ERC-20. The Smart Contract with identifier linked to the address of the birth ERC-721 contract of the NFDT will contain the URL link the same as that of NFDT it is pointing to. This is more broadly how an asset backed token (ABT), used for carbon emitters or assets, is generated. We then connect to the Ethereum network 211. Anyone who comes across the NFDT and ABT (or CNT in this example) in the blockchain will be able to access the PDF via the published URL. The PDF file will be verified by the published hash code to ensure authenticity.

Figure 2B:
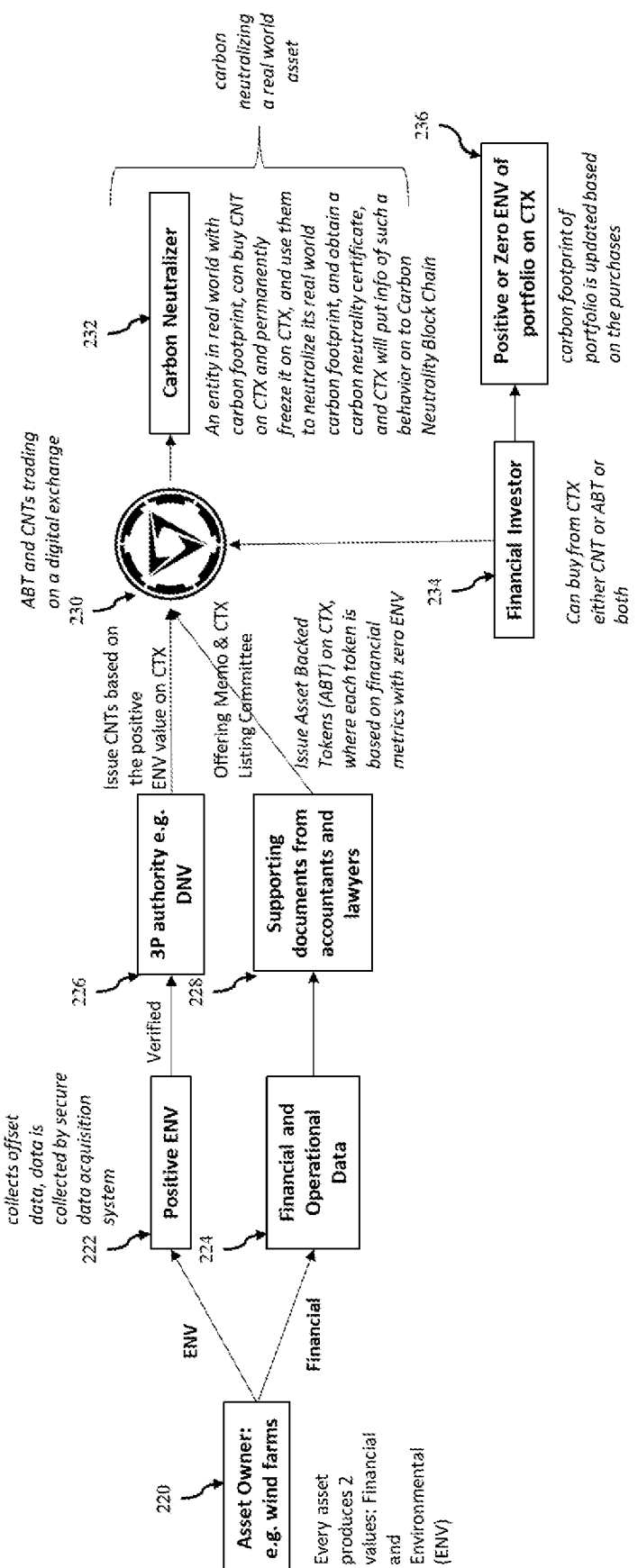
FIG. 2B is a schematic diagram of an asset owner with a positive environmental footprint (positive ENV) which is used to generate carbon neutrality tokens (CNTs) according to an embodiment.

FIG. 2B is a schematic diagram of an asset owner 220 with a positive environmental footprint (positive ENV) 222 which is used to generate carbon neutrality tokens (CNTs) according to an embodiment. Every asset produces 2 values: Financial data and/or operational data 224 and Environmental (ENV) data 222. The environmental data comprises offset data collected from the asset. The data may be collects using a secure data acquisition system as described below. The ENV data 222 is verified 226 by a third party authority and used to use CNTs. Additionally financial and operational data 224 is prepared and verified by third party accountants and lawyers who provide additional or supporting documents to verify the financial and operational data 228. An offering memorandum is filed with the exchange 230 (CTX) and reviewed by a listing committee. Asset Backed Tokens (ABT) may then be issued and listed on the exchange 230, where each asset backed token is based on one or more financial and/or operational metrics from the financial and/or operational data with zero ENV. ABT and CNTs may be traded on the digital exchange 230. CNTs can then be used to carbon neutralize a real world asset 232. That is an entity in real world with carbon footprint, can buy CNT on the exchange 230 and permanently freeze it, and use them to neutralize its real world carbon footprint, and obtain a carbon neutrality certificate, and the exchange (CTX) will save information of such a behaviour on to Carbon Neutrality Block Chain. A financial investor 234 can buy from the exchange (CTX) a CNT, an ABT or both and the carbon footprint of portfolio is updated based on the purchases to obtain a positive or zero ENV portfolio 236 on the exchange.

Figure 2C:
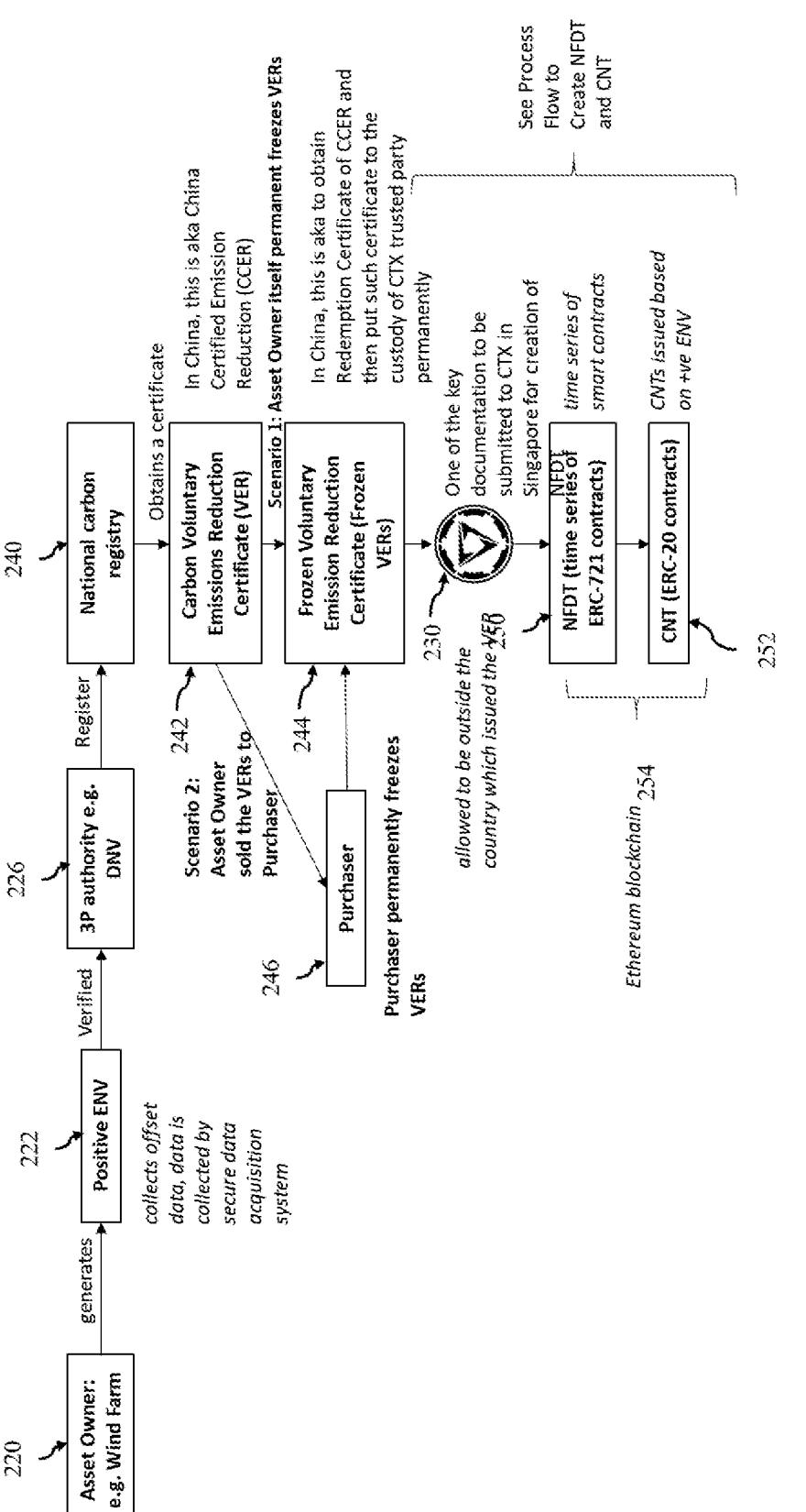
FIG. 2C is a schematic diagram of an asset owner with a positive environmental footprint (positive ENV) which is used to generate voluntary emission reduction certificates which are sold to a purchaser who uses the voluntary emission reduction certificates to obtain carbon neutrality tokens (CNTs) and generate an NFDT representing the asset according to an embodiment.

FIG. 2C is a schematic diagram of an asset owner 220 with a positive environmental footprint (positive ENV) which is used to generate voluntary emission reduction certificates which are sold to a purchaser 246 who uses the voluntary emission reduction certificates 242 to obtain carbon neutrality tokens (CNTs) 252 and generate an NFDT 250 representing the asset on an Ethereum blockchain 254 according to an embodiment. This figure illustrates registration of the offsetting activity with a national carbon registry 240, issuance of a voluntary emission reduction certificate which is then frozen in the carbon registry which triggers issuance of a redemption certificate. This may be done by the original asset owner, or by a purchaser 246. As discussed above these are submitted to the exchange 230 which allows creation of the NFDT and CNTs which may be traded outside of the original county which issued the VER.

Figure 2D:
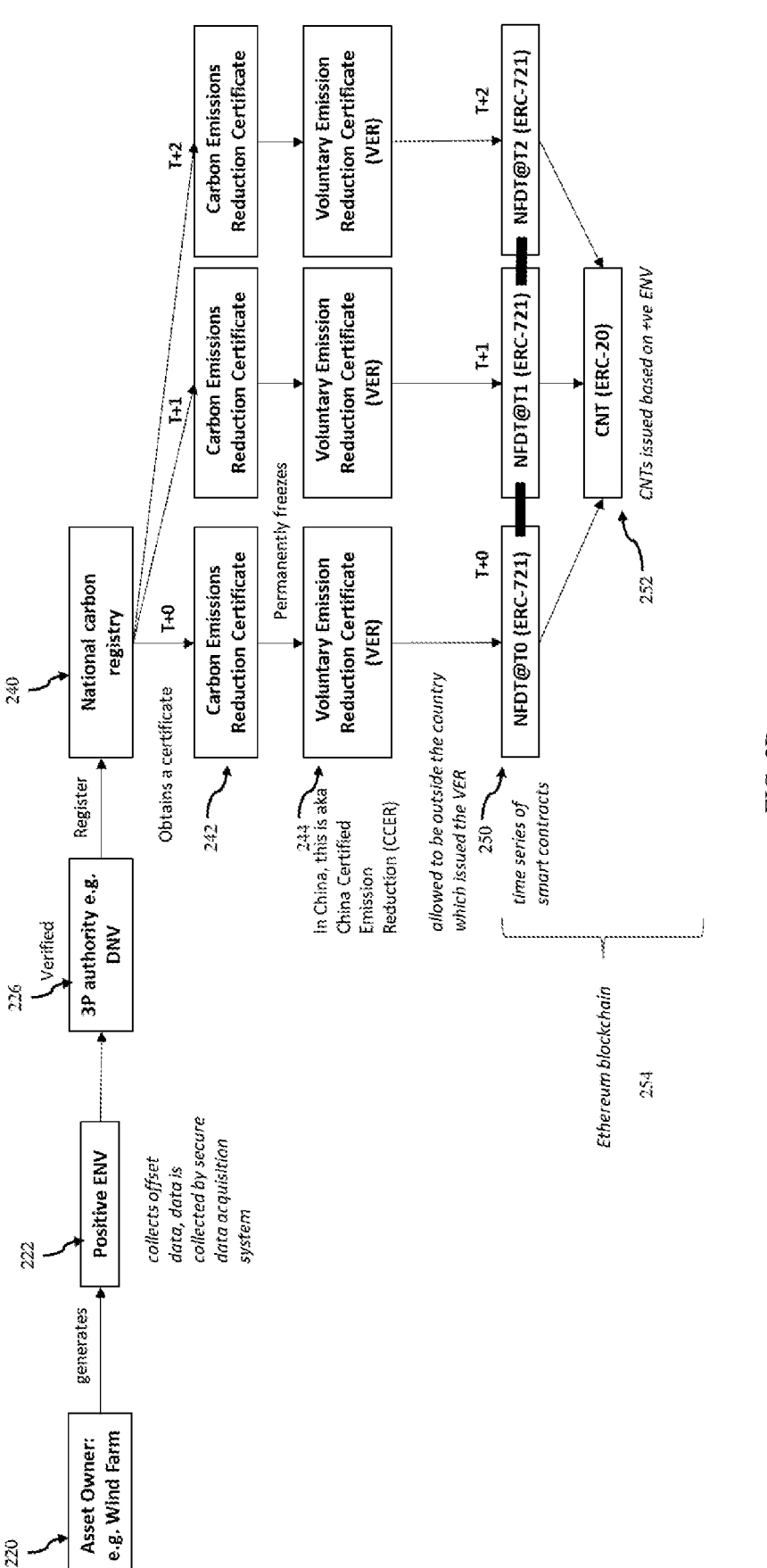
FIG. 2D is a schematic diagram of an asset owner with a negative environmental footprint (negative ENV; i.e. generates carbon emissions) which is listed on a digital asset trading exchange, in which the negative carbon footprint can be offset by also purchasing CNTs according to an embodiment.

FIG. 2D is a schematic diagram of an asset owner 260 with a negative environmental footprint (negative ENV) 262 (i.e. generates carbon emissions) which is listed on the digital asset trading exchange 230, in which the negative carbon footprint can be offset by an investor 232 by also purchasing CNTs according to an embodiment. As discussed in FIG. 2B, the financial and/or operational data is prepared and submitted to the exchange which issues asset backed token (ABT) with negative ENV based on this information, such as one or more numerical/quantitative metrics within the financial and/or operational data (e.g. profit, revenue, number of products sold, production rate, uptime or percentage uptime, etc). The ABTs with negative ENV may be traded by the asset owner, who may buy some CNTS to offset the negative ENV. Alternatively or additionally CNTs may be bundled with listed assets to enable the asset owner to satisfy ESG requirements from shareholders or listing venue.

Figure 2E:
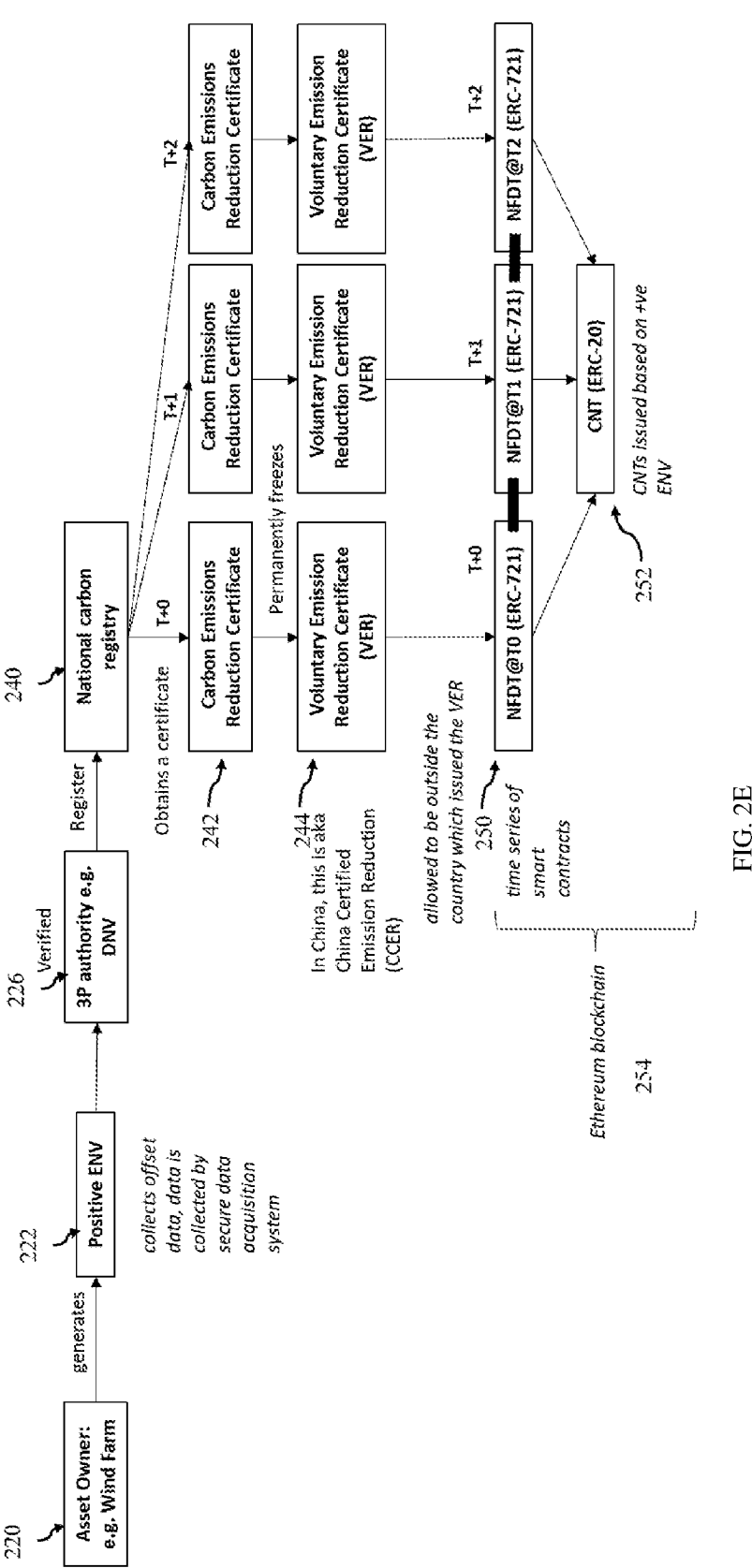
FIG. 2E is a flowchart of a method for creating an NFDT for representing an asset with a positive environmental footprint (positive ENV) according to an embodiment.

FIG. 2E is a flowchart of a method for creating an NFDT 250 for representing an asset 220 with a positive environmental footprint (positive ENV 222) according to an embodiment. At times T0, T+1 and T+2, we obtain carbon emissions reduction certificates 242, redemption certificates 244 and uses this publish a series of smart contracts 250 where each smart contract links to the previous smart contract, and are used to generate CNTs 252.

Figure 2F:
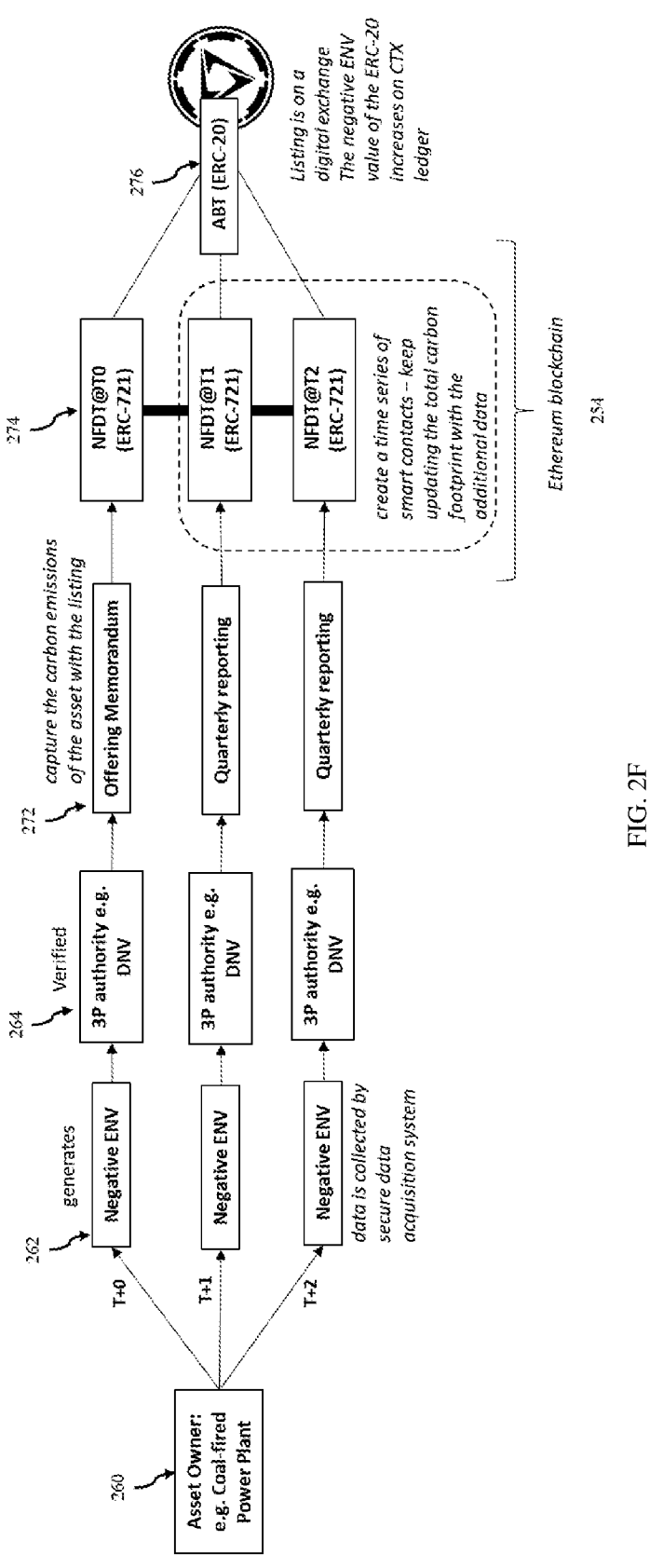
FIG. 2F is a flowchart of a method for creating an NFDT for representing an asset with a negative environmental footprint (negative ENV) according to an embodiment.

FIG. 2F is a flowchart of a method for creating an NFDT 274 for representing an asset 260 with a negative environmental footprint (negative ENV; 262) according to an embodiment. The offering memorandum 272 captures the carbon emissions of the asset at the time of listing and is used to form the birth contract at TO. Quarterly reports are then generated, each of which capture additional emissions, and each of which are used to publish additional smart contracts to form a time series of linked smart contracts 274 which may be used to issue asset backed tokens ABTs, and the ENV value on the ledger is updated after each smart contract 276.

According to an embodiment, the CNT holder 120 may also be an asset holder at the same time, and it can trade its CNTs in the exchange, or, alternatively, hold the CNTs for its own use.

According to an embodiment, the CNTs and corresponding carbon offsetting data may be fixed and stored by using a blockchain and/or a smart contract, and the blockchain and/or smart contract may be provided and maintained by the exchange 110 or an independent third party.

According to an embodiment, the value of ENV and corresponding carbon emission data may also be fixed and stored by using a blockchain and/or a smart contract, and the blockchain and/or smart contract may be provided and maintained by the exchange 110 or an independent third party.

According to other embodiments, the CNT holder 120 might not hold assets to be traded in the exchange, e.g., when the CNT holder 120 is an individual or an environmental organization, but simply contribute to carbon offsetting by performing green actions, such as green transportation, planting trees and waste sorting, and thus receive corresponding CNTs.

According to an embodiment, the third party entity 140 may monitor, calculate and evaluate the assets of the asset holder 130 for the carbon footprint attribute (ENV) value, and may also have the ability to monitor, calculate and evaluate the generation of CNTs. In some embodiments, the third party entity calculates and/or audits the data corresponding to carbon footprint attribute (ENV) values and/or carbon neutrality tokens by an offline means; in other embodiments, the third party entity calculates the carbon footprint attribute (ENV) values and/or the amount of carbon neutrality tokens online and in real-time in the asset trading system, generates a secure digital certificate and triggers a smart contract on a carbon neutrality blockchain according to the secure digital certificate. The present application can be implemented in an online authorization setting, so that companies can authorize access to the third party entity and upload the carbon emission or carbon offsetting data in real time, for real-time or scheduled calculation of ENV or the amount of CNTs. This can greatly improve the efficiency of the third party's calculation and audit of data, and shorten the time of issuing secure digital certificates.

According to different embodiments, the calculation of ENV and the calculation of CNT can be performed by the asset holder 130 and the CNT holder 120 respectively and then audited by the third party entity 140, or, alternatively, the ENV and CNTs can be calculated and determined by the third party entity 140. In some cases, the asset holder may not voluntarily provide its carbon emission data, and the third party entity may determine the ENV of the asset based on a default standard. If the asset holder thinks that the ENV determined by the third party entity based on the default standard is inaccurate, it can file a complaint, and get compensated in the form of CNTs if the complaint is verified by the third party entity.

According to another embodiment, the system may include a supporting system (not shown) that assists the third party entity and the CNT holder in issuing CNTs. For example, the supporting system may include: a data acquisition module for acquiring carbon offsetting action related data from the CNT holder that performs the carbon offsetting action; a calculation module, for assisting third party entity in calculating the positive ENV and the amount of carbon neutrality tokens corresponding to the positive ENV based on the carbon offsetting action related data, wherein the calculating method may be provided by the third party entity or provided by the supporting system and approved by the third party entity; a certification module, for assisting the third party entity in generating a secure digital certificate associated with the amount of CNTs; a communication module, for providing the amount of CNTs and the secure digital certificate in real time to a blockchain for triggering a smart contract, wherein the smart contract may also be provided by the supporting system. Furthermore, according to an embodiment, the blockchain may also be provided by the supporting system.

FIG. 3A is a flow chart of a method 200 for calculating ENV according to an embodiment of the present application.

At step 310, actual carbon emission data corresponding to an asset and normalized carbon emission data of the category of the asset are obtained. Depending on the asset category, the type and amount of the normalized data may vary.

At step 320, the ENV is calculated in a method corresponding to the asset category. Specifically, $$ENV = E_{baseline} - E_{actual} \qquad \text{Equation 1}$$

wherein $E_{Baseline}$ is the $CO_2$ equivalent emission ($tCO_2e$) in a baseline scenario determined according to the normalized carbon emission data of the asset category; $E_{Actual}$ is the $CO_2$ equivalent emission ($tCO2e$) determined according to the actual emission data of the asset.

When the carbon emission of the asset is lower than the baseline value, its ENV is positive, indicating a positive carbon footprint attribute; conversely, when the emission is higher than the baseline value, the ENV is negative.

If a holder holds multiple assets, the sum of the carbon footprint attribute values may be represented by a total attribute value ($ENV_{total}$):

$$ENV_{Total} = \sum_{i=1}^{n} ENV_i \qquad \text{Equation 2}$$

where i is the serial number of an asset and n denotes the number of assets held by the asset holder.

According to the asset tags, the $ENV_{total}$ of the asset portfolio held by an investor in a holding year can be calculated. For example, if in 2021 an asset holder holds a BTC issued in the current year and a thermal power plant asset STO issued in 2019 with a depreciation period of 20 years as shown in Table 1:

TABLE 1

Total ENV of asset portfolio held by an investor in a holding year.

| | ENV (tCO₂e) per Share of Asset | Issuance Year | Duration of Emission (Year) | Number of Shares Held | 2021 |
|---|---|---|---|---|---|
| Thermal power plant asset STO | −100 | 2019 | 2 | 1000 | −200000 |
| BTC | −170 | 2019 | One-time only | 1000 | −170000 |
| | | | | $ENV_{Total}$ (tCO₂e) | −370000 |

When $ENV_{total}$ is 0, it means that all assets of the asset issuer or holder add up to a carbon neutral status; when $ENV_{total}$ is negative, it means that the sum of carbon offsets of the green assets held by the asset issuer or investor cannot balance out the carbon emissions of the high-emission assets held by the asset issuer or inventor.

According to an embodiment, in response to an asset holder choosing not to self-declare carbon emission related data of an asset, the third party entity may set a default ENV for the asset based on the category of the asset. Optionally, the asset holder can apply with the exchange for correcting the ENV bound to its asset within 12 months of the issuance of the asset, by providing an ENV audit report from an authoritative third party entity and related data sources; and the exchange may, after verifying the ENV, record it in the carbon neutrality blockchain and make the correction by granting CNTs or not.

At step 330, the calculated ENV is bound to the asset (for example by including in a smart contract).

For a traditional physical asset, calculating its ENV requires consideration of how long the asset has been held and how the carbon emission of the asset may change over time.

For a commodity/product-based asset, e.g., gold, diamond and bitcoin, its carbon footprint or emission is generated once and for all in the process of acquisition, discovery or production of the commodity/product, and the ENV of the asset and the time of acquisition are recorded in carbon footprint attribute value included in the smart contract of the NFDT at the time of issuance and is thus bound to the asset. For these assets the ENV does not generally change over time, and thus the NFDT may be just the birth contract including the ENV value. A ledger may also be used to store the ENV value.

For example, a mined digital currency such as Bitcoin (BTC) does not generate carbon emissions itself; however, the process of acquiring the virtual asset may consume energy, and the same amount of virtual asset may generate different amounts of carbon emissions.

The calculation method of CNTs is basically the same as that of ENV, and when the calculated ENV is a positive value, a corresponding amount of CNTs can be obtained. According to an embodiment, the positive ENV provided or the corresponding certification report is valid only after verification by an authoritative third party entity.

According to an embodiment, an upper limit can be set for each CNT holder on the amount of CNTs can be obtained per year, i.e., a carbon offset that is verifiable by a third party and is below a baseline emission standard:

$$CNT_{Max} = \sum_{i=1}^{n} \left( E_{Baseline}^{i} - E_{Actual}^{i} \right) \qquad \text{Equation 3}$$

wherein $CNT_{MAX}$ is the upper limit on the number of CNTs that can be obtained per year, i is the serial number of an asset that satisfy the carbon offsetting standard, n is the number of all assets that satisfy the carbon offsetting standard, $E_{Baseline}$ is the baseline emission corresponding to the asset category and verified by a third party authority, and $E_{Actual}$ is the actual emission that is verified by a third party entity.

According to other embodiments, planting one tree may correspond to one CNT; as a matter of course, an upper limit may be set on the amount of CNTs obtained in a year.

According to an embodiment, an exchange may trigger a smart contract on the carbon neutrality chain to issue and store the ENV and/or CNTs of an asset. For example, an organization may be verified by a third party authoritative entity in a monitorable, traceable and quantifiable manner. For example, if in 2021 10,000 tCO$_2$e of positive ENV from green transportation by consumers are aggregated, 10,000 CNTs can be generated on the CNT chain. The economic benefits brought by the CNTs can be distributed to the consumers through the platform, thus promoting green consumption.

Different types of companies or projects may use different methods for calculating ENV or CNTs, especially for virtual assets such as bitcoin. Calculation methods for different asset categories including bitcoin, green transportation, photovoltaic and wind energy generation, and building distributed energy resource system are described below as examples.

According to an embodiment, for a project-based asset that continuously generates greenhouse gas emissions, such as thermal power plants, photovoltaic power plants and chemical plants, the ENV of the asset is the yearly average of a CO$_2$ equivalent emission above a limit value, calculated according to the size of the asset:

$$ENV_{ave} = ENV_{LC}/n \qquad \text{Equation 4}$$

wherein n is the depreciation period of the asset; $ENV_{LC}$ is the total carbon footprint attribute value of the asset over its lifetime, assuming the emission is same for every year. When the asset is issued in the exchange, an electronic tag for the carbon footprint attribute will be recorded with the $ENV_{ave}$ of the asset and a starting year of the asset $T_1$. The investor holding the asset at time T has an ENV value of $(T-T_1) \cdot ENV_{ave}$ for the asset. Additionally, the ENV of the project-based asset may be determined accumulatively based on each year audited ENV value of the asset, wherein the audited ENV value may be based on audit report from authoritative third party entities and related data sources.

According to an embodiment, because miners mining bitcoins do extensive calculations and consume power, the acquisition of a bitcoin generates a certain amount of carbon emission. The carbon footprint of bitcoin mining over a certain period of time and space depends mainly on:

HP_s: a computational power required to mine one BTC per unit time (one hour), as determined based on the computational power difficulty of the bitcoin operating network in that period of time;

P_to_H: power-to-computational power ratios of all miners in that time and space;

PUE: a ratio between a total energy consumption of all mines (including auxiliary equipment such as heat sinks) and energy consumption of the miners in that time and space, because the mine consumes energy in its other parts than the miners; and EF: an average grid carbon emission factor for the region. Wherein, the carbon emission factor may be different depending on the region where the mine operates, as well as the type of energy used.

In case of thermal power, the carbon emission factor is calculated according to a national thermal power average carbon emission factor: 0.997 kg/kwh; in case of dedicated power supply such as photovoltaic, hydropower and wind power, the carbon emission factor can be deemed as 0 kg/kwh; in case of commercial power supply, the carbon emission factor is calculated based on operating margin emission factor of the region and according to a regional power grid carbon emission factor in China.

Then, the average carbon footprint of each bitcoin in that time and space is:

$$E_{actual} = HP\_s \cdot P\_to\_H \cdot PUE \cdot EF \qquad \text{Equation 5}$$

The power-to-computational power ratio, P_to_H, of a miner can be calculated in several ways.

Calculation Method 1:

P_to_H is obtained by training with the following data (Hardware_data, Power_data, Hp_data). By supervised learning, Hardware_data (a database of performance parameters of all available miners in the market worldwide), Power_data (a database of energy consumption data of all known mines worldwide) and Hp_data (a database of computational powers of all known mines worldwide) are used to train and predict an average P_to_H in a given time and space;

Calculation Method 2:

$$P\_to\_H = \iint_{Time,Space}(\text{Difficulty\_Data}, BTC\_\text{Price}, \text{Power\_Price\_Data}, \text{Capex}, \text{Profit\_Margin}, L) \qquad \text{Equation 6}$$

wherein

Difficulty_Data is a global computational power variation curve;

Power_Price_Data is an electricity price in that time and space;

Capex is a miner hardware cost level in that time and space;

Profit_Margin is a minimum profit margin level for the owner of the bitcoin mine to maintain the mine in operation in that time and space;

L is the lag time between the owner deciding to replace equipment/a miner and the actual replacement of the equipment, in other words, the time required for replacing the miner; and BTC_Price is a bitcoin price variation curve.

By the method above, the lag time of hardware replacement decision is considered, and bitcoin price variation in the time and space, computational power requirement, bitcoin mining costs (capital expenditures and operating expenses) and the minimum profit margin requirement of the owner are all taken into consideration, to calculate a minimum P_to_HP that meets the requirements above.

Assuming a profit margin expectation is 30%, whether the profit margin expectation can be met based on current P_to_HP has to be judged, if not, the owner has an incentive to replace the miner (by a more expensive or cheaper one) to meet the profit margin. There may be a lag time L between the deciding to replace the miner and the actual replacement taking place, and taking this lag time into account can make the calculation result more accurate.

Alternative methods may also be used, for example in a mining area, Equation 5 may be modified by replacing HP_s·P_to_H with P*t where P is the average power of the mining machine used (kW) and t is time required to generate a bitcoin for the average hashing power of miner's hardware (hours). The average time t required for each miner to theoretically generate a bitcoin depends on the computational power (hashing power, HP, TH/h) of the mining machine itself and the mining difficulty (network hashrate requirement) defined in pay per share (PPS, 1 BTC/h·TH) is then t=1/(PPS;HP). According to the rules of bitcoin generation, the fluctuation of PPS mainly depends on the mining difficulty and the periodic halving of bitcoin reward. Among them, mining difficulty is a measure of hashrate required to generate new trading blocks. As time goes on, the mining difficulty of bitcoin gradually increases, so we need to select the mining machine with the more powerful computing power.

On average Bitcoin generates one block every 10 minutes. After every 210,000 blocks, the block reward is halved. Therefore, the bitcoin reward is halved every four years on average. In order to ensure that there is an average block every 10 minutes, the difficulty of bitcoin will be adjusted dynamically, once in each cycle, and thus with 2016 blocks in each cycle the difficulty will be adjusted once in 14 days (on average). Each block contains a certain number of bitcoins. Initially, each block contains 50 bitcoins, which is halved every four years on average. The current block reward is 6.25, and the next (fourth) halving time is expected to be Mar. 16, 2024. With the increase of the number of mining personnel and mining machines, the computing power of the whole network will be improved. In order to ensure the stability of the block time, the difficulty will also be increased, which makes the PPS smaller, and the mining time t increased. Due to the increase in global computing power and the increase in difficulty of computing power is much faster than the increase in the efficiency of mining machines, the carbon footprint generated by bitcoin is increasing rapidly.

Based on the above calculation principle, the exchange may use the following parameters to calculate the default carbon emission value (ENV value) of bitcoin issued in the exchange. According to the default ENV value issuance rules in the exchange, this group of coefficients represents the calculation power and energy consumption standards of industry level mining machines that are relatively backward in the issuance. P=3360, HP=80;PPS=0.0000065; PUE=1.1 and EF=0.997. Based on these values the time required for single mining machine to dig out a bitcoin is t=49156.2 h and the carbon emission of a bitcoin is then E=P*t*PUE*EF=~173.1tCO2e. Thus the default ENV for bitcoin issued on the exchange on January 2021 is defined as −170 tCO2e. If the actual mining machine has a higher energy efficiency ratio, then this value would change (for example if P was 3245 W then it reduces to −130). The issuer may issue the difference between the default ENV and the actual ENV, i.e. 40 CNT, if the issuer can pass the authoritative certification of a third party, and prove that it does use the mine machine and verify that the carbon footprint is −130 tCO2e. If an issuer passes the authoritative certification of a third party to proves that its bitcoin is completely generated from renewable energy (such as hydropower), and proves that its emission factor is 0, the actual ENV of the bitcoin is 0, and the issuer can issue 170 CNTs.

The methods above are also applicable to other digital currencies need to be mined such as Ethereum (ETH).

According to an embodiment, when clean energy is used as the driving source of vehicles for green transportation, for example, when electric vehicles or hydrogen vehicles are used for transportation, $E_{baseline}$ can be determined according to the existing carbon emission generated by, e.g., gasoline or diesel vehicles, and an estimated carbon emission can be determined according to green transportation data including but not limited to actual electricity consumptions by the vehicles each time at a driving speed and range, and in combination of the grid carbon emission factor of the region and a fossil fuel emission factor. Because the data of shared mobility or online ride-hailing platforms is easier to be obtained and analyzed, an online ride-hailing platform operating on green transportation is described below as an example:

Green transportation carbon emission $E_{actual}$=actual electricity consumption per order*regional power grid carbon emission factor.

Fossil fuel transportation carbon emission $E_{baseline}$=Fossil fuel consumption by a combustion vehicle obtained by simulation using digital twin technology under the boundary conditions of an actual order*fossil fuel carbon emission factor.

More specifically, the online ride-hailing platform may output in real time electric vehicle driving conditions, including but not limited to, clean energy vehicle charging and discharging data, driving speed, range and other driving data; all the boundary conditions may be input into a digital twin simulation system, and through computer simulation, the fossil fuel consumption and carbon emission of a combustion vehicle under the same operating conditions are calculated according to the boundary conditions, so as to determine the carbon emission of the combustion vehicle under the same order conditions.

Then, the carbon offset of the new energy vehicle per order is as per Equation 1: $ENV=E_{baseline}-E_{actual}$.

In particular, the online ride-hailing platform may upload in real time the required data at the end of each order; using the approaches previously discussed, the ENV of each order can be calculated and electronically verified by a third party, and the CNTs can be obtained. Similarly, shared bicycle or payment systems can also upload the data in real time and calculate the CNTs.

According to other embodiments, the calculation method above is also applicable to personal or office use of transportation.

According to an embodiment, for photovoltaic or wind energy generation projects, the CNTs can also be calculated. Because photovoltaic and wind energy generation do not consume carbon-emitting energy, $E_{actual}$ is 0 and the final ENV is $E_{Baseline}$, and the corresponding CNTs can be obtained, i.e., $ENV$=on-grid energy*carbon emission factor of a regional power grid;

wherein the on-grid energy is the actual on-grid energy of the photovoltaic/wind energy generation plant; the carbon emission factor is the carbon emission factor of a thermal power plant when generating the same on-grid energy.

Parameters associated with the on-grid energy include but are not limited to: installed capacity of the photovoltaic/ wind energy generation plant, the region where it locates, and the number of hours of energy generation. The on-grid energy can be calculated from the installed capacity and the number of hours of power generation.

According to an embodiment, for carbon offsetting in a distributed energy resource project such as a microgrid, the CNTs can also be calculated. Associated parameters include, but are not limited to, a self-generated electricity/energy of the microgrid by the buildings/residential users in the microgrid, outsourcing electricity, on-grid energy (electricity sold to power grid outside the microgrid), and electricity purchased or sold within the system by the users. The carbon emission resulting from energy consumption by the actual operation of the project can be calculated, as well as a baseline carbon emission based on the same boundary conditions of the project for an equivalent scenario where a conventional energy system provided by municipality is used.

Wherein, the actual carbon emission of the project is defined as a carbon emission difference between the actual operating scenario ($E_{actual}$) and a scenario where the microgrid does not exist and all relies on the conventional grid ($E_{baseline}$) according to equation 1: $ENV=E_{baseline}-E_{actual}$.

Wherein, because the carbon emission of energy consumed by the new energy microgrid is zero, $E_{actual}$ only comes from the carbon emissions corresponding to the electricity purchased by the users from the conventional grid (outsourcing electricity), and can be calculated according to the following equation:

$$E_{actual} = \int_{T1}^{T2} \sum_i^N Q_{purchsed\ electricity}(t) \cdot EF(t)$$

Equation 7

And the total electricity used by a user is the sum of outsourcing electricity from the power grid outside the microgrid, electricity purchased from other users in the microgrid, self-generated electricity that is sold to the power grid outside the microgrid (on-grid energy) and that is sold to other users in the microgrid, thus:

$$E_{baseline} =$$

Equation 8

$$\int_{T1}^{T2} \sum_{i=1}^N [Q_{self-generated,i}(t) + Q_{outsourcing,i}(t)Q_{on-grid,i}(t) +$$

$$Q_{sold-within-microgrid,i}(t) + Q_{purchased-within-microgrid,i}(t)] \cdot EF(t)$$

wherein $Q_{self-generated}$, i is the amount of electricity generated by a building/residential user in the microgrid area through self-generation;

$Q_{outsourcing}$, is the amount of electricity purchased from a power grid outside the microgrid by a building/residential user in the microgrid area.

$Q_{on-grid}$, i is the amount of on-grid electricity/energy self-generated by a building/residential user in the microgrid area and sold to a power grid outside the microgrid;

$Q_{sold-within-microgrid}$, i is the amount of electricity sold by a building/residential user in the microgrid area to other buildings/residential users within the same microgrid area;

$Q_{purchased-within-microgrid}$, i is the amount of electricity purchased by a building/residential user in the microgrid area from other buildings/residential users in the same microgrid area;

EF(t) is a real-time regional grid carbon emission factor upon comprehensive consideration of the impact of real-time photovoltaic electricity feed-in within the microgrid region on the regional grid carbon emission factor.

Carbon offset is then given according to Equation 1 ($ENV=E_{actual}-E_{baseline}$).

Particularly, the present method, in addition to considering the carbon offset brought by the microgrid system, also considering the microgrid data can be captured in real time, calculates in real time a weighted average of the energy generation data in the regional grid, and obtains a real-time regional grid carbon emission factor.

FIG. 3B is a flowchart of a method 340 for trading carbon neutrality tokens CNT according to an embodiment of the present application.

At step 350, the ENV of an asset to be traded is calculated based on a default standard or carbon emission related data generated by acquiring or maintaining the asset, and the ENV is bound to the asset.

At step 360, the CNTs are custodized.

At step 370, after a CNTs transaction between an asset holder with a negative ENV and a CNT holder, the $ENV_{total}$ of the asset holder is updated.

Optionally, at step 380, the CNT transaction record is stored on a carbon neutrality blockchain. Blockchain technology and smart contracts are used to build a distributed shared account book and database, its characteristics of decentralized, tamper-proof, tamper-evident, traceability, collectively maintain and openness and transparency are effective in recording actions up to any point of time, which is important for users and regulators to analyze and track these actions.

Tables 2 and 3 show the changes of account details before and after transactions between the two parties.

TABLE 2

| Account Details Before Transaction | | | | | | | | | |
|---|---|---|---|---|---|---|---|---|---|
| Account A before Transaction | | | | | Account B before Transaction | | | | |
| $ECON_{Total} = \$6M$ | | | | | $ECON_{Total} = \$200000$ | | | | |
| $ENV_{Total} = -17000$ | | | | | $ENV_{Total} = 20000$ | | | | |
| Asset | Asset Category | # of shares | ECON | ENV | Asset | Asset Category | # of shares | ECON | ENV |
| BTC | Token Coin | 100 | $5M | −17000 | CNT | Token Coin | 20000 | $200000 | 20000 |
| USD | Legal Currency | N.A. | $1M | 0 | | | | | |

TABLE 3

| Account Details After Transaction | | | | | | | | | |
|---|---|---|---|---|---|---|---|---|---|
| Account A after Transaction | | | | | Account B after Transaction | | | | |
| $ECON_{Total} = \$6M$ $ENV_{Total} = 0$ | | | | | $ECON_{Total} = \$200000$ $ENV_{Total} = 3000$ | | | | |
| Asset | Asset Category | # of shares | ECON | ENV | Asset | Asset Category | # of shares | ECON | ENV |
| BTC | Token Coin | 100 | $5M | −17000 | CNT | Token Coin | 3000 | $30000 | 3000 |
| CNT | Token Coin | 17000 | $170000 | 17000 | USD | Legal Currency | N.A. | $170000 | 0 |
| USD | Legal Currency | N.A. | $830000 | 0 | | | | | |

As shown in the tables, an account A buys 17000 CNTs from an account B. Wherein the market price of CNT is $10/CNT. Before the transaction, the account A has a total carbon footprint attribute value $ENV_{Total}$ of −17000; the account B has a total carbon footprint attribute value $ENV_{Total}$ of 20000 and a CNT value of 20000. The account A spends $170000 to buy 17000 CNTs at a price of $10/CNT. After the transaction, the $ENV_{Total}$ in account A is zero; accordingly, the income in account B is $170000 and its CNT balance is 3000.

Based on the above discussion we can now define embodiments of methods for generating carbon neutrality tokens, generating a digital representation of an asset for trading, and methods for trading on a digital exchange that takes into account the carbon footprint of assets.

FIGS. 4A and 4B are a flowchart of a method 400 for generating a plurality of carbon neutrality tokens representing carbon offsetting action for trading according to an embodiment. The method may comprise:

Obtaining 401 a carbon emission reduction certificate and a carbon emission redemption certificate from an issuing authority in a country in relation to a carbon offsetting action which generated an amount of carbon emission reductions. The amount of carbon emission reductions is verified by a third party verification authority or the issuing authority, and the redemption certificate prevents further trading of the carbon emission reduction certificate in the country.

Placing the carbon emission redemption certificate in a custody to prevent further trading or use of the carbon emission reduction certificate 402.

Generating and storing 403 an information package at a report address, wherein the information package comprises at least the amount of carbon emission reductions, the carbon emission reduction certificate, the redemption certificate and information regarding the carbon offsetting action. Additional information in including basic information on the asset that generated the carbon emission reductions and data used to calculate the emission reductions may also be included.

Cryptographically signing the information package and obtaining a hash for authenticating the information package 404. In an embodiment where a trading platform such as an digital trading exchange is involved, the information package may be each cryptographically signed by the exchange listing committee, the issuer and the key service providers for the information package and multiple hashes may be generated which are used to authenticate and verify the information package or components contained therein.

Inputting 405 at least an owner address, an identifier, the amount of carbon emission reductions, the report address, and the hash of the information package to an emission reduction smart contract in a blockchain, wherein once published on the blockchain, the emission reduction smart contract defines a birth smart contract and the submitted information is stored on the blockchain at a birth smart contract address.

Using the birth smart contract and the amount of carbon emission reductions contained therein to obtain a plurality of carbon neutrality tokens (CNTs) 406 by executing a CNT smart contract on the blockchain, wherein the amount of carbon neutrality tokens issued is determined from the amount of carbon emission reductions in the birth smart contract.

Storing the plurality of CNTs 407. This may be in a cold wallet, on a blockchain, or other storage location.

Offering one or more of the plurality of CNTs for trading 408.

Publishing 409 a plurality of emission reduction smart contracts on the blockchain where each is published at a different time, and each emission reduction smart contract after the birth smart contract includes an amount of additional carbon emission reductions since the previous emission reduction smart contract was published, and a link to one or more of the previous emission reduction smart contracts published on the blockchain including the birth smart contract. The birth smart contract and plurality of emission reduction smart contracts form a time series of emission reduction smart contracts which define a unique Non-Fungible Digital Twin (NFDT) representation of the offsetting action. Further if the amount of additional carbon emission reductions in one of the plurality of emission reduction smart contracts is positive, then using the respective emission reduction smart contract to obtain an additional plurality of carbon neutrality tokens (CNTs) by executing a CNT smart contract on the blockchain, wherein the amount of carbon neutrality tokens issued is determined from the amount of carbon emission reductions in the respective emission reduction smart contract; storing the additional plurality of CNTs; and offering one or more of the additional plurality of CNTs for trading.

The above method may be varied and refined. In one embodiment for each emission reduction smart contract in the plurality of emission reduction smart contracts, the method further comprises:

obtaining a subsequent carbon emission reduction certificate and a subsequent carbon emission redemption certificate from the issuing authority in the country in relation to the carbon offsetting action which generated the additional amount of carbon emission reductions, wherein the additional amount of carbon emission reductions is verified by a third party verification authority or the issuing authority, and the subsequent redemption certificate prevents further trading of the carbon emission reduction certificate in the country;

placing the subsequent carbon emission redemption certificate in the custody to prevent further trading or use of the subsequent carbon emission reduction certificate;

generating and storing a subsequent information package at a subsequent report address, wherein the subsequent information package comprises at least the amount of additional carbon emission reductions, the subsequent carbon emission reduction certificate, and the subsequent redemption certificate;

cryptographically signing the subsequent information package and obtaining a subsequent hash for authenticating the subsequent information package; and inputting at least the owner address, the identifier, the additional amount of carbon emission reductions, the subsequent report address, and subsequent the hash of the subsequent information package to the emission reduction smart contract in the blockchain, wherein once published on the blockchain the emission reduction smart contract forms a subsequent emission reduction smart contract of the NFDT and the submitted information is stored on the blockchain at a subsequent smart contract address.

The CNTs may be offered for trading outside of the country which issued the carbon emission reduction certificate. The CNTs may be offered for trading on a digital asset trading exchange which maintains a ledger of CNTs for trading on the digital asset trading exchange, and the plurality of CNTs are stored in a cold wallet associated with digital asset trading exchange. The digital asset trading exchange may comprises a plurality of listings where each listing is a digital representation of an asset that is available for trading on the digital asset trading exchange by an issuing entity, and the ledger stores a carbon footprint attribute value of each listed asset.

An issuing entity of an asset with a carbon offsetting action creates an NFDT on the digital asset trading exchange to represent the asset associated with a carbon offsetting action and lists a plurality of asset-backed tokens each with a zero carbon footprint attribute value representing a financial aspect of the asset and a plurality of CNTs generated due to the carbon offsetting action;

an issuing entity of an asset that generates carbon emissions creates an NFDT on the digital asset trading exchange to represent the asset that generates the carbon emissions and lists a plurality of asset-backed tokens each with a negative carbon footprint attribute value due to carbon emissions associated with the asset, wherein the carbon footprint attribute value is updated on the ledger as additional carbon emissions data is obtained over time, wherein the carbon footprint attribute value for each listing traded on the digital asset trading exchange is tracked through the ledger of the digital asset trading exchange, and the digital asset trading exchange is configured to provide an investor on the digital asset trading exchange holding a portfolio of investments on the exchange with a portfolio value of the portfolio and a carbon footprint attribute value of the portfolio obtained by summing the carbon footprint attribute value of each investment in the portfolio of investments.

Each listing may further comprises one or more Environmental Social and Governance (ESG) metrics, and the ledger tracks each of one or more ESG metrics of each listing, and the digital asset trading exchange is configured to provide an investor on the digital asset trading exchange with a summary of each of the one or more ESG metrics obtaining by summing each of the one or more ESG metrics of each investment in the portfolio of investments. The CNTs may be offered for trading on the digital asset trading exchange as part of a bundle with one or more of the plurality of listings to offset the carbon footprint attribute value of the respective one or more assets associated with the one or more listings.

The method may further comprises permanently freezing one or more CNTs of the plurality of CNTs to achieve carbon neutrality of an neutralization asset comprising:

purchasing, by a first entity, a neutralization amount of CNTs on the exchange;

submitting, by the first entity, a neutralization information package to the digital asset trading exchange comprising at least information on the neutralization asset to be neutralized, a certification of a carbon footprint of the neutralization asset obtained from a third party verification authority, and the purchased neutralization amount of CNTs to be used to offset the carbon footprint;

removing the purchased CNTs from trading on the digital trading exchange and removing from the ledger entry of the first entity;

cryptographically signing the neutralization information package by the digital asset trading exchange and obtaining a neutralization hash for authenticating the neutralization information package;

creating a node on a public carbon neutrality blockchain comprising an address of the neutralization information package, the neutralization hash, and a record indicating that the purchased CNTs are permanently frozen; and issuing, by the digital asset trading exchange, a neutralisation certificate linked to the node.

The method further comprises collecting carbon offsetting data from the carbon offsetting action and submitting the carbon emission data to the third party verification authority to obtain the verified amount of carbon emission reductions. The carbon offsetting data may be obtained using a secure data acquisition system comprising a plurality of hardware and software components which are configured to securely collect and store the carbon offsetting data.

The blockchain may be an Ethereum blockchain, and the emission reduction smart contract is based on the ERC721 standard and the CNT smart contract is based on the ERC20 standard. The report address is a Uniform Resource Identifier (URI) address or a Uniform Resource Locator (URL) address. The plurality of CNTs may be stored in a cold wallet of the exchange for closed-end custody or on a public blockchain.

FIGS. 4C and 4D are a flowchart of a method 410 for generating a digital representation of an asset for trading according to an embodiment of the present application. The method comprises:

Calculating 411, based on a default standard or based on carbon emission related data provided by an asset holder, a carbon footprint attribute value for an asset.

Obtaining 412 a verification certificate from a third party verification authority verifying the carbon footprint attribute value for the asset.

Generating and storing 413 an information package at a report address, wherein the information package comprises at least the carbon footprint attribute value, the verification certificate, and information regarding the carbon footprint of the asset and financial and/or operating information of the asset.

Cryptographically signing the information package and obtaining a hash for authenticating the information package 414.

Inputting 415 at least an asset owner address, an identifier, the carbon footprint attribute value, the report address, and the hash of the information package to an asset smart contract on a blockchain, wherein once published on the blockchain, the asset smart contract defines a birth smart contract and the submitted information is stored on the blockchain at the birth smart contract address.

Listing the asset for trading 416.

Storing the carbon footprint attribute value associated with the asset in a ledger 417.

Publishing 418 a plurality of asset smart contracts on the blockchain where each is published at a different time, and each asset smart contract after the birth smart contract includes an amount of additional carbon emissions since the previous asset smart contract was published, and a link to one or more of the previous asset smart contracts published on the blockchain including the birth smart contract. The birth smart contract and plurality of asset smart contracts form a time series of emission reduction smart contracts which define a unique Non-Fungible Digital Twin (NFDT) representation of the asset, and after additional asset smart contract is published the carbon footprint attribute value associated with the asset in the ledger is updated based on the amount of additional carbon emissions.

The asset may be listed for trading on a digital asset trading exchange, wherein the digital asset trading exchange comprises the ledger. If the carbon footprint attribute value is positive, we may use the asset smart contract to obtain a plurality of carbon neutrality tokens (CNTs) by executing a CNT smart contract on the blockchain and issuing the plurality of CNTs to an issuer and recording on the ledger, wherein the amount of carbon neutrality tokens issued is determined from the carbon footprint attribute value, and the plurality of CNTs are offered for trading, and if the carbon footprint attribute value is negative, using the asset smart contract to obtain a plurality of asset backed tokens by executing an asset backed token smart contract on the blockchain and issuing the ABTs to an issuer and recording on the ledger, wherein the amount of asset backed tokens issued is determined from the financial and/or operating information of the asset (or metrics derived from this data). The method may further comprise collecting carbon emissions data from the asset and submitting the carbon emission data to the third party verification authority to obtain the verified amount of carbon emission reductions. The carbon emissions data may be obtained using a secure data acquisition system comprising a plurality of hardware and software components which are configured to securely collect and store the carbon emissions data. The blockchain may be an Ethereum blockchain, and the asset smart contract is based on the ERC721 standard and the asset backed tokens smart contract is based on the ERC20 standard. The report address may be a Uniform Resource Identifier (URI) address or a Uniform Resource Locator (URL) address.

FIG. 4E is a flowchart of a method 420 for trading on a digital asset trading exchange according to an embodiment of the present application. The method may comprise listing 421 one or more CNTs generated by the method 400 illustrated in FIGS. 4A and 4B. The method may further comprise generating 422 a plurality of listings for a plurality of assets, each generated by the method 410 illustrated in FIGS. 4C and 4D. The method may further comprise updating the ledger 423 when a trader purchases a share of a listed asset by updating a carbon footprint attribute value for the trader stored in the ledger based on the total carbon footprint attribute value associated with the listed asset, and/or updating the ledger when a trader purchases one or more CNTs wherein the carbon footprint attribute value for the trader stored in the ledger is updated based on number of one or more CNTs purchased. In one embodiment, the trader may purchase a bundle, wherein the bundle comprises a share of a listed asset, and an amount of CNTs to offset the carbon emissions associated with the share of the listed asset.

The above embodiments create a new digital representation of assets and carbon offsetting projects we refer to as a Non-Fungible Digital Twin (NFDT). We can thus extend this to generation of a NFDT of any asset. We can thus define method for generating a Non-Fungible Digital Twin (NFDT) of an asset. This could be implemented using a computer system as described herein. The method may comprise:

generating and storing an information package at a report address, wherein the information package comprises information regarding an asset including at least one attribute value;

cryptographically signing the information package and obtaining a hash for authenticating the information package;

inputting at least an owner address, an identifier, the at least one attribute value, the report address, and the hash of the information package to an asset smart contract in a blockchain, wherein once published on the blockchain, the smart contract defines a birth smart contract and the submitted information is stored on the blockchain at a birth smart contract address;

using the birth smart contract to obtain a plurality of Asset Backed Tokens (ABTs) by executing a ABT smart contract on the blockchain, wherein the amount of asset backed tokens issued is determined from the at least one attribute value in the birth smart contract;

storing the plurality of ABTs;

offering one or more of the plurality of ABTs for trading; and publishing a plurality of asset smart contracts on the blockchain where each is published at a different time, wherein the value of the at least one attribute value in each asset smart contract after the birth smart contract is the change in the value since the previous asset smart contract was published, and a link to one or more of the previous asset smart contracts published on the blockchain including the birth smart contract, and each smart contract is used to issuing, storing and offer a plurality of ABTs based on the value in the respective smart contract, wherein the birth smart contract and plurality of emission asset contracts form a time series of asset smart contracts which define a unique Non-Fungible Digital Twin (NFDT) representation of the asset.

The trading system, platform and method provided by the present application directly link carbon emissions to the trading of assets, so that the price and volume of the assets traded can be directly affected by carbon emissions, which enhances the incentive to carbon offsetting or purchasing carbon credits. In addition, the use of such trading system can bring more participants into the carbon trading cycle, capturing carbon emission data more sufficiently and making more sufficient use of carbon offsetting actions, which facilitates a faster and more effective realization of the global emission reduction targets by the international community. In addition, the audit of data and calculations by a third party entity can improve the authenticity and accuracy of ENV and CNTs. The use of blockchain and smart contracts for the storage of ENV and/or CNTs also increases the authenticity. These are not possible with existing carbon trading mechanisms. Additionally, embodiments of the methods and systems enable a cross-border carbon credit trading mechanism without triggering NDC constraints and without dependence on Article 6 of Paris agreement. By allowing emission reduction certificates to be registered in national registries, NDC can be attributed to the source county. These can then be frozen to prevent further use via redemption certificates, and these can also be frozen to prevent their reuse. With this information a digital twin can be created which can then be traded across borders, safe in the knowledge that NDC requirements have been met and accounted for. Embodiments of this system are market based mechanisms and are not reliant on Paris Article 6 and create a truly global carbon trading system to address what is a global problem. The system facilitates ESG reporting for asset holders, and provides much needed carbon footprint visibility to investors, and also enables them to quickly and efficiently determine the carbon footprint of their portfolio. Finally embodiments allow entities to neutralize the carbon footprint of real world assets by permanently freezing CNTs to offset emissions.

Implementation of embodiments of the asset trading system and methods such as illustrated in FIGS. 1 through 4E, and described above is performed using specialised computing apparatus configured to implement embodiments of the trading system including CNT generation. In particular embodiments use secure computing apparatus and devices, blockchain and Smart contract technology. The smart contracts are used to generate a Non-Fungible Digital Twin (NFDT) on the blockchain which represents the real asset and its corresponding carbon footprint attribute (ENV) and from which CNTs may be issued and traded.

Figure 5A:
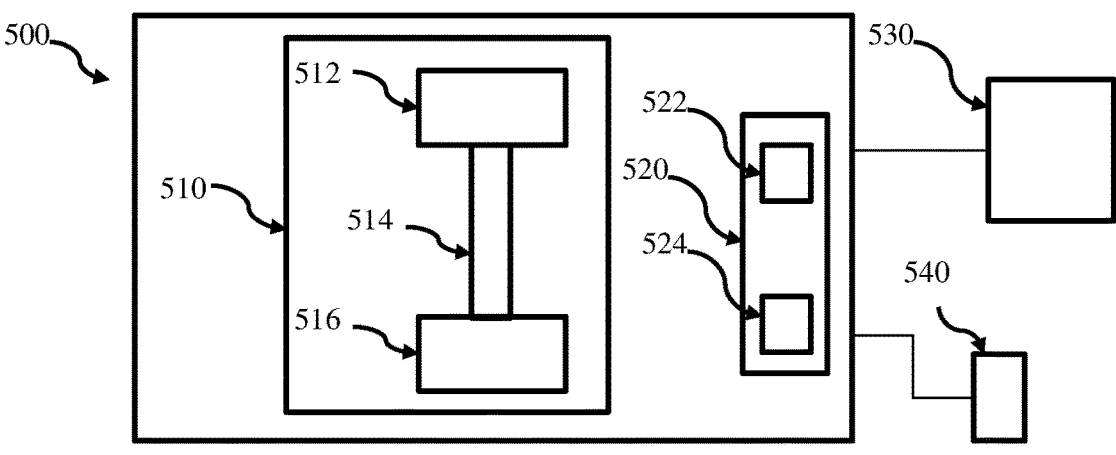
FIG. 5A is a schematic diagram of a secure computing apparatus (or computing platform) according to an embodiment.
Figure 5B:
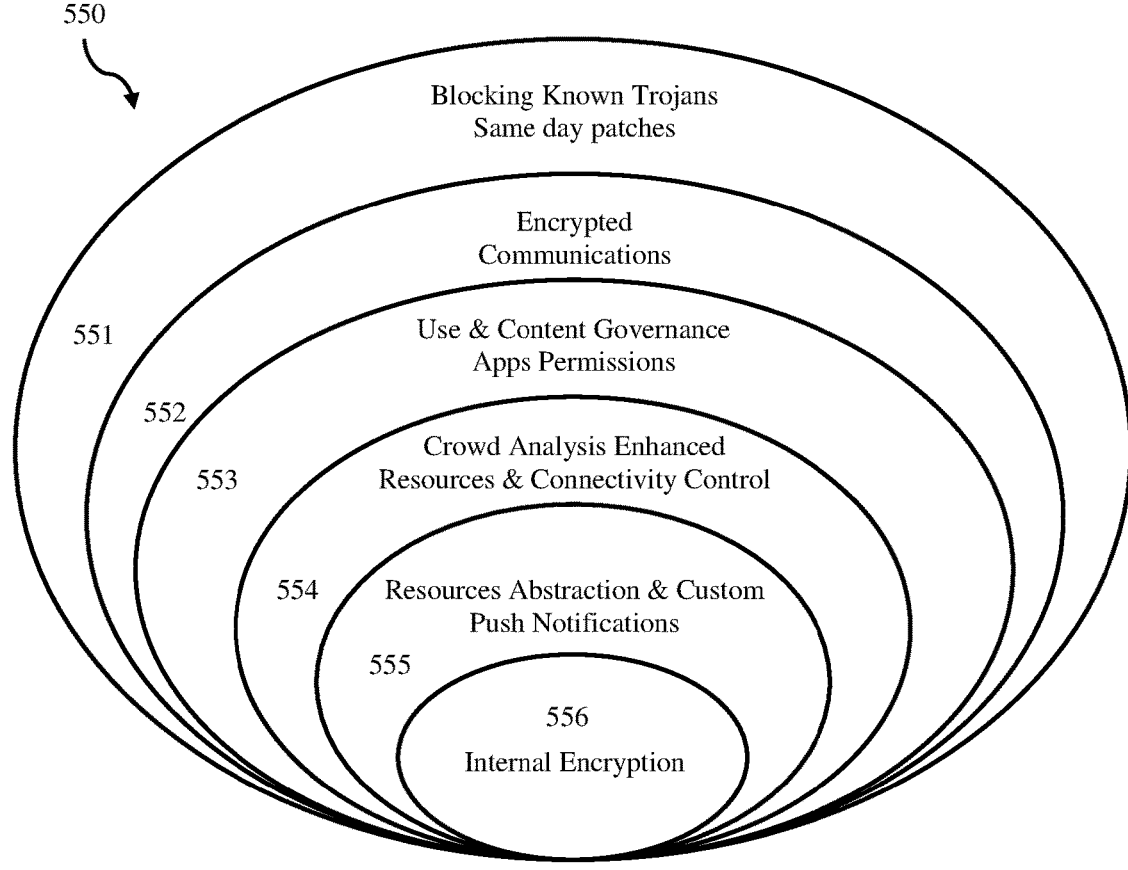
FIG. 5B illustrates a layered security model used in the design of the operating system and operating software of the secure computing apparatus illustrated in FIG. 5A according to an embodiment.
Figure 6:
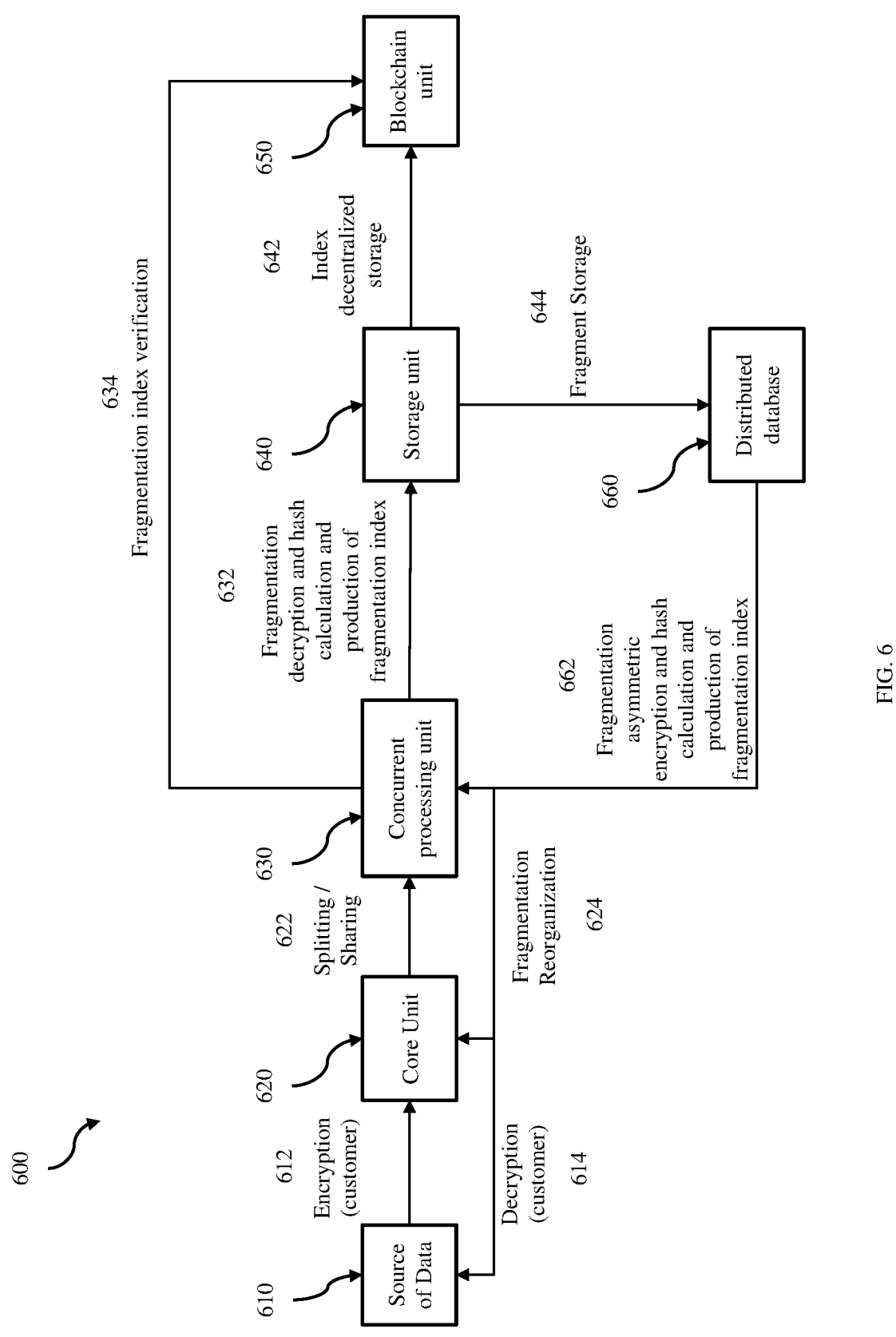
FIG. 6 is a schematic diagram of the data security processing in a secure data acquisition system according to an embodiment.
Figure 7:
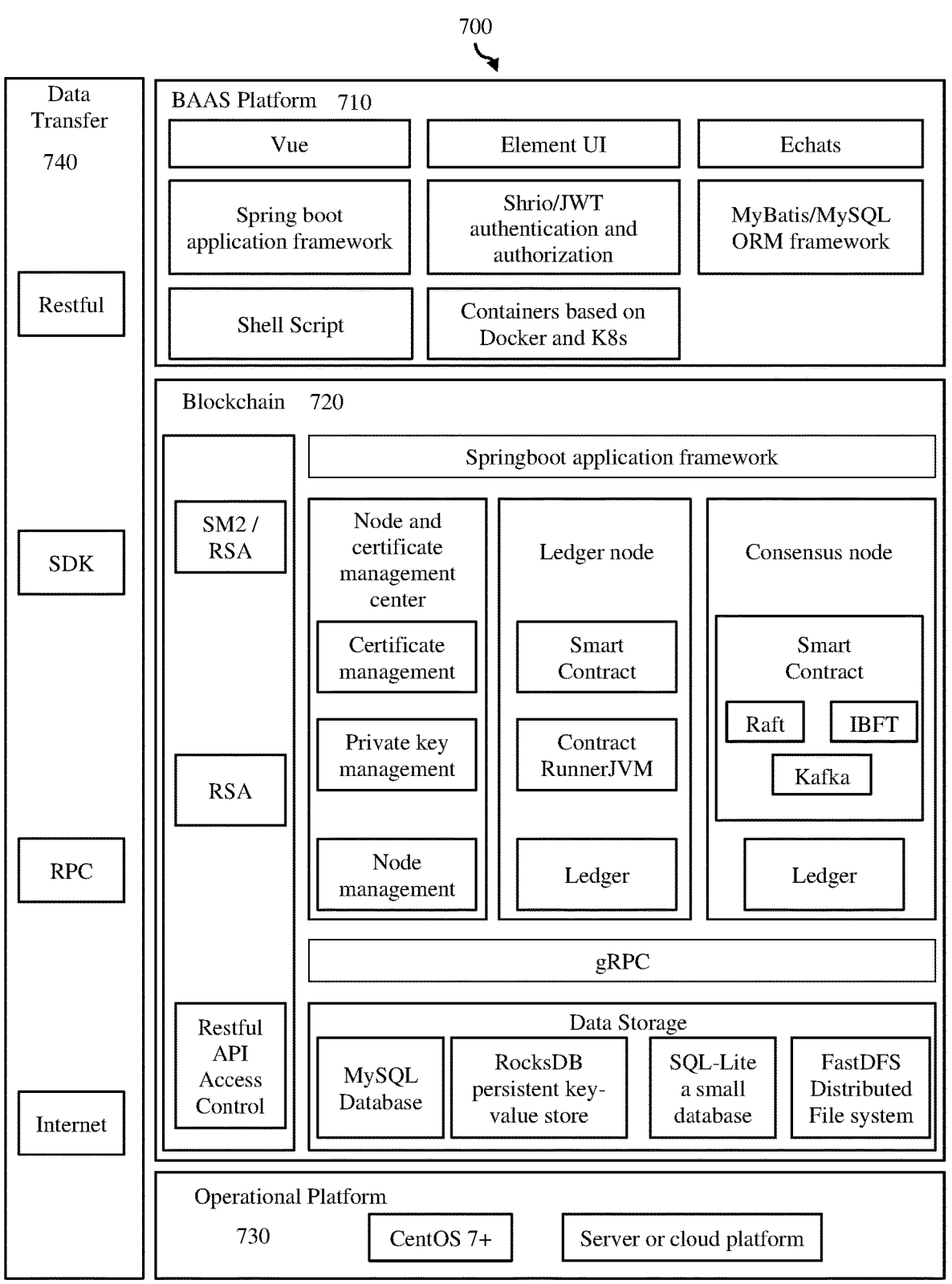
FIG. 7 is schematic diagram of the technical architecture of a digital asset trading system according to an embodiment.

The technical implementation may comprise the following parts or stages: Data acquisition; Data security processing; Data transfer & confirmation; and NFDT formation and CNT generation. Embodiments of technical implementations will be further explained and illustrated with references to FIGS. 5A through 7. Briefly FIG. 5A is a schematic diagram of a computing apparatus (or computing platform) according to an embodiment for use in a secure data acquisition system, and FIG. 5B illustrates a layered security model used in the design of the operating system of the computing apparatus illustrated in FIG. 5A according to an embodiment. FIG. 6 is a schematic diagram of the data security processing of the secure data acquisition system according to an embodiment, and FIG. 7 is schematic diagram of the technical architecture of the system including a blockchain based trading exchange according to an embodiment..

Measurement of carbon emission reduction based on real world projects is the beginning of CNT-NFDT, and the authenticity of measurement data is very important. At present, the core data that can be measured comes from a wide range of equipment/devices including internet of things (IoT) devices. In one embodiment the system further comprises a secure data acquisition platform that comprises a plurality of hardware and software components which are developed and/or manufactured by, or under the control and certification by the system, to ensure high levels of security and trust.

Measurement of carbon emission reduction based on real world projects is the foundation for generation of CNTs, and the authenticity of measurement data is very important.

Accordingly in some embodiment the system comprises a secure data acquisition system which is used to obtain and verify data relating to emission reduction activities used to generate CNTs. In some embodiments the data acquisition system may also be used to collect data relating to carbon emissions relating to creation of an asset (e.g. used to generate the ENV value).

The secure data acquisition system may comprise hardware and/or software components which is used to capture emissions reduction data relating to projects and assets. This may include field sensors and/or field deployed hardware which securely collect data and securely transfer data back to the system (e.g. using encryption and associated security techniques) to enable estimation of $CO_2$ equivalents from an activity. Example equipment include Carbon emission gas detection equipment, Green House Gas (GHG) measurement equipment, Environmental multifunctional measuring instrument, gas flow meters, power meters, etc. The data acquisition may also be configured to receive documentation regarding an emission reduction activity or asset which may be used in calculation of ENV values and CNTs To ensure high levels of trust and security, the hardware and software is designed according the following guidelines:
  Creating a virtual and highly secure private network for the organization running on commercial communications facilities;
  Minimizing the attack surface;
  Operating on hardware of trust and official drivers for total control and security assurance.
  Integrating an intelligent policy engine that performs real-time command and control, providing end to end governance and visibility over enterprise devices;
  Devising a multi-layered protection encompassing both granular permit/deny mechanisms and threat detection via crowd control;
  Building purpose-built means to dismantle the possible malicious impact of malware that has penetrated the device;
  Allowing a swift recovery from device malfunctions and suspicious breaches and eliminating the need for ex-organization remedies; and
  Allowing the organization to co-manage secure phones (e.g. IntactPhone) and Bring Your Own Devices via a single system.
  Each system apparatus comprises a security platform that natively integrates the following security components:
  specially manufactured trusted hardware and drivers;
  a custom security-rich operating system, providing a security-enhanced framework and utilities that block cyber-crime attack vectors;
  integrated Command and Control Center to manage groups-driven device inventory and secured use policies;
  encrypted end to end (E2E) communications for protection against eavesdropping and wiretapping;
  security tools providing antivirus and AppsOps management; and
  a performance assurance toolset for seamless operation and security based on remote control technology and self-troubleshooting.
  To ensure high levels of trust, system hardware for the secure data acquisition, processing of data for generation of ENV and CNTs, and system operation may be performed using trusted hardware which has is certified to Evaluation Assurance Level 7 (EAL7). Embodiments may implement TrustZone technology which is a System on Chip (SoC) and CPU system-wide approach to security. TrustZone is hardware-based security built into SoCs to provide secure end points and a device root of trust. At the heart of the TrustZone approach is the concept of secure and non-secure worlds that are hardware isolated from each other. Within the processor, software either resides in the secure world or the non-secure world; a switch between these two worlds is accomplished by a secure monitor (application processors) or via hardware (microcontrollers). This concept of secure (trusted) and a non-secure (non-trusted) world extends beyond the CPU, its memory and software to include transactions on a bus, interrupts, and peripheral interfaces within a SoC.

TrustZone technology for application processors is commonly used to run trusted boot and a trusted OS to create a Trusted Execution Environment (TEE). Typical use cases include the protection of authentication mechanisms, cryptography, key material and DRM. Applications that run in the secure world are called Trusted Apps. TrustZone technology for application processors provides a foundation for system-wide security and the creation of a trusted platform. Any part of the system can be designed to be part of the secure world including debug, peripherals, interrupts and memory. By creating a security subsystem, assets can be protected from software attacks and common hardware attacks.

The partitioning of the two worlds is achieved by hardware logic present in the AMBA bus fabric, peripherals, and processors. Each physical processor core has two virtual cores: one considered secure and the other non-secure and a robust mechanism is provided to context switch between them (Secure Monitor Call). The entry to the secure monitor can be triggered by software executing a dedicated Secure Monitor Call (SMC) instruction or by a number of exception mechanisms. The monitor code typically saves the state of the current world and restores the state of the world being switched to.

This is further illustrated in FIG. 5A which shows a trusted computing apparatus 500, comprising one or more processors 510 each of which has two virtual cores: one secure core 512 and one non-secure core 516 and a context switch 514 which switches between the two cores. The apparatus further comprises one or more memories 520, which may further comprise a secure memory 522 associated with secure core 512 and a non-secure memory 524 associated with non-secure core 516. The computing apparatus may further comprise one or more input devices 530 and one or more output devices 540. In some embodiment a device may be both an input device and an output device (e.g. a touch screen). As noted above, the input and output devices may be secure or non-secure. Input devices 530 may include sensors, keyboards, mice, touchscreens, etc. Output devices may include a display device or a touch screen.

The one or more processors may be a central processing unit (CPU), graphical processing unit (GPU), microprocessor or microcontroller, and may comprise an Input/Output Interface, an Arithmetic and Logic Unit (ALU) and a Control Unit and Program Counter element which is in communication with input and output devices through an Input/Output Interface. The computing apparatus may also include a network interface and/or communications module for communicating with an equivalent communications module in another computing apparatus using a predefined communications protocol (e.g. WiFi, Bluetooth, IEEE 802.15, IEEE 802.11, TCP/IP, UDP, etc). The memory 520 is operatively coupled to the processor(s) 510 and may comprise RAM and ROM components, and may be provided within or external to the device. The memory may be used to store the operating system and additional software modules or instructions. The processor(s) may be configured to load and executed the software modules or instructions stored in the memory. Applications or computer programs for executing on the apparatus may be written in a general-purpose programming language (e.g., Pascal, C, C++, Java, Python, JSON, etc.) or some specialized application-specific language, and may utilise or call software libraries or packages as required. The operating system and application software may provide user interfaces.

In order to implement a secure world in the SoC, a trusted Operating System (Trusted OS) was developed to make use of the protected assets. The code implements trusted boot, the secure world switch monitor, a small trusted OS and trusted apps. Multiple levels of secure world privileges are provided for isolation between trusted boot, trusted OS and trusted apps. The combination of TrustZone based hardware isolation; trusted boot and a trusted OS make up a Trusted Execution Environment (TEE). The TEE offers the security properties of confidentiality and integrity to multiple Trusted Apps. Embodiments use high encryption levels and meet EAL7 certification (the highest level certification available).

In some embodiments system apparatus including sensors and computational apparatus, such as for collection of emissions related data or processing data within the system is manufactured in a trusted environment. In this trusted environment all components are assembled and monitored under strict inspection policies enabling isolation of the hardware assembly process and the software installation process. Software installation is performed directly and exclusively by system experts in its system facilities.

Controlling the manufacture of system sensors and computational apparatus further allows the entire device code, including drivers and bootloader to be controlled and owned. This enables the development of trusted drivers and a bootloader to enable secure boot and prevent the substitution of altered boot code (i.e. an "unauthorized replacement") which might introduce malware or security backdoors into a processor once it is initialized. The apparatus may be configured to limit changeable boot parameters such as multi-stage boot code sourcing in the device as it loads, so that a malicious attack cannot interrupt the boot process and substitute false commands or security backdoors into the device setup. In one embodiment devices based on the IntactPhone platform maybe developed, and drivers and the bootloader code can be fully audited. That is the system may be granted complete auditing access to the IntactPhone source code, including its drivers and bootloader to ensure security of system devices based on these devices.

In one embodiment a self-destruction protection is implemented. In this embodiment a hardware date protected bootloader supports a unique data self-destruction mechanism wherein a self-destruction process is activated when a physical access attack is detected.

In one embodiment system apparatus implement a secure operating system that focuses on security and fully protecting the device, not only from network attacks or malicious software but also from the user by enforcing strict organizations policies that the user can't bypass. In one embodiment this is based on a heavily customised Android version. The secure OS was developed under severe security assumption that given enough time and money everything can be hacked and thus most simple secured OS approaches are not effective. Thus in one embodiment a Total Shield approach is used, enabling a multi-layer security approach where each level is secured in different measures allowing the OS to eliminate even unknown threats, and which features improved resource management control in both kernel and driver levels for privacy sensitive resources.

This is further illustrated in FIG. 5B which illustrates a layered security model 550 used in the design of the operating system of the computing apparatus illustrated in FIG. 5A according to an embodiment. This model comprises:

Blocking Known Trojans Same day patches 551;

Encrypted Communications 552;

Use & Content Governance Apps Permissions 553;

Crowd Analysis Enhanced Resources & Connectivity Control 554;

Resources Abstraction & Custom Push Notifications 556; and

Internal Encryption 557;

Once data is collected, the data is processed by the system to estimate carbon emissions and enable generation of CNT and ENV values. FIG. 6 is a schematic diagram of the data security processing according to an embodiment. The data security process will process and store data in the cloud collected from the trusted computing apparatus 500 to ensure the accuracy and security of the data collected on the platform at any time.

The data security process includes four components: fragmentation, encryption, storage and verification.

In one embodiment a high-strength fragmentation encryption engine comprising a core unit 620 and a concurrent processing unit 630 that receives a stream of data from a data sources 610 and performs high-density fragmentation 622 and real-time individual encryption 612 of the fragments. The engine may also provide fragmentation reorganisation 624 and decryption 614. In one embodiment the high-strength fragmentation encryption engine achieved transmission and encryption efficiency of more than 100 MB per second. An expandable specification may be implemented. The file fragment parameters can be adjusted in intensity according to the actual application scenarios, and different levels of 100 fragments to 100,000 fragments are supported, and different encryption strengths can be corresponded to the file's alertness.

Distributed storage of high-security and high-availability data is also implemented. File fragments from the high-strength fragmentation encryption engine are stored in a storage unit 640 using a distributed architecture (e.g. distributed database 660). The files are stored in a non-file type, and a file error correction function is integrated to achieve file error correction within a certain allowable range to avoid malicious and illegal tampering. It also has an expandable and highly available backup function. The high-strength fragmentation encryption engine may be configured to perform fragmentation decryption, hash calculation and production of fragmentation index for the storage unit which stores fragments 644 in distributed database 660. Similarly when data is sent from the distributed database 660 fragmentation asymmetric encryption, hash calculation and production of fragmentation index nay be performed. The blockchain unit 650 may store or provide fragmentation index verification 634 and index decentralized storage.

A dynamic encryption algorithm is also implemented. In the process of high-density fragmentation of the original file through the core engine, each fragment will be randomly combined with a secure encryption algorithm to encrypt the fragments with array dynamic parameters. A range of high-strength encryption algorithms may be used to greatly reduce the possibility of cracking the encryption algorithm A blockchain unit 650 provides blockchain verification. In one embodiment the blockchain unit is a specially adjusted enterprise-level blockchain technology, allowing up to 700~1000 records per second can be uploaded to the chain, and the fingerprint of the source file can be stored in the block, so that the content of the source file can be verified without malicious and illegal tampering during storage to protect the user's file security.

FIG. 7 is schematic diagram of the technical architecture 700 of the system according to an embodiment. The technical architecture 700 consists of four components: a BAAS management and control platform 710, a blockchain 720, an operational platform 730 and a data transfer and communication module 740.

The Business As A service (BAAS) management and control platform 710 comprises front and back end frameworks. The main front-end frameworks and user interfaces are implemented using Vue, Element UI and Echarts whilst the back end is mainly a Spring boot application framework which is responsible for implementing Restful interface services. The Java security framework Shrio and the cross domain authentication solution JWT (JSON web token) are used to implement authentication, authorization, password and session management. MySQL is used as the database, and Mybatis is used as a data persistence mapping framework which supports customized SQL, stored procedures and advanced mapping. The BAAS platform uniformly manages and maintains the deployment of the underlying chain nodes. Shell script is used for the deployment of the underlying chain nodes, which can provide convenient and efficient functions in node deployment.

A blockchain 720 module is implemented in which the underlying chain is developed using the Springboot language framework along with a Certificate Authority (CA), a Peer/Ledger Node, and an Order/Consensus Node module. The node and certificate management center (CA module) is responsible for node certificate management, private key management and node management. The peer (Ledger Node) module is mainly responsible for the initialization of smart contracts, data synchronization to the ledger storage, and maintenance. The order/Consensus Node is mainly responsible for the consensus of the whole network implementing consensus algorithms such as RAFT, IBFT and Kafka. It is also responsible for the landing of transaction data, the block packing to the ledger storage and maintenance. A high-performance RPC framework (e.g. gRPC) is used for communication. To provide security, asymmetric encryption is used for data transmission, and SSL encryption and authentication are used to authenticate the client accessing the message. In one embodiment RSA algorithm and domestic SM2 algorithms are used for signature and verification, and may also support International Des, domestic SM4, SM3 hash algorithm Sha256, Ed25519 signature algorithm. A data storage module supports/implements a MySQL database, a RocksDB database, a SQL lite small database and a FastDFS distributed file storage system.

The operational platform 730 implements a CentOS 7+ operating system for providing an execution (or running) environment for the BAAS platform and the blockchain and underlying chain nodes, which can run on specific physical machines (e.g. servers) or cloud platform. In one embodiment the system is designed and configured using trusted computing apparatus 500 as discussed above, or according to trusted security guidelines as discussed above to provide layered security throughout the system, such as use of encrypted data communications.

A data transfer and communication module 740 is configured to use SDK or RESTful to communicate with the underlying chain externally and gRPC to transmit data internally, and provides a communications interface to the Internet.

Embodiments of the above technical architecture may be used to create and store NFDTS, CNT tokens, and store the ENV value of an asset and enable trading. Binding of an asset with a verified carbon footprint attribute value allows not only issuers but also investors to be able to quantitatively identify a portfolio's carbon footprint attribute and thus enable ESG disclosure on an exchange for both issuers and investor. The above described technical architecture implements a trading exchange which includes a digital ledger that is able to track the carbon footprint attributes with the asset based on immutable data stored in a blockchain, and is able to clear and settle the trades on the trading exchange, with full tracking of the bound carbon neutrality status.

The NFDTs CNTs used on the exchange are created using smart contracts published on the blockchain. Similarly, NFDT and associated smart contracts are used to store the carbon footprint attribute (ENV) value of an asset at multiple time points to enable a ledger to maintain an up-to-date carbon footprint attribute (ENV) value of an asset traded on the exchange. A Non-Fungible Digital Twin (NFDT) is created through a interface for a smart contract on the blockchain, and its acts as an immutable digital twin to safeguard the authenticity of the carbon footprint attribute (ENV). In one embodiment the blockchain is an Ethereum blockchain and the smart contracts for the NFDT are based on ERC-721 smart contracts. Each smart contract in the NFDT is different (irreplaceable), distinguishable, and by linking the smart contracts the NFDT's can track the carbon footprint status over time. An NFDT is uniquely identified by its contract address on the blockchain and a tokenID (a uint256) which provides a mapping to the address. As noted above an asset or carbon offsetting activity or project may be digitally represented by a time series of asset contracts which form an NFDTs (i.e. a live/continuous digital representation of the asset or project) This comprises a birth asset contract which captures all details of the asset and its carbon footprint (ENV), and a time series of subsequent asset contract each of which stores subsequent emission data or change to the carbon footprint attribute value (ENV) due such as due to emission reduction activities or purchase of CNTs at the present time (t). That is, after the birth contract, each subsequent asset contract stores the new carbon footprint information at the present time (t) and along with the address of the previous smart contract (t−1).

The goal of the issuance and trading of CNTs is to transform the incentive mechanism of carbon emissions reduction from one that is driven by tasks or obligations to one that is driven by economics. This monetization of carbon assets considers the emission reduction as a benefit rather than cost and enables enterprises and individuals to monetize their green behaviour. Under the emission reduction mechanism and trading mode above, carbon assets are used as an independent asset type for quota performance, and with the circulation and trading in the special carbon trading market, these carbon assets have transactional value.

The contribution of energy conservation and emissions reduction—whether due to technological breakthroughs, energy recycling, low-carbon behavior, or afforestation or other green behaviours all create valuable behaviour which can be used to contribute to emissions reductions. Embodiments of the system enable the creation of CNTs from a wide range of activities is to help achieve the global carbon neutrality goal. Green behavior is the "mining" mechanism and generates CNTs as the reward to the owners of green assets (green behavior entity). Because it is a tradable asset, CNT enables green behavior to gain economic value and the corresponding economic driving tailwinds, thereby realizing the incentive mechanism.

Traditional carbon emission pricing is affected by many factors, including global carbon emissions reduction policy, the macro economy (economic activities and carbon emission intensity), various energy prices, allocation mode and quantity of allowance etc. The carbon price expectation based on the above factors will affect the willingness of enterprises to develop carbon credits, thus affecting the supply of carbon emission rights. In this pricing mechanism, the distribution mechanism of allowance and the marginal cost of emissions reduction play the most important role. Specifically, when the marginal cost of emission reductions is higher than the market price of carbon emission rights, enterprises will be willing to buy carbon emission rights, resulting in increased demand for carbon emission right. When the marginal cost of emission reduction is lower than the market price of carbon emission rights, enterprises will be willing to profit by selling carbon emission allowance in the market.

In the exchange, 1 CNT is always equal to 1 tCO2e, so the price of CNT reflects the carbon price recognized by participants. The supply of CNT depends on the number and scale of issuers of "green" assets that choose to issue the positive ENV as independent CNT's on the exchange. The demand of CNT depends on the total amount of negative ENV assets that come on the exchange platform, as well as the willingness of the issuers of "gray" assets to "neutralize" their negative ENV on the platform.

Driven by this supply-demand relationship, the price of CNT can be directly priced by the trading of CNT. Since CNT corresponds to 1 tCO2e emission reduction in the case of global carbon neutralization, the CNT price when an asset completely neutralizes its negative ENV by buying CNT should reflect the marginal emission reduction cost of the asset to achieve zero emissions under the premise of the supply and demand balance (as the asset holder might not be an emission enterprise, so the marginal emission reduction cost is also called marginal carbon neutralization cost). Which can also be shown as the below:

$$P_{CNT}=MAC(0) \qquad \text{Equation 9}$$

$P_{CNT}$ is the current price of a CNT on the exchange (in the unit of fiat currency, such as US dollar), and MAC is the marginal carbon neutral cost curve of the asset. Extended to all assets, under the equilibrium condition, the CNT price on the exchange should be as follows:

$$P_{CNT} = \sum_{i=1}^{n} \frac{ENV_i}{ENV_{ALL}} \cdot MAC_i(0) \qquad \text{Equation 10}$$

In which, $ENV_{ALL}$ is the total ENV of all assets with negative ENV on the platform, and $ENV_i$ and $MAC_i$ are the ENV of the number i asset with negative ENV and marginal carbon reduction neutralization curve, respectively.

Apart from the price of CNT, the carbon trading on the exchange also includes crypto trading (BTC, ETH) other than assets (represented on the exchange as ABT) and CNT. For example:

$$1 \; ABT \cdot ECON = P_{Traditional} + P_{CNT} \cdot ABT \cdot ENV \qquad \text{Equation 11}$$

Where, $P_{Traditional}$ represents an assets valuation and the corresponding ABT pricing using traditional valuation methods such as FCF and DCF (the unit should be fiat currency in the exchange, e.g., US dollar). $P_{CNT}$ is the current price of a CNT on the exchange (the unit should be fiat currency e.g., US dollar), or the marginal carbon neutrality cost of the buyer for the corresponding emissions reduction of the purchased CNT.

Similarly:

$$1 \; BTC \cdot ECON = 1 \; BTC_{Market} + P_{CNT} \cdot BTC \cdot ENV \qquad \text{Equation 12}$$

When trading between ABT and BTC, ABT and fiat currency, BTC and fiat currency, the trading price should be the ECON value of their respective assets after fully considering the economic value of ENV.

The CNT price is also the carbon price on the exchange, which reflects the price of 1 tCO2e carbon emission right when reaching carbon neutralization, based on the information of all participants as at the cut-off point in time.

Compared with the traditional quota-based pricing, the carbon pricing on the exchange has the following characteristics:

Outside of the limitations of carbon emissions quota in specific region, specific time and policy, the CNT price is based on the reduction cost of carbon equivalent per ton when reaching global carbon neutralization, therefore its dependence on policy is significantly reduced.

CNT can be transferred with the assets trading, and the trading among issuers of emission enterprises, issuers of non-emission enterprises, issuers of green assets and investors transcends geographical, quota policy boundaries and industrial supply chains, which makes it conducive to the rapid and effective re-distribution of carbon neutrality costs and benefits different countries and stakeholders, thus forming a more effective pricing mechanism.

The carbon pricing basis on the exchange (ENV and CNT of assets) and the blockchain design and authoritative tripartite emission reduction verification can ensure the objective fairness and traceability of data sources, as well as the security of data and transactions and timeliness of data (especially compared to the annual ESG disclosure report), which greatly simplifies the transaction process and reduces the transactional cost.

Because of the above characteristics, the CNT trading and carbon pricing on the exchange system are closer to the asset pricing in efficient markets vis-a-vis the traditional carbon trading market, i.e. the price of CNT reflects the market's pricing of carbon neutral of assets based on all known information, including the historical carbon price information, the expectation of allowance of various countries and regions, and the information of carbon emissions affecting the carbon neutrality marginal cost curve.

In addition, all the issuance of CNTs is recorded on the carbon neutrality blockchain of the exchange, and corresponded to the issuance and trading of the assets. The blockchain technology and smart contracts can be used as a distributed shared ledger and database, with the characteristics of decentralization, immutability, whole process record keeping, tracking, collective maintenance, and transparency, which can effectively record all the carbon neutralization behavior in various countries and industries on the exchange at any point of time. This is especially significant for market participants and policy makers who analyze and track these behaviors.

To summarise embodiments of methods for generating Non-Fungible Digital Twin (NFDT) representations of assets or carbon offsetting actions or projects which represent a time series of smart contracts on a blockchain (for example based on the Ethereum ERC-721 standard), that capture carbon offsetting actions and carbon emissions over time have been described. Carbon offsetting actions can be used to generate Carbon Neutrality Tokens (CNTs; for example based on Ethereum ERC-20 standard). A digital asset trading system may be implemented which allows listing of assets and listing of the CNTs. A ledger is also used to store a carbon footprint attribute value (ENV) of each listed asset. Each asset smart contract includes the carbon footprint (e.g. tonnes of CO2 equivalent or simply tCO2e) generated since the last asset smart contract and is thus the carbon footprint (ENV) is bound to the digital asset. The carbon footprint attribute value (ENV) for each listing traded on the digital asset trading exchange is tracked through the ledger, and the digital asset trading exchange is configured to provide an investor holding a portfolio of investments on the exchange with a portfolio value of the portfolio and a carbon footprint attribute value of the portfolio obtained by summing the carbon footprint attribute value of each investment in the portfolio of investments. Similarly the total carbon footprint attribute value (ENV) of an asset holder can be obtained by summing the carbon footprint attribute value of each listing, and any offsetting CNTs held to provide a mechanism to easily and clearly meet Environmental Social and Governance (ESG) reporting requirements. In particular, the methods described herein (and in particular the process of creating NFDT for an offsetting asset or project) provides methods for creating cross-border carbon credit trading mechanism without triggering NDC constraints and without dependence on Article 6 of Paris agreement. In particular they allow the country in which emission reductions are occurring to record the reductions in their registries and to contribute to their NDC, and to freeze this reduction whilst allowing a digital representation of the asset or project to be created which can be freely traded across borders (whether by the original owner/offset or another party). Emission reductions may also be permanently frozen and used to neutralize the carbon footprint of real world assets.

Embodiments also allow for secure collection, transmission and verification of data from ongoing projects to enable continuous updating of the carbon neutrality status (ENV value) of an asset, as well as generation of CNTs from ongoing projects. This enables consumers to be become involved and contribute to emission reductions.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, middleware, platforms, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two, including cloud-based systems. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein, or a combination thereof. Various middleware and computing platforms may be used.

In some embodiments the computing apparatus may comprise one or more processors. The one or more processor may comprise one or more Central Processing Units (CPUs) or Graphical processing units (GPU) configured to perform some of the steps of the methods. Similarly a computing apparatus may comprise one or more CPUs and/or GPUs. A CPU may comprise an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc.). The computing apparatus may comprise a single CPU (core) or multiple CPU's (multiple core), or multiple processors. The computing apparatus is may be a server based computing apparatus or a cloud based computing apparatus using GPU clusters, but may be a parallel processor, a vector processor, or be a distributed computing device. Memory is operatively coupled to the processor(s) and may comprise RAM and ROM components, and may be provided within or external to the device or processor module. The memory may be used to store an operating system and additional software modules or instructions. The processor(s) may be configured to load and executed the software modules or instructions stored in the memory.

Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one embodiment, a computer-readable storage medium is provided on which a computer program is stored, wherein the computer program implements the steps in each of the method embodiments described above when executed by a processor.

The reference to any prior art in this specification is not, and should not be taken as, an acknowledgement or any form of suggestion that such prior art forms part of the common general knowledge.

It will be understood that the terms "comprise" and "include" and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

What is claimed is:

1. A method for generating a plurality of carbon neutrality tokens (CNTs) representing a carbon offsetting action for trading, comprising the steps of:

monitoring, using one or more field sensors of a secure data acquisition system, an amount of carbon emissions generated by a carbon offsetting action in a country, wherein the one or more field sensors include at least one of the following: a greenhouse-gas (GHG) measurement equipment, a gas flow meter, a power meter, a carbon emission gas detection equipment, an environmental multifunctional measuring instrument, or any combination thereof;

collecting, using a secure virtual core of one or more processors of the secure data acquisition system, from the one or more field sensors, carbon offsetting data associated with the carbon offsetting action which generated an amount of carbon emission reductions in the country, wherein each of the one or more processors of the secure data acquisition system includes the secure virtual core, a non-secure virtual core, and a context switch that switches between the secure virtual core and the non-secure virtual core;

submitting the carbon offsetting data to a third party verification authority to obtain a verified amount of carbon emission reductions;

obtaining a carbon emission reduction certificate and a carbon emission redemption certificate from an issuing authority in a country in relation to the carbon offsetting action which generated the amount of carbon emission reductions in the country, wherein the amount of carbon emission reductions has a national identity which belongs to the country and is verified by the third party verification authority or the issuing authority, and the redemption certificate prevents further trading of the carbon emission reduction certificate in the country;

placing the carbon emission redemption certificate in a custody to prevent further trading or use of the carbon emission reduction certificate so that the national identity of the carbon emission reductions stays with the country;

generating and storing, with the secure virtual core of the one or more processors of the secure data acquisition system, an information package at a report address, wherein the information package comprises at least the amount of carbon emission reductions, the carbon emission reduction certificate, the redemption certificate and information regarding the carbon offsetting action;

with the secure virtual core of the one or more processors of the secure data acquisition system, cryptographically signing the information package and obtaining a hash for authenticating the information package at the report address;

inputting at least an owner address, an identifier, the amount of carbon emission reductions, the report address, and the hash of the information package to an emission reduction smart contract in a blockchain, wherein once published on the blockchain, the emission reduction smart contract defines a birth smart contract and the submitted information is stored on the blockchain at a birth smart contract address that includes the hash for authenticating the information package at the report address;

using the birth smart contract and the amount of carbon emission reductions contained therein to obtain the plurality of CNTs by executing a CNT smart contract on the blockchain, wherein the amount of CNTs issued is determined from the amount of carbon emission reductions in the birth smart contract;

storing the plurality of CNTs;

offering one or more of the plurality of CNTs for trading;

publishing a plurality of emission reduction smart contracts on the blockchain where each is published at a different time, and each emission reduction smart contract after the birth smart contract includes an amount of additional carbon emission reductions since the previous emission reduction smart contract was published, and a link to one or more of the previous emission reduction smart contracts published on the blockchain including the birth smart contract, wherein the birth smart contract and plurality of emission reduction smart contracts form a time series of emission reduction smart contracts which define a unique Non-Fungible Digital Twin (NFDT) representation of the offsetting action, and if the amount of additional carbon emission reductions in one of the plurality of emission reduction smart contracts is positive, then using the respective emission reduction smart contract to obtain an additional plurality of CNTs by executing a CNT smart contract on the blockchain, wherein the amount of CNTs issued is determined from the amount of carbon emission reductions in the respective emission reduction smart contract;

storing the additional plurality of CNTs; and offering one or more of the additional plurality of CNTs for trading.

2. The method as claimed in claim 1, wherein for each emission reduction smart contract in the plurality of emission reduction smart contracts, the method further comprises:

obtaining a subsequent carbon emission reduction certificate and a subsequent carbon emission redemption certificate from the issuing authority in the country in relation to the carbon offsetting action which generated the additional amount of carbon emission reductions, wherein the additional amount of carbon emission reductions is verified by the third party verification authority or the issuing authority, and the subsequent redemption certificate prevents further trading of the carbon emission reduction certificate in the country;

placing the subsequent carbon emission redemption certificate in the custody to prevent further trading or use of the subsequent carbon emission reduction certificate;

generating and storing a subsequent information package at a subsequent report address, wherein the subsequent information package comprises at least the amount of additional carbon emission reductions, the subsequent carbon emission reduction certificate, and the subsequent redemption certificate;

cryptographically signing the subsequent information package and obtaining a subsequent hash for authenticating the subsequent information package; and inputting at least the owner address, the identifier, the additional amount of carbon emission reductions, the subsequent report address, and subsequent the hash of the subsequent information package to the emission reduction smart contract in the blockchain, wherein once published on the blockchain the emission reduction smart contract forms a subsequent emission reduction smart contract of the NFDT and the submitted information is stored on the blockchain at a subsequent smart contract address.

3. The method as claimed in claim 1, wherein one or more of the plurality of CNTs are offered for trading outside of the country which issued the carbon emission reduction certificate.

4. The method as claimed in claim 1, wherein the CNTs are offered for trading on a digital asset trading exchange which maintains a ledger of CNTs for trading on the digital asset trading exchange, and the plurality of CNTs are stored in a cold wallet associated with digital asset trading exchange.

5. The method as claimed in claim 4, wherein the digital asset trading exchange comprises a plurality of listings where each listing is a digital representation of an asset that is available for trading on the digital asset trading exchange by an issuing entity, and the ledger stores a carbon footprint attribute value of each listed asset.

6. The method as claimed in claim 5, wherein:

an issuing entity of an asset with the carbon offsetting action creates an NFDT on the digital asset trading exchange to represent the asset associated with the carbon offsetting action and lists a plurality of asset-backed tokens each with a zero carbon footprint attribute value representing a financial and/or operational aspect of the asset and a plurality of CNTs generated due to the carbon offsetting action; and an issuing entity of the asset that generates carbon emissions creates an NFDT on the digital asset trading exchange to represent the asset that generates the carbon emissions and lists the plurality of asset-backed tokens each with a negative carbon footprint attribute value due to carbon emissions associated with the asset, wherein the carbon footprint attribute value is updated on the ledger as additional carbon emissions data is obtained over time, wherein the carbon footprint attribute value for each listing traded on the digital asset trading exchange is tracked through the ledger of the digital asset trading exchange, and the digital asset trading exchange is configured to provide an investor on the digital asset trading exchange holding a portfolio of investments on the exchange with a portfolio value of the portfolio and a carbon footprint attribute value of the portfolio obtained by summing the carbon footprint attribute value of each investment in the portfolio of investments.

7. The method as claimed in claim 6, where each listing further comprises one or more Environmental Social and Governance (ESG) metrics, and the ledger tracks each of one or more ESG metrics of each listing, and the digital asset trading exchange is configured to provide an investor on the digital asset trading exchange with a summary of each of the one or more ESG metrics obtaining by summing each of the one or more ESG metrics of each investment in the portfolio of investments.

8. The method as claimed in claim 5, wherein the CNTs are offered for trading on the digital asset trading exchange as part of a bundle with one or more of the plurality of listings to offset the carbon footprint attribute value of the respective one or more assets associated with the one or more listings.

9. The method as claimed in claim 4, further comprising permanently freezing one or more CNTs of the plurality of CNTs to achieve carbon neutrality of a neutralization asset comprising:

purchasing, by a first entity, a neutralization amount of CNTs on the digital asset trading exchange;

submitting, by the first entity, a neutralization information package to the digital asset trading exchange comprising at least information on the neutralization asset to be neutralized, a certification of a carbon footprint of the neutralization asset obtained from the third party verification authority, and the purchased neutralization amount of CNTs to be used to offset the carbon footprint;

removing the purchased CNTs from trading on the digital asset trading exchange and removing from the ledger entry of the first entity;

cryptographically signing the neutralization information package by the digital asset trading exchange and obtaining a neutralization hash for authenticating the neutralization information package;

creating a node on a public carbon neutrality blockchain comprising an address of the neutralization information package, the neutralization hash, and a record indicating that the purchased CNTs are permanently frozen; and issuing, by the digital asset trading exchange, a neutralisation certificate linked to the node.

10. The method as claimed in claim 1, wherein the blockchain is an Ethereum blockchain, and the emission reduction smart contract is based on the ERC721 standard and the CNT smart contract is based on the ERC20 standard.

11. The method as claimed in claim 1, wherein the report address is a Uniform Resource Identifier (URI) address or a Uniform Resource Locator (URL) address.

12. The method as claimed in claim 1, wherein the plurality of CNTs are stored in a cold wallet for closed-end custody or on a public blockchain.

13. A method for generating a digital representation of an asset for trading, comprising the steps of:

monitoring, using one or more field sensors of a secure data acquisition system, an amount of carbon emissions generated by the asset, wherein the one or more field sensors include at least one of the following: a greenhouse-gas (GHG) measurement equipment, a gas flow meter, a power meter, a carbon emission gas detection equipment, an environmental multifunctional measuring instrument, or any combination thereof;

collecting, using a secure virtual core of one or more processors of the secure data acquisition system, from the one or more field sensors, carbon emission related data associated with the asset, wherein each of the one or more processors of the secure data acquisition system includes the secure virtual core, a non-secure virtual core, and a context switch that switches between the secure virtual core and the non-secure virtual core;

calculating, based on the carbon emission related data, a carbon footprint attribute value for the asset;

submitting the carbon footprint attribute value for the asset to a third party verification authority to obtain a verified carbon footprint attribute value for the asset;

obtaining a verification certificate from the third party verification authority verifying the carbon footprint attribute value for the asset;

generating and storing, with the secure virtual core of the one or more processors of the secure data acquisition system, an information package at a report address, wherein the information package comprises at least the carbon footprint attribute value, the verification certificate, information regarding the carbon footprint of the asset and financial and/or operating information of the asset;

with the secure virtual core of the one or more processors of the secure data acquisition system, cryptographically signing the information package and obtaining a hash for authenticating the information package at the report address;

inputting at least an asset owner address, an identifier, the carbon footprint attribute value, the report address, and the hash of the information package to an asset smart contract on a blockchain, wherein once published on the blockchain, the asset smart contract defines a birth smart contract and the submitted information is stored on the blockchain at a birth smart contract address;

listing the asset for trading;

storing the carbon footprint attribute value associated with the asset in a ledger; and publishing a plurality of asset smart contracts on the blockchain where each is published at a different time, and each of the asset smart contract after the birth smart contract includes an amount of additional carbon emissions since the previous asset smart contract was published, and a link to one or more of the previous asset smart contracts published on the blockchain including the birth smart contract, wherein the birth smart contract and the plurality of asset smart contracts form a time series of emission reduction smart contracts which define a unique Non-Fungible Digital Twin (NFDT) representation of the asset, and after an additional asset smart contract is published the carbon footprint attribute value associated with the asset in the ledger is updated based on the amount of additional carbon emissions.

14. The method as claimed in claim 13, wherein the asset is listed for trading on a digital asset trading exchange, wherein the digital asset trading exchange comprises the ledger.

15. The method as claimed in claim 13, wherein if the carbon footprint attribute value is positive, using the asset smart contract to obtain a plurality of carbon neutrality tokens (CNTs) by executing a CNT smart contract on the blockchain and issuing the plurality of CNTs to an issuer and recording on the ledger, wherein the amount of CNTs issued is determined from the carbon footprint attribute value, and the plurality of CNTs are offered for trading, and if the carbon footprint attribute value is negative, using the asset smart contract to obtain a plurality of Asset Backed Tokens (ABTs) by executing an ABT smart contract on the blockchain and issuing the ABTs to an issuer and recording on the ledger, wherein the amount of ABTs issued is determined from the financial and/or operating information of the asset.

16. The method as claimed in claim 13, wherein the blockchain is an Ethereum blockchain, and the asset smart contract is based on the ERC721 standard and the asset backed tokens smart contract is based on the ERC20 standard.

17. The method as claimed in claim 13, wherein the report address is a Uniform Resource Identifier (URI) address or a Uniform Resource Locator (URL) address.

18. A method for trading on a digital asset trading exchange comprising a ledger, wherein the method comprises listing one or more carbon neutrality tokens (CNTs) generated by the method comprising the steps of:

monitoring, using one or more field sensors of a secure data acquisition system, an amount of carbon emissions generated by a carbon offsetting action in a country, wherein the one or more field sensors include at least one of the following: a greenhouse-gas (GHG) measurement equipment, a gas flow meter, a power meter, a carbon emission gas detection equipment, an environmental multifunctional measuring instrument, or any combination thereof;

collecting, using a secure virtual core of one or more processors of the secure data acquisition system, from the one or more field sensors, carbon offsetting data associated with the carbon offsetting action which generated an amount of carbon emission reductions in the country, wherein each of the one or more processors of the secure data acquisition system includes the secure virtual core, a non-secure virtual core, and a context switch that switches between the secure virtual core and the non-secure virtual core;

submitting the carbon offsetting data to a third party verification authority to obtain a verified amount of carbon emission reductions;

obtaining a carbon emission reduction certificate and a carbon emission redemption certificate from an issuing authority in a country in relation to the carbon offsetting action which generated the amount of carbon emission reductions in the country, wherein the amount of carbon emission reductions has a national identity which belongs to the country and is verified by the third party verification authority or the issuing authority, and the redemption certificate prevents further trading of the carbon emission reduction certificate in the country;

placing the carbon emission redemption certificate in a custody to prevent further trading or use of the carbon emission reduction certificate so that the national identity of the carbon emission reductions stays with the country;

generating and storing, with the secure virtual core of the one or more processors of the secure data acquisition system, an information package at a report address, wherein the information package comprises at least the amount of carbon emission reductions, the carbon emission reduction certificate, the redemption certificate and information regarding the carbon offsetting action;

with the secure virtual core of the one or more processors of the secure data acquisition system, cryptographically signing the information package and obtaining a hash for authenticating the information package;

inputting at least an owner address, an identifier, the amount of carbon emission reductions, the report address, and the hash of the information package to an emission reduction smart contract in a blockchain, wherein once published on the blockchain, the emission reduction smart contract defines a birth smart contract and the submitted information is stored on the blockchain at a birth smart contract address that includes the hash for authenticating the information package at the report address;

using the birth smart contract and the amount of carbon emission reductions contained therein to obtain the plurality of CNTs by executing a CNT smart contract on the blockchain, wherein the amount of CNTs issued is determined from the amount of carbon emission reductions in the birth smart contract;

storing the plurality of CNTs;

offering one or more of the plurality of CNTs for trading;

publishing a plurality of emission reduction smart contracts on the blockchain where each is published at a different time, and each emission reduction smart contract after the birth smart contract includes an amount of additional carbon emission reductions since the previous emission reduction smart contract was published, and a link to one or more of the previous emission reduction smart contracts published on the blockchain including the birth smart contract, wherein the birth smart contract and plurality of emission reduction smart contracts form a time series of emission reduction smart contracts which define a unique Non-Fungible Digital Twin (NFDT) representation of the offsetting action, and if the amount of additional carbon emission reductions in one of the plurality of emission reduction smart contracts is positive, then using the respective emission reduction smart contract to obtain an additional plurality of CNTs by executing a CNT smart contract on the blockchain, wherein the amount of CNTs issued is determined from the amount of carbon emission reductions in the respective emission reduction smart contract;

storing the additional plurality of CNTs; and offering one or more of the additional plurality of CNTs for trading;

generating a plurality of listings for a plurality of assets, each generated by the steps comprising:

calculating, based on a default standard or based on carbon emission related data, a carbon footprint attribute value for an asset;

obtaining a verification certificate from the third party verification authority verifying the carbon footprint attribute value for the asset;

generating and storing an information package at the report address, wherein the information package comprises at least the carbon footprint attribute value, the verification certificate, information regarding the carbon footprint of the asset and financial and/or operating information of the asset;

cryptographically signing the information package and obtaining the hash for authenticating the information package;

inputting at least an asset owner address, an identifier, the carbon footprint attribute value, the report address, and the hash of the information package to an asset smart contract on a blockchain, wherein once published on the blockchain, the asset smart contract defines the birth smart contract and the submitted information is stored on the blockchain at the birth smart contract address;

listing the asset for trading;

storing the carbon footprint attribute value associated with the asset in a ledger; and publishing a plurality of asset smart contracts on the blockchain where each is published at a different time, and each asset smart contract after the birth smart contract includes an amount of additional carbon emissions since the previous asset smart contract was published, and a link to one or more of the previous asset smart contracts published on the blockchain including the birth smart contract, wherein the birth smart contract and plurality of asset smart contracts form a time series of emission reduction smart contracts which define a unique NFDT representation of the asset, and after an additional asset smart contract is published the carbon footprint attribute value associated with the asset in the ledger is updated based on the amount of additional carbon emissions, and updating the ledger when a trader purchases a share of a listed asset by updating a carbon footprint attribute value for the trader stored in the ledger based on the total carbon footprint attribute value associated with the listed asset, and/or updating the ledger when a trader purchases one or more CNTs wherein the carbon footprint attribute value for the trader stored in the ledger is updated based on a number of the one or more CNTs purchased.

19. The method as claimed in claim 18, where the trader may purchase a bundle, wherein the bundle comprises a share of a listed asset, and an amount of CNTs to offset the carbon emissions associated with the share of the listed asset.

20. An asset trading system, comprising:

a plurality of computing apparatus comprising one or more processors, one or more memories, one or more storage devices, and one or more interfaces wherein the one or more interfaces are configured to receive and store one or more information packages in the one or more storage devices, and the plurality of computing apparatus are configured to perform the method of claim 1.

21. The asset trading system as claimed in claim 20, wherein the plurality of computing apparatus are configured to implement a blockchain.

22. The asset trading system as claimed in claim 20, wherein the plurality of computing apparatus are further configured to implement a digital trading exchange, and the one or more storage devices configured to implement a ledger and a cold wallet.

23. A non-transitory computer readable storage medium having a computer program stored thereon, the computer program implementing the method according to claim 1 when executed by a processor.

24. A method for generating a Non-Fungible Digital Twin (NFDT) of an asset comprising the steps of:

monitoring, using one or more field sensors of a secure data acquisition system, an amount of carbon emissions generated by a asset, wherein the one or more field sensors include at least one of the following: a greenhouse-gas (GHG) measurement equipment, a gas flow meter, a power meter, a carbon emission gas detection equipment, an environmental multifunctional measuring instrument, or any combination thereof;

collecting, using a secure virtual core of one or more processors of the secure data acquisition system, from the one or more field sensors, asset data associated with the amount of carbon emissions generated by the asset, wherein each of the one or more processors of the secure data acquisition system includes the secure virtual core, a non-secure virtual core, and a context switch that switches between the secure virtual core and the non-secure virtual core;

generating and storing, with the secure virtual core of the one or more processors of the secure data acquisition system, an information package at a report address, wherein the information package comprises information regarding the asset including at least one attribute value associated with the asset;

with the secure virtual core of the one or more processors of the secure data acquisition system, cryptographically signing the information package and obtaining a hash for authenticating the information package at the report address;

inputting at least an owner address, an identifier, the at least one attribute value, the report address, and the hash of the information package to an asset smart contract in a blockchain, wherein once published on the blockchain, the smart contract defines a birth smart contract and the submitted information is stored on the blockchain at a birth smart contract address;

using the birth smart contract to obtain a plurality of Asset Backed Tokens (ABTs) by executing an ABT smart contract on the blockchain, wherein the amount of ABTs issued is determined from the at least one attribute value in the birth smart contract;

storing the plurality of ABTs;

offering one or more of the plurality of ABTs for trading; and publishing a plurality of asset smart contracts on the blockchain where each is published at a different time, wherein the value of the at least one attribute value in each asset smart contract after the birth smart contract is the change in the value since the previous asset smart contract was published, and a link to one or more of the previous asset smart contracts published on the block-chain including the birth smart contract, and each smart contract is used to issue, store, and offer a plurality of ABTs based on the value in the respective smart contract, wherein the birth smart contract and plurality of emission asset contracts form a time series of asset smart contracts which define a unique NFDT represen-tation of the asset.

25. An asset trading system, comprising:

a plurality of computing apparatus comprising one or more processors, one or more memories, one or more storage devices, and one or more interfaces wherein the one or more interfaces are configured to receive and store one or more information packages in the one or more storage devices, and the plurality of computing apparatus are configured to perform the method of claim 24.

\* \* \* \* \*